(12) United States Patent
Filippov et al.

(10) Patent No.: US 12,549,760 B2
(45) Date of Patent: Feb. 10, 2026

(54) BLOCK VECTOR DIFFERENCE (BVD) CODING

(71) Applicant: Comcast Cable Communications, LLC, Philadelphia, PA (US)

(72) Inventors: Alexey Konstantinovich Filippov, Khimki (RU); Vasily Alexeevich Rufitskiy, Vladimir (RU); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 91 days.

(21) Appl. No.: 18/491,465

(22) Filed: Oct. 20, 2023

(65) Prior Publication Data

US 2024/0137555 A1   Apr. 25, 2024
US 2024/0236360 A9   Jul. 11, 2024

Related U.S. Application Data

(60) Provisional application No. 63/418,855, filed on Oct. 24, 2022.

(51) Int. Cl.
| | |
|---|---|
| *H04N 19/52* | (2014.01) |
| *H04N 19/105* | (2014.01) |
| *H04N 19/139* | (2014.01) |
| *H04N 19/176* | (2014.01) |
| *H04N 19/184* | (2014.01) |
| *H04N 19/577* | (2014.01) |

(52) U.S. Cl.
CPC .......... *H04N 19/52* (2014.11); *H04N 19/105* (2014.11); *H04N 19/139* (2014.11); *H04N 19/176* (2014.11); *H04N 19/184* (2014.11); *H04N 19/577* (2014.11)

(58) Field of Classification Search
CPC .... H04N 19/105; H04N 19/13; H04N 19/137; H04N 19/139; H04N 19/176; H04N 19/184; H04N 19/52; H04N 19/577; H04N 19/593; H04N 19/70; H04N 19/91
See application file for complete search history.

(56) References Cited

U.S. PATENT DOCUMENTS

| | | |
|---|---|---|
| 2003/0202710 A1 | 10/2003 | Cheung et al. |
| 2015/0264355 A1* | 9/2015 | Hsiang ................ H04N 19/517 375/240.02 |

(Continued)

FOREIGN PATENT DOCUMENTS

WO    2022/116836 A1    6/2022

OTHER PUBLICATIONS

Feb. 13, 2024—European Search Report—EP App. No. 23205016.1.

(Continued)

*Primary Examiner* — Anner Holder
(74) *Attorney, Agent, or Firm* — Banner & Witcoff, Ltd.

(57) ABSTRACT

A video parameter (e.g., a block vector difference (BVD)) may be represented as a codeword encoded using an entropy code. The codeword may comprising a prefix part and a suffix part. A prefix part may indicate a range of values, and a suffix part may indicate a specific value within the range. Efficient entropy coding may be achieved by reducing lengths of suffix parts associated with one or more selected prefix parts. The prefix parts may be selected based on a maximum possible value of the video parameter.

20 Claims, 33 Drawing Sheets

(56) References Cited

U.S. PATENT DOCUMENTS

| | | |
|---|---|---|
| 2015/0373334 A1 | 12/2015 | Rapaka et al. |
| 2015/0373370 A1 | 12/2015 | Rapaka et al. |
| 2022/0086451 A1* | 3/2022 | Bae ................... H04N 19/176 |
| 2022/0182664 A1* | 6/2022 | Xu ..................... H04N 19/61 |
| 2022/0217399 A1* | 7/2022 | Liang ................. H04N 19/176 |
| 2023/0068657 A1* | 3/2023 | Hu ..................... H04N 19/91 |
| 2023/0095946 A1* | 3/2023 | Ruiz Coll ............ H04N 19/52 |
| | | 375/240.02 |

OTHER PUBLICATIONS

U.S. Appl. No. 18/491,375, Block Vector Difference (BVD) Coding, filed Oct. 20, 2023.

JCTVC-R0204, Joint Collaborative Team on Video Coding of ITU-T SG16 WP3, 18th Meeting, Sapporo, Japan, Jun. 30-Jul. 9, 2014, Source: MediaTek, Title: Non-SCCE1: PU intra block copy with flipping mode.

JVET-Aa2025, JVET of ITU-T SG 16 WP3, 27th Meeting, by teleconference, Jul. 13-22, 2022, Source: Editors, Title: Algorithm description of Enhanced Compression Model 6 (ECM 6).

Feb. 13, 2024—European Search Report—EP App. No. 23205013.8.

\* cited by examiner

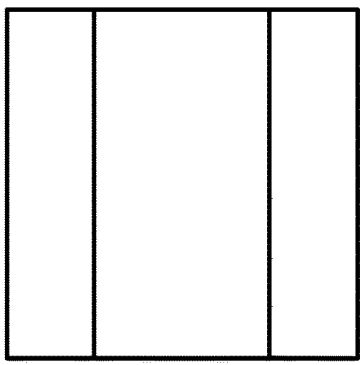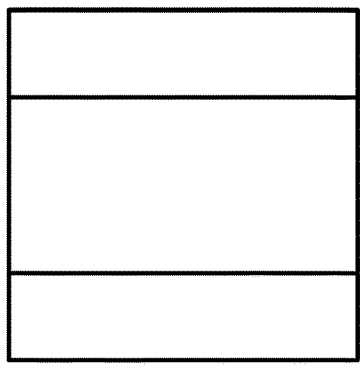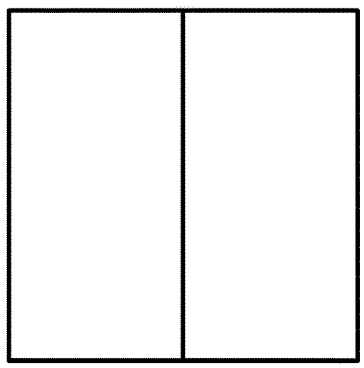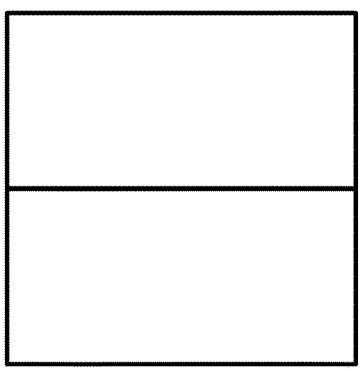
FIG. 6

The quick brown fox jumps over the lazy dog. The quick brown fox jumps over the lazy dog. The quick brown fox jumps over the lazy dog.

FIG. 16

| Input Symbol (Value) | k=1 Prefix Group (i) | Codeword (k=1) Prefix | Codeword (k=1) Suffix | k=0 Prefix Group (i) | Codeword (k=0) Prefix | Codeword (k=0) Suffix |
|---|---|---|---|---|---|---|
| 0 | 0 | 0 | | 0 | 0 | |
| 1 | 0 | 0 | 1 | 1 | 10 | 0 |
| 2 | 1 | 10 | 00 | 1 | 10 | 1 |
| 3 | 1 | 10 | 01 | 2 | 110 | 00 |
| 4 | 1 | 10 | 10 | 2 | 110 | 01 |
| 5 | 1 | 10 | 11 | 2 | 110 | 10 |
| 6 | 2 | 110 | 000 | 2 | 110 | 11 |
| 7 | 2 | 110 | 001 | 3 | 1110 | 000 |
| 8 | 2 | 110 | 010 | 3 | 1110 | 001 |
| 9 | 2 | 110 | 011 | 3 | 1110 | 010 |
| 10 | 2 | 110 | 100 | 3 | 1110 | 011 |
| 11 | 2 | 110 | 101 | 3 | 1110 | 100 |
| 12 | 2 | 110 | 110 | 3 | 1110 | 101 |
| 13 | 2 | 110 | 111 | 3 | 1110 | 110 |
| 14 | 3 | 1110 | 0000 | 3 | 1110 | 111 |
| 15 | 3 | 1110 | 0001 | 4 | 11110 | 0000 |

- Range of BVD 2102
- Range of Prefix Values 2104
- Available codewords 2108
- Codewords for the BVD range 2106

| Prefix Group (i) (k=0) | Prefix Group Start Value ($S_i$) | Input Symbol Range (Values) | Prefix | Suffix | Prefix Bit-length ($N_p$) | Suffix Bit-length ($N_s$) | Codeword Bit-length |
|---|---|---|---|---|---|---|---|
| 0 | 0 | 0 | 0 |  | 1 | 0 | 1 |
| 1 | 1 | 1~2 ($2^1-1$ ~ $2^2-2$) | 1 | 0 $X_0$ | 2 | 1 | 3 |
| 2 | 3 | 3~6 ($2^2-1$ ~ $2^3-2$) | 11 | 0 $X_0X_1$ | 3 | 2 | 5 |
| 3 | 7 | 7~14 ($2^3-1$ ~ $2^4-2$) | 111 | 0 $X_0X_1X_2$ | 4 | 3 | 7 |

FIG. 22

| Prefix Group (i) (k=0) | Prefix Group Start Value ($S_i$) | Input Symbol Range (Values) | Prefix | Suffix | Prefix Bit-length ($N_p$) | Suffix Bit-length ($N_s$) | Codeword Bit-length |
|---|---|---|---|---|---|---|---|
| 0 | 0 | 0 | 0 |  | 1 | 0 | 1 |
| 1 | 1 | 1~2 ($2^1-1$ ~ $2^2-2$) | 1 | 0 $X_0$ | 2 | 1 | 3 |
| 2 | 3 | 3~6 ($2^2-1$ ~ $2^3-2$) | 11 | 0 $X_0X_1$ | 3 | 2 | 5 |
| 3 | 7 | 7~BVDmax ($2^3-1$ ~ BVDmax) | 111 | $X_0X_1$ or $X_0X_1X_2$ | 3 | 2 or 3 | 5~6 |

FIG. 23

| Prefix Group (i) (k=0) | Prefix Group Start Value ($S_i$) | Input Symbol Range (Values) | Prefix | Suffix | Prefix Bit-length ($N_p$) | Suffix Bit-length ($N_s$) | Codeword Bit-length |
|---|---|---|---|---|---|---|---|
| 0 | 0 | 0 | 0 |  | 1 | 0 | 1 |
| 1 | 1 | 1~2 ($2^1-1$ ~ $2^2-2$) | 1 | 0 $X_0$ | 2 | 1 | 3 |
| 2 | 3 | 3~6 ($2^2-1$ ~ $2^3-2$) | 11 | 0 $X_0X_1$ | 3 | 2 | 5 |
| 3 | 7 | 7~ $[7+2^{Len(BVDmax-7)}-2]$ ($2^3-1$ ~ $\{2^3+2^{Len(BVDmax-7)}\}-2$) | 111 | one of $\{X_0, X_0X_1, X_0X_1X_2\}$ | 3 | $S_{BL}(i) = \lceil \log_2(BVDmax - S_4 + 1) \rceil$ = $Len(BVDmax - S_4) \leq 3$ | $3 < 3+Len(BVDmax-S_4) < 7$ |

FIG. 24

| Prefix Group (i) (k=0) | Prefix Group Start Value (S$_i$) | Input Symbol Range (Values) | Prefix | Group Indication | Suffix | Prefix Bit-length (N$_p$) | Suffix Bit-length (N$_s$) | Codeword Bit-length |
|---|---|---|---|---|---|---|---|---|
| 0 | 0 | 0 | 0 | | | 1 | 0 | 1 |
| 1 | 1 | 1-2 ($2^1$-1 ~ $2^2$-2) | 10 | | X$_0$ | 2 | 1 | 3 |
| 2 | 3 | 3-10 ($2^2$-1 ~ $2^3$-2+$2^2$) if BVDmax < (7+15)/2 | 11 | 0 | X$_0$ | 2 | 1 | 4 |
| | | | | 1 | X$_0$X$_1$ | 2 | 2 | 5 |

FIG. 25

```
┌─────────────────────────────────────────────────────────────────┐
│ Determine a block vector difference (BVD) indicating a difference between: │
│     a block vector (BV) indicating a displacement from a current block to a reference │
│ block, located in a reference region corresponding to a direction, that is flipped relative to │
│ the current block in the direction; and                         │
│     a block vector predictor (BVP) having a BVP component in the direction and │
│ being within a range of values defining the reference region in the direction of flipping │
│                              2602                               │
└─────────────────────────────────────────────────────────────────┘
                                  │
                                  ▼
┌─────────────────────────────────────────────────────────────────┐
│              Binarize the BVD based on the range of values      │
│                              2604                               │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│    Determine, based on the range of values, a first BVD value that a │
│  │         magnitude of the BVD does not exceed              │  │
│                              2606                               │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
│                              │                                  │
│                              ▼                                  │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│  │       Binarize or debinarize the BVD based on the first BVD value │
│                              2608                               │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
└─────────────────────────────────────────────────────────────────┘
                                                        ↖ 2600

FIG. 26A
```

```
┌─────────────────────────────────────────────────────────────┐
│ Receive a block vector difference (BVD) coded using a prefix part and a │
│ suffix part, wherein the BVD indicates a difference between:            │
│     a block vector (BV), indicating a displacement from a current block │
│ to a reference block flipped in a direction relative to the current block;│
│ and                                                                     │
│     a block vector predictor (BVP) having a BVP component in the        │
│ direction and within a range of values                                  │
│                              3202                                       │
└─────────────────────────────────────────────────────────────┘
                              │
                              ▼
┌─────────────────────────────────────────────────────────────┐
│ Determine a threshold value based on: a first BVD value that a value of │
│  the BVD does not exceed; and a first prefix value coding the first BVD │
│                              3204                                       │
└─────────────────────────────────────────────────────────────┘
                              │
                              ▼
┌─────────────────────────────────────────────────────────────┐
│ Determine the suffix part, wherein a bit-length of the suffix parts is  │
│ determined based on the prefix part and based on whether a property of  │
│       the prefix part is greater than the threshold value               │
│                              3206                                       │
└─────────────────────────────────────────────────────────────┘
                              │
                              ▼
┌─────────────────────────────────────────────────────────────┐
│   Decode the BVD to the value using the prefix part and the determined  │
│                              suffix part                                │
│                              3208                                       │
└─────────────────────────────────────────────────────────────┘
```

BLOCK VECTOR DIFFERENCE (BVD) CODING

CROSS-REFERENCE TO RELATED APPLICATIONS

This application claims the benefit of U.S. Provisional Application No. 63/418,855, filed on Oct. 24, 2022. This application is also related to U.S. Provisional Application No. 63/417,830, filed on Oct. 20, 2022, and U.S. Provisional Application No. 63/418,659, filed on Oct. 24, 2022. Each of the above referenced applications is hereby incorporated by reference in its entirety.

BACKGROUND

A computing device processes video for storage, transmission, reception, and/or display. Processing a video comprises encoding and/or decoding, for example, to reduce a data size associated with the video.

SUMMARY

The following summary presents a simplified summary of certain features. The summary is not an extensive overview and is not intended to identify key or critical elements.

A video may comprise a sequence of frames (pictures) displayed consecutively. Predictive encoding and decoding may involve the use of information associated with reference blocks, within a frame, to encode and/or decode other blocks in the same frame. A reference block may be indicated in the form of a block vector (BV) that represents the location of the reference block with respect to a current block being encoded or decoded. The BV may be indicated as a function of a block vector predictor (BVP) (e.g., a block vector difference (BVD) for reducing signaling overhead required for directly indicating the BV. A codeword of an entropy code, used to indicate a BVD, may comprise a prefix part (e.g., indicating a prefix value) and a suffix part (e.g., indicating a prefix value). The prefix value may indicate a range of BVD values and the suffix value may indicate a specific BVD value in the range. Some video coding techniques (e.g., reconstruction-reordered intra block copy) may limit the range of possible BVD values (e.g., by limiting a reference region to be in a direction of flipping of the reference block). This may result in some codewords being unused. Efficient entropy coding may be achieved by using, for one or more selected prefix parts, suffix parts with a reduced length. The prefix parts may be selected, for example, based on a maximum quantity of codewords associated with a highest prefix value that may otherwise be required to encode the range of possible BVD values. Reduced bit lengths of the suffix parts may improve signaling efficiencies and compression performance, among other advantages.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 6 shows example binary tree and ternary tree partitions.
FIG. 16 shows an example of intra block copy (IBC) for encoding.
FIG. 21 shows an example exponential Golomb code.
FIG. 22 shows an example table with bit lengths of codewords of an entropy code.
FIG. 23 shows an example table with bit lengths of codewords of an enhanced entropy code.
FIG. 24 shows an example table with bit lengths of codewords of an enhanced entropy code.
FIG. 25 shows an example table with bit lengths of codewords of an enhanced entropy code.
FIG. 26A shows an example method for encoding a BVD.
FIG. 32 shows an example method for decoding a BVD.

DETAILED DESCRIPTION

Figure 1:
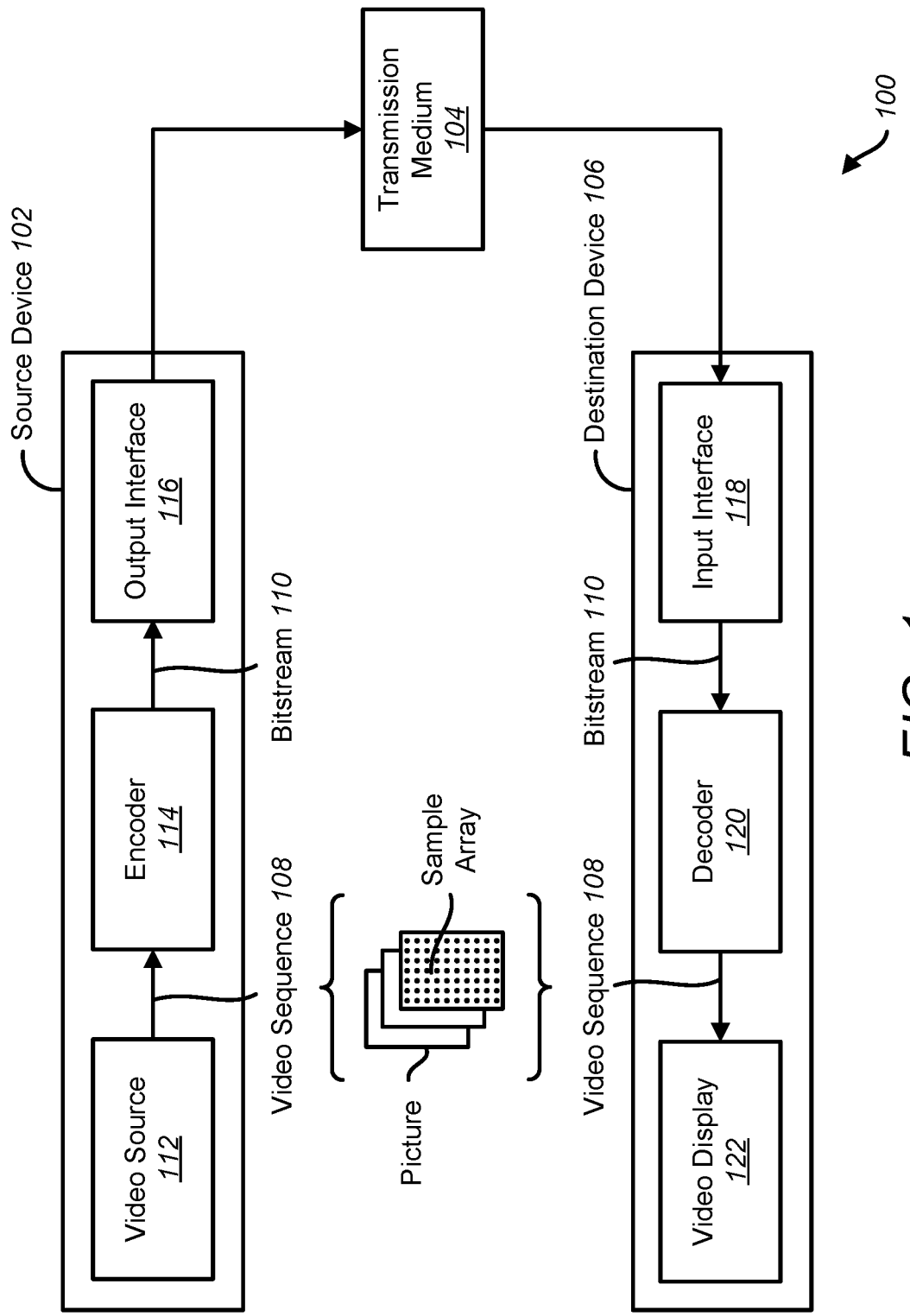
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays may be possible based on different color schemes (e.g., a red, green, blue (RGB) color scheme). A pixel, in a color picture, may refer to/comprise/be associated with all intensity values (e.g., luma component, chroma components), for a given location, in the sample arrays used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence 108. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of the video sequence 108.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks using/based on prediction types, motion vectors, and prediction modes. The encoder 114 may perform one or more of quantization and entropy coding of the transform coefficients and/or the other information used to determine the prediction blocks, for example, prior to forming the bitstream 110. The quantization and/or the entropy coding may further reduce the quantity of bits needed to store and/or transmit the video sequence 108.

The output interface 116 may be configured to write and/or store the bitstream 110 onto the transmission medium 104 for transmission to the destination device 106. The output interface 116 may be configured to send/transmit, upload, and/or stream the bitstream 110 to the destination device 106 via the transmission medium 104. The output interface 116 may comprise a wired and/or a wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. The transmission medium 104 may comprise one or more networks (e.g., the internet) or file servers configured to store and/or send/transmit encoded video data.

The destination device 106 may decode the bitstream 110 into the video sequence 108 for display. The destination device 106 may comprise one or more of an input interface 118, a decoder 120, and/or a video display 122. The input interface 118 may be configured to read the bitstream 110 stored on the transmission medium 104 by the source device 102. The input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 in accordance with one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence 108. The decoder 120 may generate the prediction blocks using/based on prediction types, prediction modes, and/or motion vectors received in the bitstream 110. The decoder 120 may determine the prediction errors using the transform coefficients received in the bitstream 110. The decoder 120 may determine the prediction errors by weighting transform basis functions using the transform coefficients. The decoder 120 may combine the prediction blocks and the prediction errors to decode the video sequence 108. The video sequence 108 at the destination device 106 may be, or may not necessarily be, the same video sequence sent, such as the video sequence 108 as sent by the source device 102. The decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 104 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate in accordance with one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC)), ITU-T H.265 and MPEG-I Part 3 (also known as Versatile Video Coding (VVC)), the WebM VP8 and VP9 codecs, and/or AOMedia Video 1 (AV1), and/or any other video coding protocol).

Figure 2:
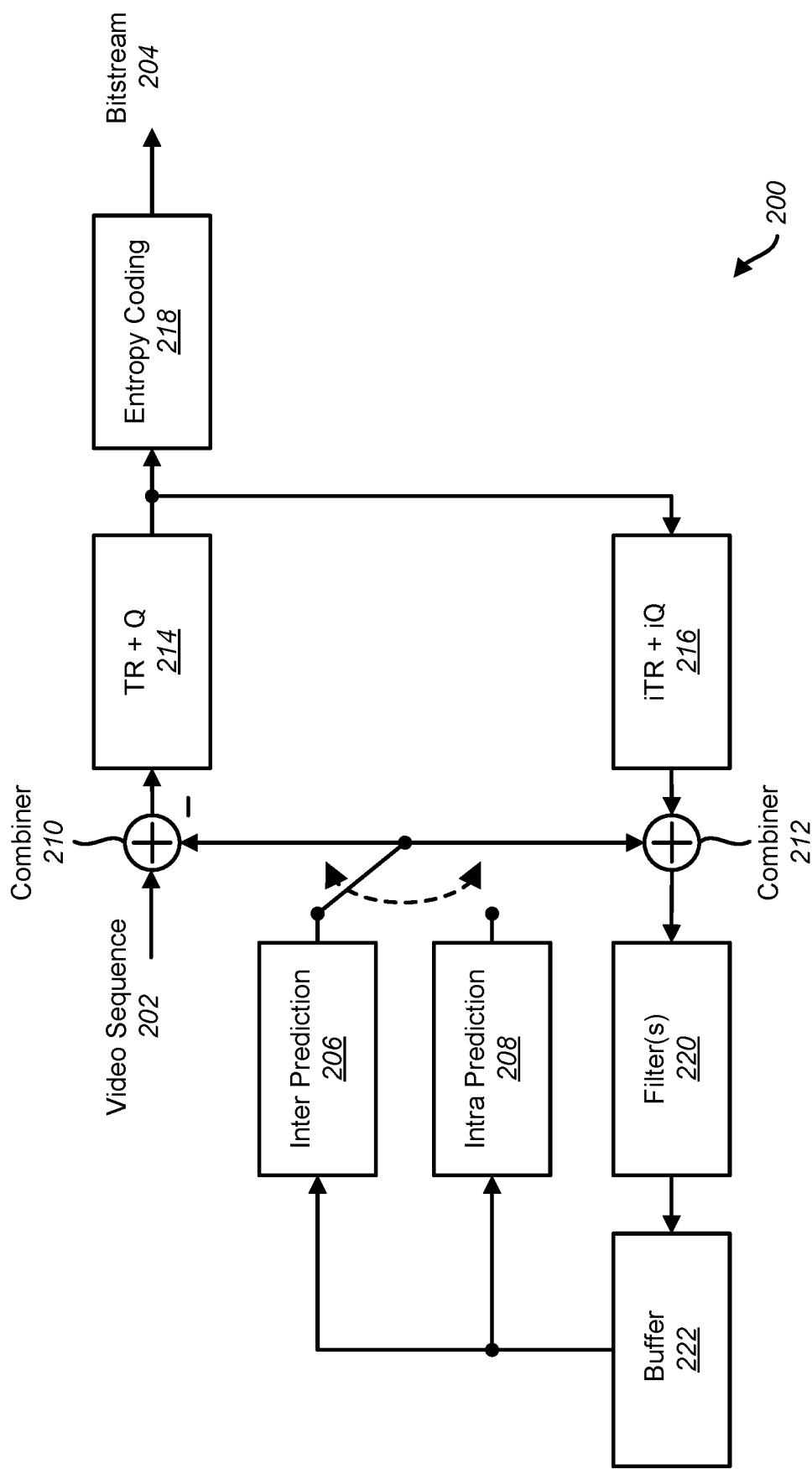
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, communication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quantization unit (TR+Q) 214, an inverse transform and quantization unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, reconstructed picture (e.g., a reference picture) of the video sequence 202. The reconstructed picture may be a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pictures of the video sequence 202 may be similar except for differences due to motion and/or affine transformation of the screen content over time.

The intra prediction unit 208 may perform intra prediction by forming a prediction block based on data from reconstructed neighboring samples of the block to be encoded within the same picture of the video sequence 202. The reconstructed sample may be a sample that was encoded and then decoded. The intra prediction unit 208 may exploit spatial redundancy or similarities in scene content within a picture of the video sequence 202 to determine the prediction block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/transmitted to a decoder for accurate decoding of the video sequence 202.

The transform and quantization unit (TR+Q) 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit (iTR+iQ) 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of the video sequence 202.

The encoder 200 may further comprise an encoder control unit. The encoder control unit may be configured to control one or more units of the encoder 200 as shown in FIG. 2. The encoder control unit may control the one or more units of the encoder 200 such that the bitstream 204 may be generated in conformance with the requirements of one or more proprietary coding protocols, industry video coding standards, and/or any other video cording protocol. For example, the encoder control unit may control the one or more units of the encoder 200 such that bitstream 204 may be generated in conformance with one or more of ITU-T H.263, AVC, HEVC, VVC, VP8, VP9, AV1, and/or any other video coding standard/format.

The encoder control unit may attempt to minimize (or reduce) the bitrate of bitstream 204 and/or maximize (or increase) the reconstructed video quality (e.g., within the constraints of a proprietary coding protocol, industry video coding standard, and/or any other video cording protocol). For example, the encoder control unit may attempt to minimize or reduce the bitrate of bitstream 204 such that the reconstructed video quality may not fall below a certain level/threshold, and/or may attempt to maximize or increase the reconstructed video quality such that the bit rate of bitstream 204 may not exceed a certain level/threshold. The encoder control unit may determine/control one or more of: partitioning of the pictures of the video sequence 202 into blocks, whether a block is inter predicted by the inter prediction unit 206 or intra predicted by the intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). The prediction type, prediction information, and/or transform and/or quantization parameters may be packed with the prediction error to form the bitstream 204.

The encoder 200 is merely an example and encoders different from the encoder 200 and/or modified versions of the encoder 200 may perform the methods and processes as described herein. For example, the encoder 200 may comprise other components and/or arrangements. One or more of the components shown in FIG. 2 may be optionally included in the encoder 200 (e.g., the entropy coding unit 218 and/or the filters(s) 220).

Figure 3:
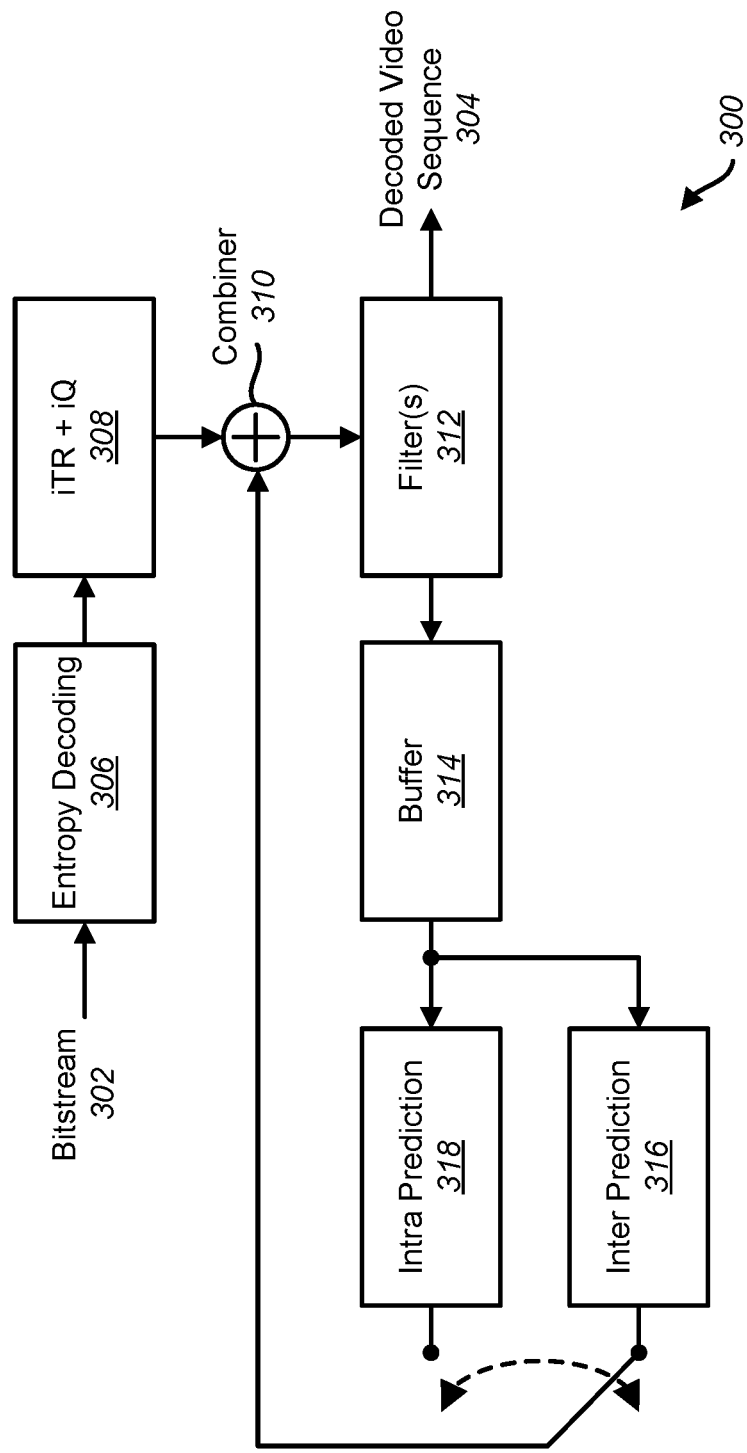
FIG. 3 shows an example decoder.

FIG. 3 shows an example decoder. A decoder 300 as shown in FIG. 3 may implement one or more processes described herein. The decoder 300 may decode a bitstream 302 into a decoded video sequence 304 for display and/or some other form of consumption. The decoder 300 may be implemented in the video encoding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the intra prediction unit 318 or the inter prediction unit 316 (e.g., as described above with respect to encoder 200 in FIG. 2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bitstream 302. The decoded video sequence 304 may be output from the filter(s) 312 as shown in FIG. 3.

The decoder 300 is merely an example and decoders different from the decoder 300 and/or modified versions of the decoder 300 may perform the methods and processes as described herein. For example, the decoder 300 may have other components and/or arrangements. One or more of the components shown in FIG. 3 may be optionally included in the decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of 2n×2n samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtree. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and/or intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
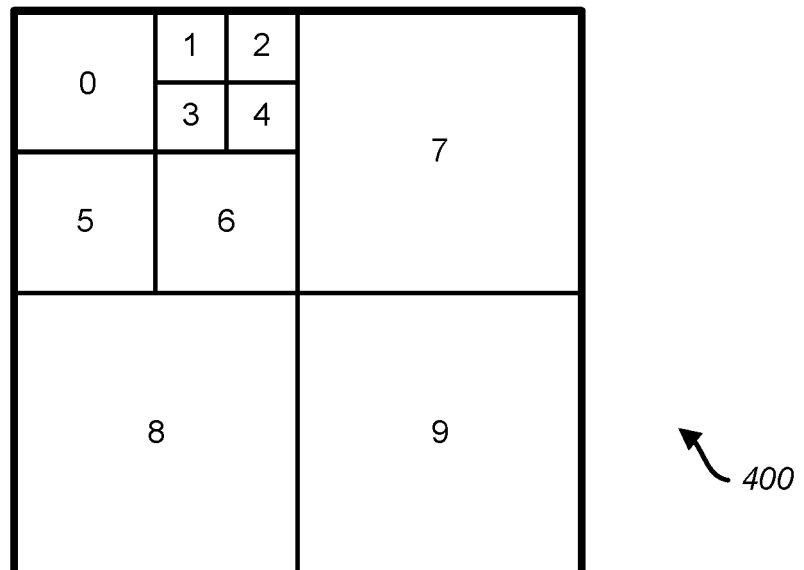
FIG. 4 shows an example quadtree partitioning of a coding tree block (CTB).
Figure 5:
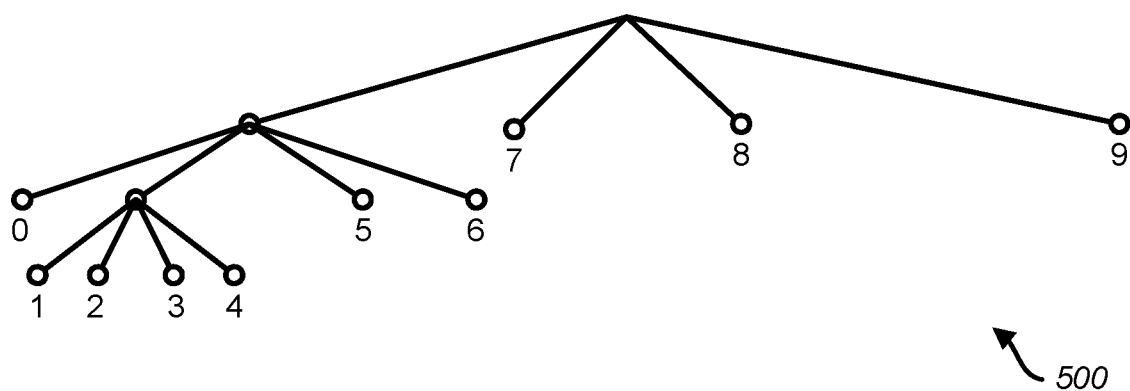
FIG. 5 shows an example quadtree corresponding to the example quadtree partitioning of the CTB in FIG. 4.

FIG. 4 shows an example quadtree partitioning of a CTB. FIG. 5 shows a quadtree corresponding to the example quadtree partitioning of the CTB 400 in FIG. 4. As shown in FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CBs of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., 10 CB leaf nodes of the quadtree 500 as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

FIG. 6 shows example binary tree and ternary tree partitions. A binary tree partition may divide a parent block in half in either a vertical direction 602 or a horizontal direction 604. The resulting partitions may be half in size as compared to the parent block. The resulting partitions may correspond to sizes that are less than and/or greater than half of the parent block size. A ternary tree partition may divide a parent block into three parts in either a vertical direction 606 or a horizontal direction 608. FIG. 6 shows an example in which the middle partition may be twice as large as the other two end partitions in the ternary tree partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as a combination of quadtree and multi-type tree partitioning (quadtree+multi-type tree partitioning) because of the addition of binary and/or ternary tree partitioning to quadtree partitioning.

Figure 7:
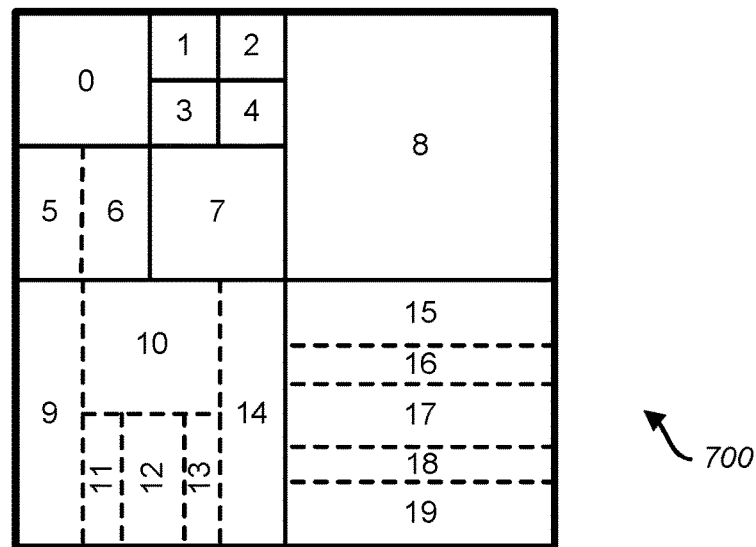
FIG. 7 shows an example of combined quadtree and multi-type tree partitioning of a CTB.
Figure 8:
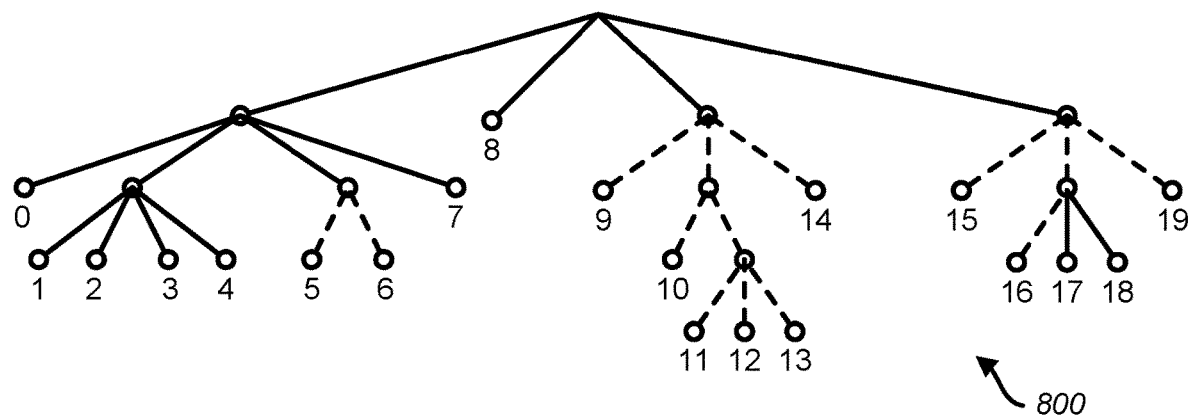
FIG. 8 shows a tree corresponding to the combined quadtree and multi-type tree partitioning of the CTB shown in FIG. 7.

FIG. 7 shows an example of combined quadtree and multi-type tree partitioning of a CTB. FIG. 8 shows a tree corresponding to the combined quadtree and multi-type tree partitioning of the CTB 700 shown in FIG. 7. In both FIGS. 7 and 8, quadtree splits are shown in solid lines and multi-type tree splits are shown in dashed lines. The CTB 700 is shown with the same quadtree partitioning as the CTB 400 described in FIG. 4, and a description of the quadtree partitioning of the CTB 700 is omitted. The quadtree partitioning of the CTB 700 is merely an example and a CTB may be quadtree partitioned in a manner different from the CTB 700. Additional multi-type tree partitions of the CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and/or ternary tree partitions.

The leaf CB 5 of FIG. 4 may be partitioned into two CBs based on a vertical binary tree partitioning. The two resulting CBs may be leaf CBs respectively labeled 5 and 6 in FIGS. 7 and 8. The leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. The leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBs respectively labeled 16, 17, and 18 in FIGS. 7 and 8.

Altogether, the CTB 700 may be partitioned into 20 leaf CBs respectively labeled 0-19. The 20 leaf CBs may correspond to 20 leaf nodes (e.g., 20 leaf nodes of the tree 800 shown in FIG. 8). The resulting combination of quadtree and multi-type tree partitioning of the CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other coding standard/format) may define various units (e.g., in addition to specifying various blocks (e.g., CTBs, CBs, PBs, TBs)). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or a sub-block in the VP8 coding format, a superblock or a sub-block in the VP9 coding format, and/or a superblock or a sub-block in the AV1 coding format.

Samples of a block to be encoded (e.g., a current block) may be predicted from samples of the column immediately adjacent to the left-most column of the current block and samples of the row immediately adjacent to the top-most row of the current block, such as in intra prediction. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining the predicted samples with the prediction error.

Figure 9:
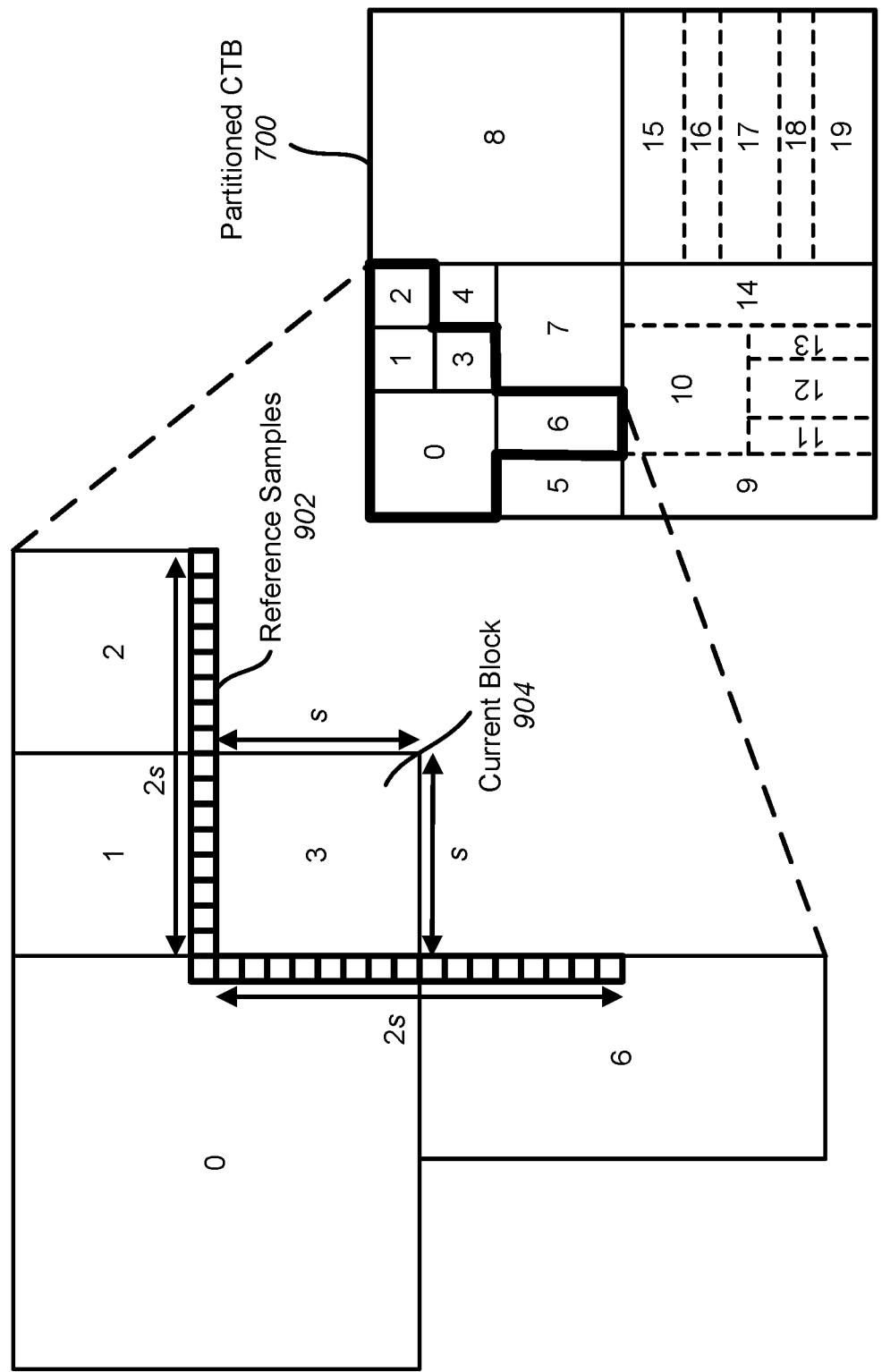
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

The current block 904 may be w×h samples in size. The reference samples 902 may comprise: 2w samples (or any other quantity of samples) of the row immediately adjacent to the top-most row of the current block 904, 2h samples (or any other quantity of samples) of the column immediately adjacent to the left-most column of the current block 904, and the top left neighboring corner sample to the current block 904. The current block 904 may be square, such that w=h=s. In other examples, a current block need not be square, such that w≠h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples 902 may allow identical prediction results to be determined at both the encoder and decoder. Samples from neighboring blocks 0, 1, and 2 may be available to construct the reference samples 902 given that these blocks are encoded and reconstructed at an encoder and decoded at a decoder prior to coding of the current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from neighboring block 6 may not be available due to the sequence order for encoding/decoding (e.g., because the block 6 may not have already been encoded and reconstructed at the encoder and/or decoded at the decoder based on the sequence order for encoding/decoding).

Unavailable samples from the reference samples 902 may be filled with one or more of the available reference samples 902. For example, an unavailable reference sample may be filled with a nearest available reference sample. The nearest available reference sample may be determined by moving in a clock-wise direction through the reference samples 902 from the position of the unavailable reference. The reference samples 902 may be filled with the mid-value of the dynamic range of the picture being coded, for example, if no reference samples are available.

The reference samples 902 may be filtered based on the size of current block 904 being coded and an applied intra prediction mode. FIG. 9 shows an exemplary determination of reference samples for intra prediction of a block. Reference samples may be determined in a different manner than described above. For example, multiple reference lines may be used in other instances (e.g., in VVC).

Samples of the current block 904 may be intra predicted based on the reference samples 902, for example, based on (e.g., after) determination and (optionally) filtration of the reference samples. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
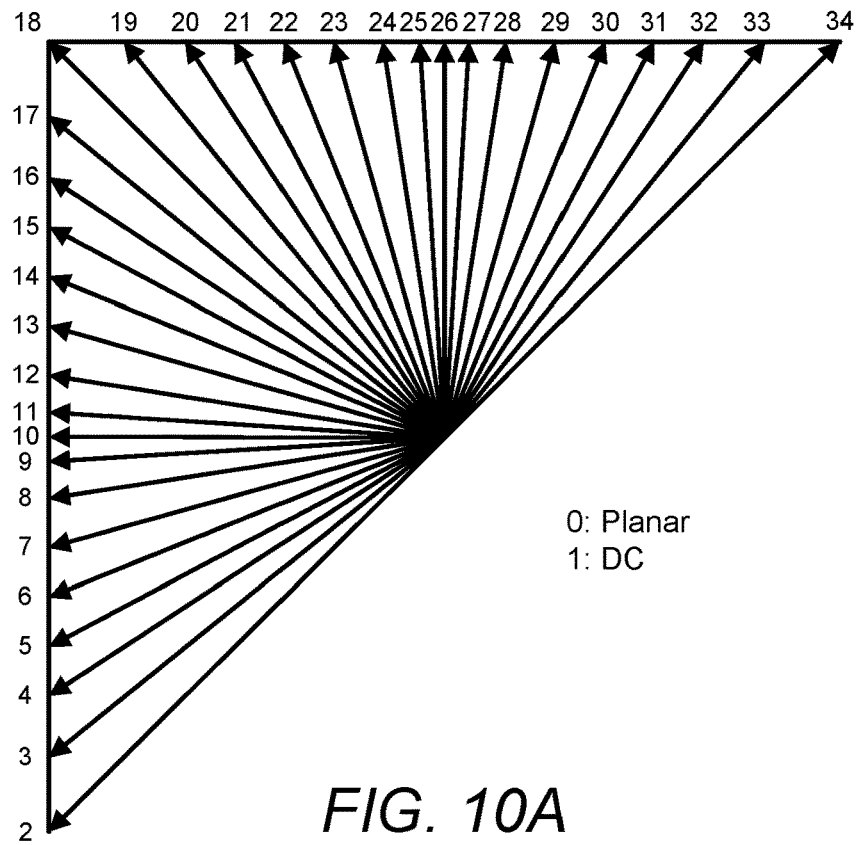
FIGS. 10A and 10B show example intra prediction modes.
Figure 10B:
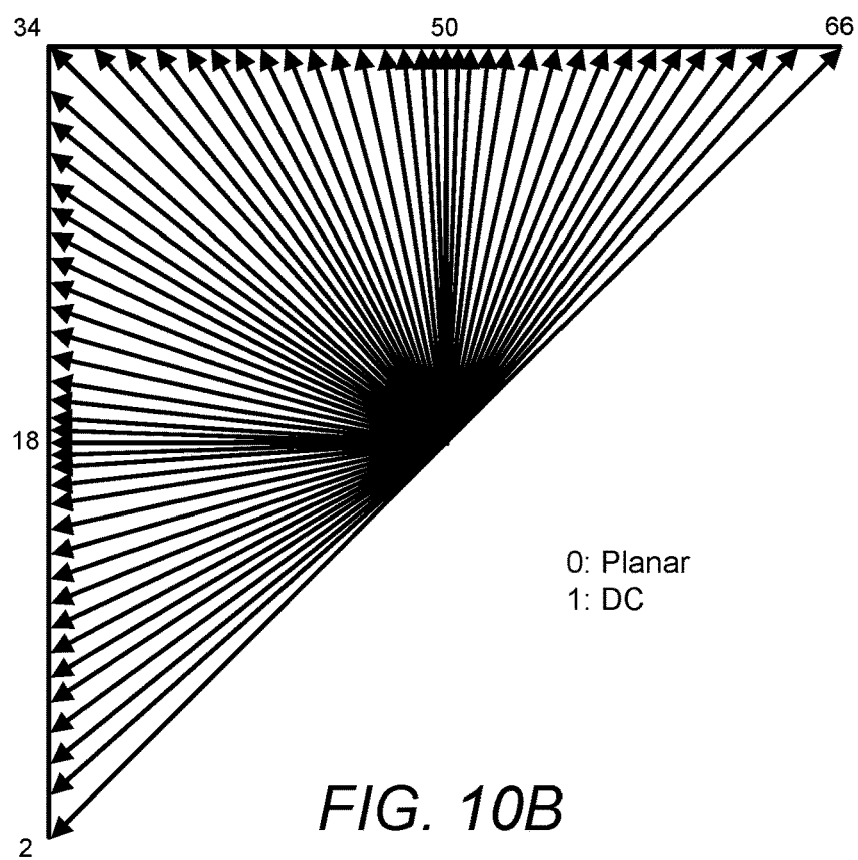

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
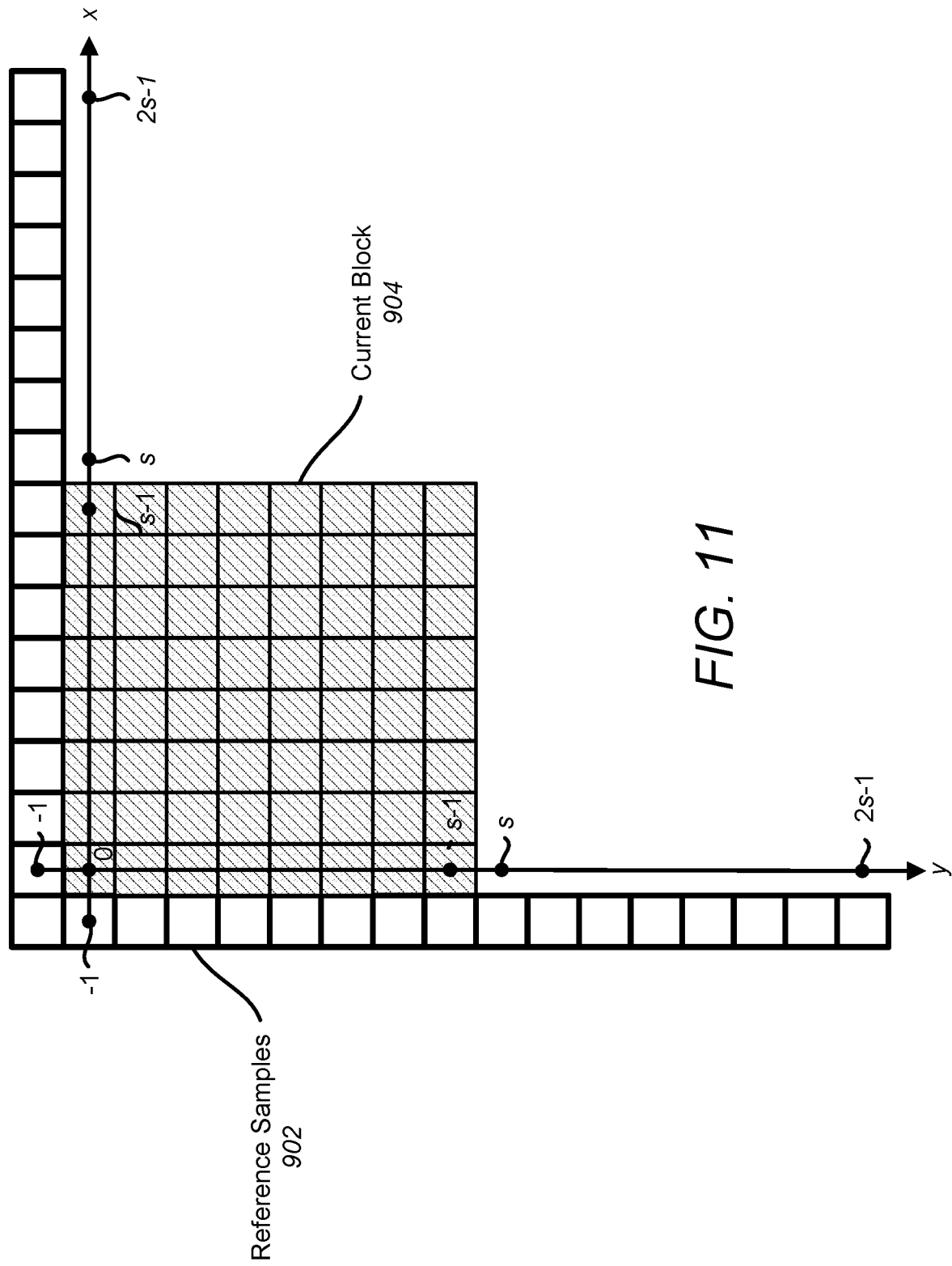
FIG. 11 shows a current block and corresponding reference samples.

FIG. 11 shows a current block and corresponding reference samples. In FIG. 11, the current block 904 and the reference samples 902 from FIG. 9 are shown in a two-dimensional x, y plane, where a sample may be referenced as p[x][y]. In order to simplify the prediction process, the reference samples 902 may be placed in two, one-dimensional arrays. The reference samples 902, above the current block 904, may be placed in the one-dimensional array $ref_1[x]$:

$$ref_1[x]=p[-1+x][-1], (x \geq 0). \quad (1)$$

The reference samples 902 to the left of the current block 904 may be placed in the one-dimensional array $ref_2[y]$:

$$ref_2[y]=p[-1][-1+y], (y \geq 0). \quad (2)$$

The prediction process may comprise determination of a predicted sample p[x][y] (e.g., a predicted value) at a location [x][y] in the current block 904. For planar mode, a sample at the location [x][y] in the current block 904 may be predicted by determining/calculating the mean of two interpolated values. The first of the two interpolated values may be based on a horizontal linear interpolation at the location [x][y] in the current block 904. The second of the two interpolated values may be based on a vertical linear interpolation at the location [x][y] in the current block 904. The predicted sample p[x][y] in the current block 904 may be determined/calculated as:

$$p[x][y] = \frac{1}{2 \cdot s}(h[x][y] + v[x][y] + s), \quad (3)$$

where $$h[x][y] = (s - x - 1) \cdot ref_2[y] + (x + 1) \cdot ref_1[s] \quad (4)$$

may be the horizontal linear interpolation at the location [x][y] in the current block 904 and $$v[x][y]=(s-y-1)\cdot ref_1[x]+(y+1)\cdot ref_2[s] \quad (5)$$

may be the vertical linear interpolation at the location [x][y] in the current block 904. s may be equal to a length of a side (e.g., a number of samples on a side) of the current block 904.

A sample at a location [x][y] in the current block 904 may be predicted by the mean of the reference samples 902, such as for a DC mode. The predicted sample p[x][y] in the current block 904 may be determined/calculated as:

$$p[x][y] = \frac{1}{2 \cdot s}\left(\sum_{x=0}^{s-1} ref_1[x] + \sum_{y=0}^{s-1} ref_2[y]\right). \quad (6)$$

A sample at a location [x][y] in the current block 904 may be predicted by projecting the location [x][y] in a direction specified by a given angular mode to a point on the horizontal or vertical line of samples comprising the reference samples 902, such as for an angular mode. The sample at the location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
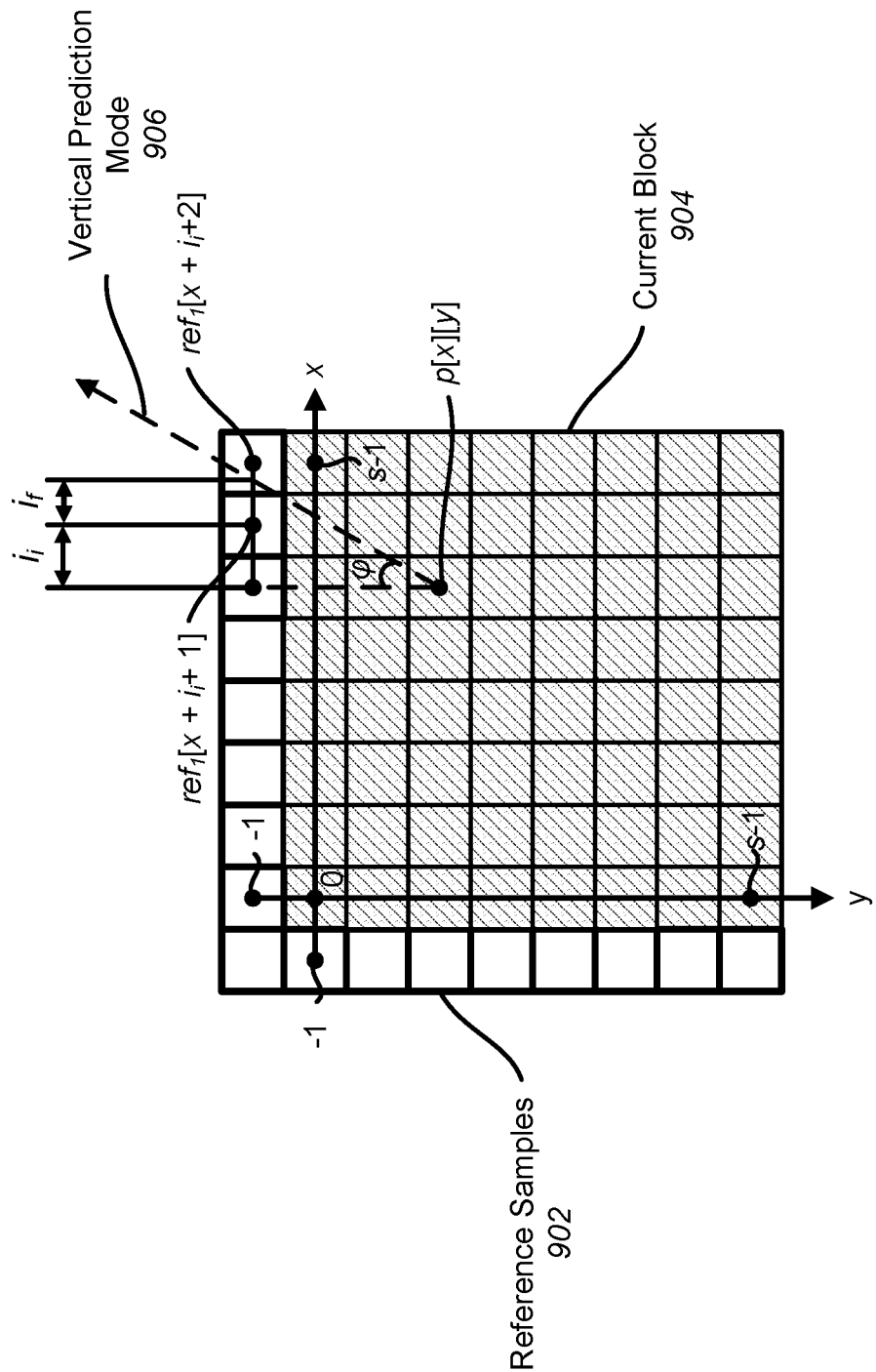
FIG. 12 shows an example application of an intra prediction mode for prediction of a current block.

FIG. 12 shows an example application of an intra prediction mode for prediction of a current block. FIG. 12 specifically shows prediction of a sample at a location [x][y] in the current block 904 for a vertical prediction mode 906. The vertical prediction mode 906 may be given by an angle φ with respect to the vertical axis. The location [x][y] in the current block 904, in vertical prediction modes, may be projected to a point (e.g., a projection point) on the horizontal line of reference samples $ref_1[x]$. The reference samples 902 are only partially shown in FIG. 12 for ease of illustration. As shown in FIG. 12, the projection point on the horizontal line of reference samples $ref_1[x]$ may not be exactly on a reference sample. A predicted sample p[x][y] in the current block 904 may be determined/calculated by linearly interpolating between the two reference samples, for example, if the projection point falls at a fractional sample position between two reference samples. The predicted sample p[x][y] may be determined/calculated as:

$$p[x][y]=(1-i_f) \cdot ref_1[x+i_i+1]+i_f \cdot ref_1[x+i_i+2]. \quad (7)$$

$i_i$ may be the integer part of the horizontal displacement of the projection point relative to the location [x][y]. $i_i$ may be determined/calculated as a function of the tangent of the angle φ of the vertical prediction mode 906 as:

$$i_i=\lfloor (y+1) \cdot \tan \varphi \rfloor. \quad (8)$$

$i_f$ may be the fractional part of the horizontal displacement of the projection point relative to the location [x][y] and may be determined/calculated as:

$$i_f=((y+1) \cdot \tan \varphi)-\lfloor (y+1) \cdot \tan \varphi \rfloor, \quad (9)$$

where $\lfloor \cdot \rfloor$ is the integer floor function.

A location [x][y] of a sample in the current block 904 may be projected onto the vertical line of reference samples $ref_2[y]$, such as for horizontal prediction modes. A predicted sample p[x][y] for horizontal prediction modes may be determined/calculated as:

$$p[x][y]=(1-i_f) \cdot ref_2[y+i_i+1]+i_f \cdot ref_2[y+i_i+2]. \quad (10)$$

$i_i$ may be the integer part of the vertical displacement of the projection point relative to the location [x][y]. $i_i$ may be determined/calculated as a function of the tangent of the angle φ of the horizontal prediction mode as:

$$i_i=\lfloor (x+1) \cdot \tan \varphi \rfloor. \quad (11)$$

if may be the fractional part of the vertical displacement of the projection point relative to the location [x][y]. $i_f$ may be determined/calculated as:

$$i_f=((x+1) \cdot \tan \varphi)-\lfloor (x+1) \cdot \tan \varphi \rfloor, \quad (12)$$

where $\lfloor \cdot \rfloor$ is the integer floor function.

The interpolation functions given by Equations (7) and (10) may be implemented by an encoder and/or a decoder (e.g., the encoder 200 in FIG. 2 and/or the decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by $(1-i_f)$ and if. The predicted sample p[x][y], in angular intra prediction, may be calculated with some predefined level of sample accuracy (e.g., 1/32 sample accuracy, or accuracy defined by any other metric). For 1/32 sample accuracy, the set of two-tap FIR interpolation filters may comprise up to 32 different two-tap FIR interpolation filters one for each of the 32 possible values of the fractional part of the projected displacement if. In other examples, different levels of sample accuracy may be used.

The FIR filters may be used for predicting chroma samples and/or luma samples. For example, the two-tap interpolation FIR filter may be used for predicting chroma samples and a same and/or a different interpolation technique/filter may be used for luma samples. For example, a four-tap FIR filter may be used to determine a predicted value of a luma sample. Coefficients of the four tap FIR filter may be determined based on if (e.g., similar to the two-tap FIR filter). For 1/32 sample accuracy, a set of 32 different four-tap FIR filters may comprise up to 32 different four-tap FIR filters one for each of the 32 possible values of the fractional part of the projected displacement if. In other examples, different levels of sample accuracy may be used. The set of four-tap FIR filters may be stored in a look-up table (LUT) and referenced based on if. A predicted sample p[x][y], for vertical prediction modes, may be determined based on the four-tap FIR filter as:

$$p[x][y] = \sum_{i=0}^{3} fT[i] \cdot ref_1[x + iIdx + i], \quad (13)$$

where fT[i], i=0 . . . 3, may be the filter coefficients, and Idx is integer displacement. A predicted sample p[x][y], for horizontal prediction modes, may be determined based on the four-tap FIR filter as:

$$p[x][y] = \sum_{i=0}^{3} fT[i] \cdot ref_2[y + iIdx + i]. \quad (14)$$

Supplementary reference samples may be determined/constructed if the location [x][y] of a sample in the current block 904 to be predicted is projected to a negative x coordinate. The location [x][y] of a sample may be projected to a negative x coordinate, for example, if negative vertical prediction angles φ are used. The supplementary reference samples may be determined/constructed by projecting the reference samples in $ref_2[y]$ in the vertical line of reference samples 902 to the horizontal line of reference samples 902 using the negative vertical prediction angle φ. Supplementary reference samples may be similarly determined/constructed, for example, if the location [x][y] of a sample in the current block 904 to be predicted is projected to a negative y coordinate. The location [x][y] of a sample may be projected to a negative y coordinate, for example, if negative horizontal prediction angles φ are used. The supplementary reference samples may be determined/constructed by projecting the reference samples in $ref_1[x]$ on the horizontal line of reference samples 902 to the vertical line of reference samples 902 using the negative horizontal prediction angle φ.

An encoder may determine/predict samples of a current block being encoded (e.g., the current block 904) for a plurality of intra prediction modes (e.g., using one or more of the functions described herein). For example, an encoder may determine/predict samples of a current block for each of 35 intra prediction modes in HEVC and/or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may determine/select one of the intra prediction modes that results in the smallest prediction error for the current block. The encoder may determine/select the intra prediction mode to encode the current block based on a rate-distortion measure (e.g., Lagrangian rate-distortion cost) determined using the prediction errors. The encoder may send an indication of the determined/selected intra prediction mode and its corresponding prediction error (e.g., residual) to a decoder for decoding of the current block.

A decoder may determine/predict samples of a current block being decoded (e.g., the current block 904) for an intra prediction mode. For example, a decoder may receive an indication of an intra prediction mode (e.g., an angular intra prediction mode) from an encoder for a current block. The decoder may construct a set of reference samples and perform intra prediction based on the intra prediction mode indicated by the encoder for the current block in a similar manner (e.g., as described above for the encoder). The decoder may add predicted values of the samples (e.g., determined based on the intra prediction mode) of the current block to a residual of the current block to reconstruct the current block. A decoder need not receive an indication of an angular intra prediction mode from an encoder for a current block. A decoder may determine an intra prediction mode, for example, based on other criteria. While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of a video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of the object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for a current block. An encoder may determine a difference, for example, based on/after determining/generating a prediction for a current block (e.g., using inter prediction). The difference may be a prediction error and/or as a residual. The encoder may store and/or send (e.g., signal), in/via a bitstream, the prediction error and/or other related prediction information. The prediction error and/or other related prediction information may be used for decoding and/or other forms of consumption. A decoder may decode the current block by predicting the samples of the current block (e.g., by using the related prediction information) and combining the predicted samples with the prediction error.

Figure 13A:
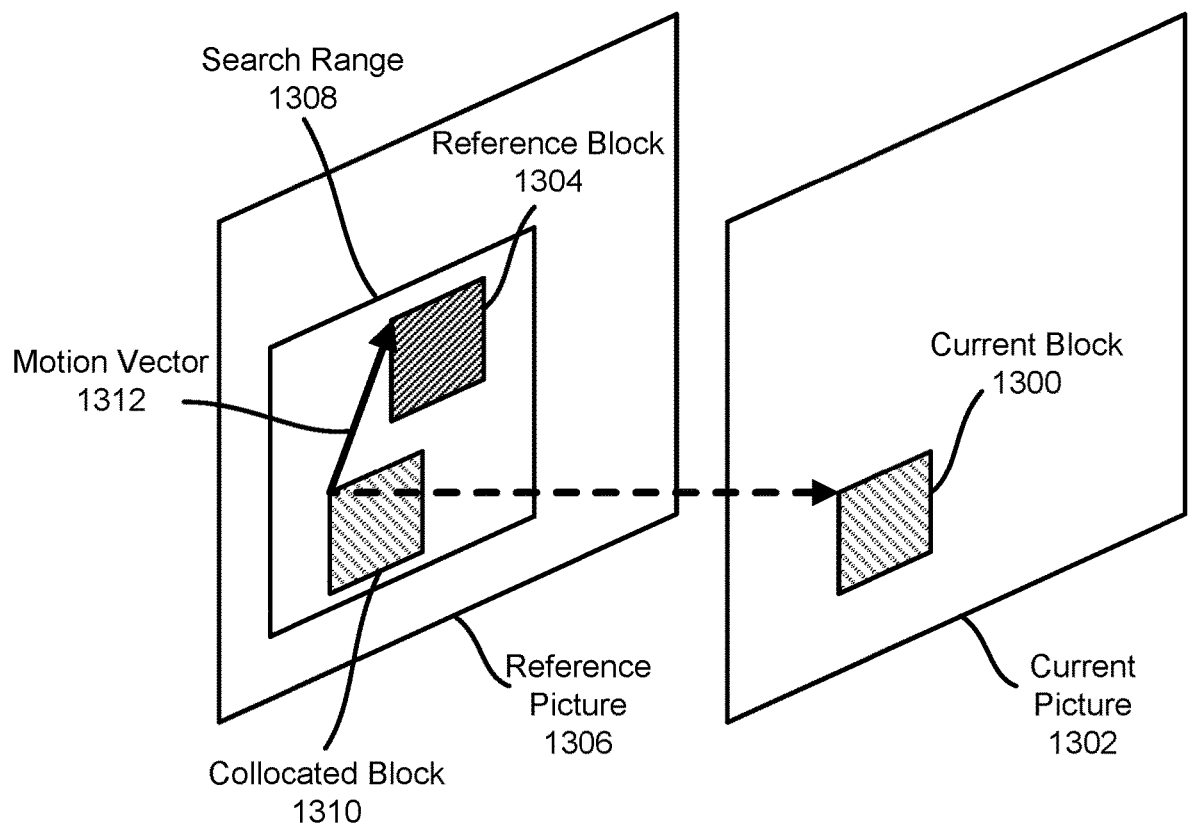
FIG. 13A shows an example of inter prediction.

FIG. 13A shows an example of inter prediction. The inter prediction may be performed for a current block 1300 in a current picture 1302 being encoded. An encoder (e.g., the encoder 200 as shown in FIG. 2) may perform inter prediction to determine and/or generate a reference block 1304 in a reference picture 1306. The reference block 1304 may be used to predict the current block 1300. Reference pictures (e.g., the reference picture 1306) may be prior decoded pictures available at the encoder and/or a decoder. Availability of a prior decoded picture may depend/be based on whether the prior decoded picture is available in a decoded picture buffer, at the time, the current block 1300 is being encoded and/or decoded. The encoder may search the one or more reference pictures 1306 for a block that is similar (or substantially similar) to the current block 1300. The encoder may determine the best matching block from the blocks tested during the searching process. The best matching block may be a reference block 1304. The encoder may determine that the reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of the reference block 1304 and original samples of the current block 1300.

The encoder may search for the reference block 1304 within a reference region (e.g., a search range 1308). The reference region (e.g., a search range 1308) may be positioned around a collocated position (or block) 1310, of the current block 1300, in the reference picture 1306. The collocated block 1310 may have a same position in the reference picture 1306 as the current block 1300 in the current picture 1302. The reference region (e.g., a search range 1308) may at least partially extend outside of the reference picture 1306. Constant boundary extension may be used, for example, if the reference region (e.g., a search range 1308) extends outside of the reference picture 1306. The constant boundary extension may be used such that values of the samples in a row or a column of reference picture 1306, immediately adjacent to a portion of the reference region (e.g., a search range 1308) extending outside of the reference picture 1306, may be used for sample locations outside of the reference picture 1306. A subset of potential positions, or all potential positions, within the reference region (e.g., a search range 1308) may be searched for the reference block 1304. The encoder may utilize one or more search implementations to determine and/or generate the reference block 1304. For example, the encoder may determine a set of candidate search positions based on motion information of neighboring blocks (e.g., a motion vector 1312) to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of the reference block 1304 may be indicated by a reference index pointing into a reference picture list comprising the reference picture 1306.

Figure 13B:
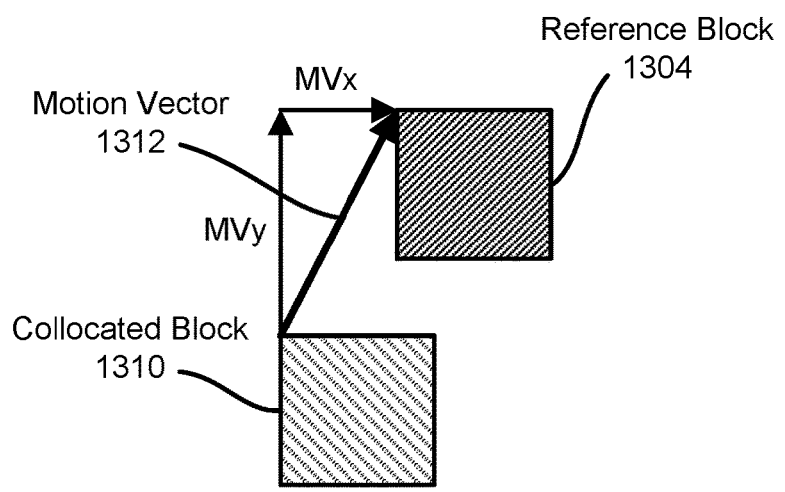
FIG. 13B shows an example motion vector.

FIG. 13B shows an example motion vector. A displacement between the reference block 1304 and the current block 1300 may be interpreted as an estimate of the motion between the reference block 1304 and the current block 1300 across their respective pictures. The displacement may be represented by a motion vector 1312. For example, the motion vector 1312 may be indicated by a horizontal component (MVx) and a vertical component (MVy) relative to the position of the current block 1300. A motion vector (e.g., the motion vector 1312) may have fractional or integer resolution. A motion vector with fractional resolution may point between two samples in a reference picture to provide a better estimation of the motion of the current block 1300. For example, a motion vector may have ½, ¼, ⅛, 1/16, 1/32, or any other fractional sample resolution. Interpolation between the two samples at integer positions may be used to generate a reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between the reference block 1304 and the current block 1300. The encoder may determine the difference between the reference block 1304 and the current block 1300, for example, based on/after the reference block 1304 is determined and/or generated, using inter prediction, for the current block 1300. The difference may be a prediction error and/or a residual. The encoder may store and/or send (e.g., signal), in/via a bitstream, the prediction error and/or related motion information. The prediction error and/or the related motion information may be used for decoding (e.g., decoding the current block 1300) and/or other forms of consumption. The motion information may comprise the motion vector 1312 and/or a reference indicator/index. The reference indicator may indicate the reference picture 1306 in a reference picture list. The motion information may comprise an indication of the motion vector 1312 and/or an indication of the reference index. The reference index may indicate reference picture 1306 in the reference picture list. A decoder may decode the current block 1300 by determining and/or generating the reference block 1304. The decoder may determine and/or generate the reference block 1304, for example, based on the prediction error and/or the related motion information. The reference block 1304 may correspond to/form (e.g., be considered as) a prediction of the current block 1300. The decoder may decode the current block 1300 based on combining the prediction with the prediction error.

Inter prediction, as shown in FIG. 13A, may be performed using one reference picture 1306 as a source of a prediction for the current block 1300. Inter prediction based on a prediction of a current block using a single picture may be referred to as uni-prediction.

Inter prediction of a current block, using bi-prediction, may be based on two pictures. Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uni-prediction and/or bi-prediction) may depend on a slice type of current block. For example, for P slices, only uni-prediction may be available/used for performing inter prediction. For B slices, either uni-prediction or bi-prediction may be available/used for performing inter prediction. An encoder may determine and/or generate a reference block, for predicting a current block, from a reference picture list 0, for example, if the encoder is using uni-prediction. An encoder may determine and/or generate a first reference block, for predicting a current block, from a reference picture list 0 and determine and/or generate a second reference block, for predicting the current block, from a reference picture list 1, for example, if the encoder is using bi-prediction.

Figure 14:
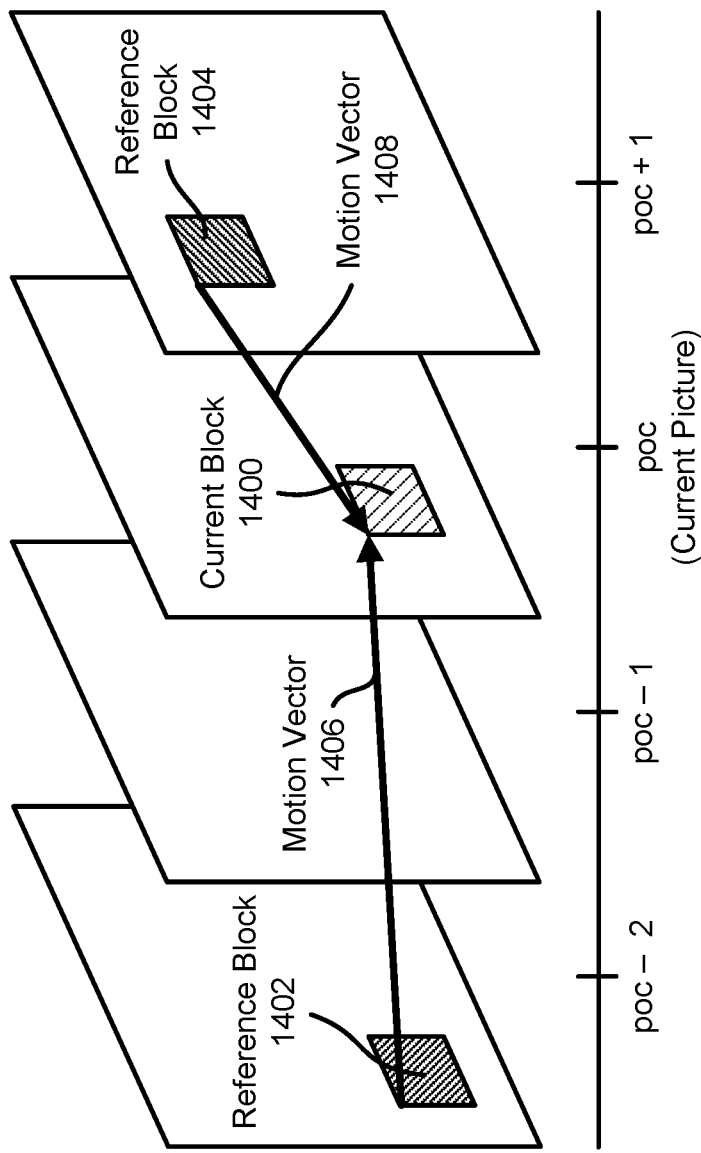
FIG. 14 shows an example of bi-prediction.

FIG. 14 shows an example of bi-prediction. Two reference blocks 1402 and 1404 may be used to predict a current block 1400. The reference block 1402 may be in a reference picture of one of reference picture list 0 or reference picture list 1. The reference block 1404 may be in a reference picture of another one of reference picture list 0 or reference picture list 1. As shown in FIG. 14, the reference block 1402 may be in a first picture that precedes (e.g., in time) a current picture of the current block 1400, and the reference block 1404 may be in a second picture that succeeds (e.g., in time) the current picture of the current block 1400. The first picture may precede the current picture in terms of a picture order count (POC). The second picture may succeed the current picture in terms of the POC. The reference pictures may both precede or both succeed the current picture in terms of POC. A POC may be/indicate an order in which pictures are output (e.g., from a decoded picture buffer). A POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to one or more inter prediction reference blocks. An encoder may enable the use of weighted prediction using a flag in a picture parameter set (PPS). The encoder may send/signal the weight and/or offset parameters in a slice segment header for the current block 1400. Different weight and/or offset parameters may be sent/signaled for luma and/or chroma components.

The encoder may determine and/or generate the reference blocks 1402 and 1404 for the current block 1400 using inter prediction. The encoder may determine a difference between the current block 1400 and each of the reference blocks 1402 and 1404. The differences may be prediction errors or residuals. The encoder may store and/or send/signal, in/via a bitstream, the prediction errors and/or their respective related motion information. The prediction errors and their respective related motion information may be used for decoding and/or other forms of consumption. The motion information for the reference block 1402 may comprise a motion vector 1406 and/or a reference indicator/index. The reference indicator may indicate a reference picture, of the reference block 1402, in a reference picture list. The motion information for the reference block 1402 may comprise an indication of the motion vector 1406 and/or an indication of the reference index. The reference index may indicate the reference picture, of the reference block 1402, in the reference picture list.

The motion information for the reference block 1404 may comprise a motion vector 1408 and/or a reference index/indicator. The reference indicator may indicate a reference picture, of the reference block 1408, in a reference picture list. The motion information for the reference block 1404 may comprise an indication of motion vector 1408 and/or an indication of the reference index. The reference index may indicate the reference picture, of the reference block 1404, in the reference picture list.

A decoder may decode the current block 1400 by determining and/or generating the reference blocks 1402 and 1404. The decoder may determine and/or generate the reference blocks 1402 and 1404, for example, based on the prediction errors and/or the respective related motion information for the reference blocks 1402 and 1404. The reference blocks 1402 and 1404 may correspond to/form (e.g., be considered as) the predictions of the current block 1400. The decoder may decode the current block 1400 based on combining the predictions with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same as (or similar to) the motion of objects in the neighboring block(s). Motion information prediction techniques may comprise advanced motion vector prediction (AMVP) and/or inter prediction block merging.

An encoder (e.g., the encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, and/or blocks at or near the collocated position of the current block in other reference pictures. The encoder and/or a decoder may generate and/or determine the list of candidate MVPs.

The encoder may determine/select an MVP from the list of candidate MVPs. The encoder may send/signal, in/via a bitstream, an indication of the selected MVP and/or a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector that indicates a position (e.g., represented by a horizontal component (MVx) and a vertical component (MVy)) relative to a position of the current block being coded, the MVD may be represented by two components $MVD_x$ and $MVD_y$. $MVD_x$ and $MVD_y$ may be determined/calculated as:

$$MVD_x = MV_x - MVP_x, \quad (15)$$

$$MVD_y = MV_y - MVP_y. \quad (16)$$

MVDx and MVDy may respectively represent horizontal and vertical components of the MVD. MVPx and MVPy may respectively represent horizontal and vertical components of the MVP. A decoder (e.g., the decoder 300 as shown in FIG. 3) may decode the motion vector by adding the MVD to the MVP indicated in/via the bitstream. The decoder may decode the current block by determining and/or generating the reference block. The decoder may determine and/or generate the reference block, for example, based on the decoded motion vector. The reference block may correspond to/form (e.g., be considered as) the prediction of the current block. The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two (or any other quantity of) spatial candidate MVPs determined/derived from five (or any other quantity of) spatial neighboring blocks of a current block being coded; one (or any other quantity of) temporal candidate MVP determined/derived from two (or any other quantity of) temporal, co-located blocks (e.g., if both of the two spatial candidate MVPs are not available or are identical); and/or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
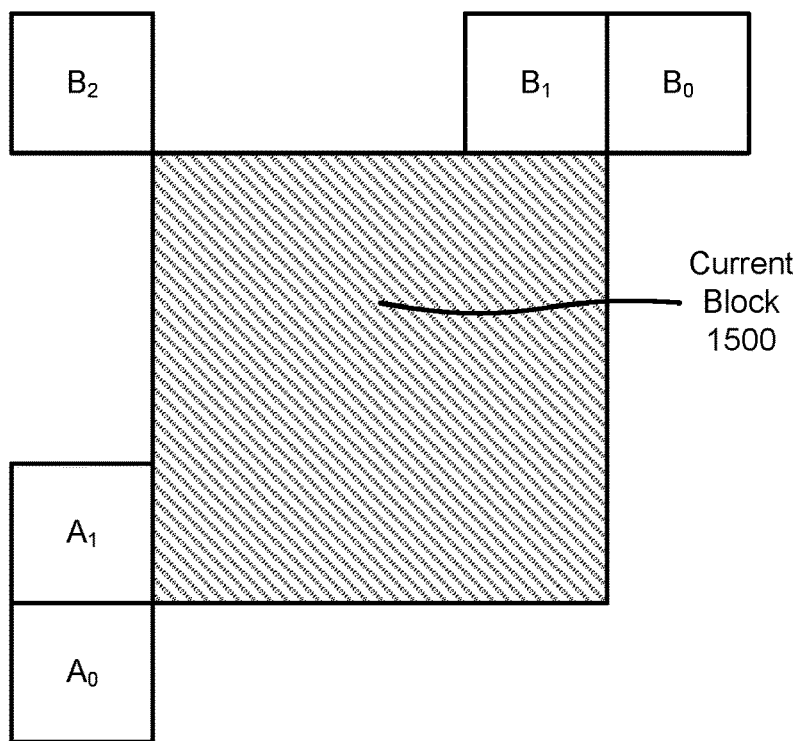
FIG. 15A shows example spatial candidate neighboring blocks for a current block.
Figure 15B:
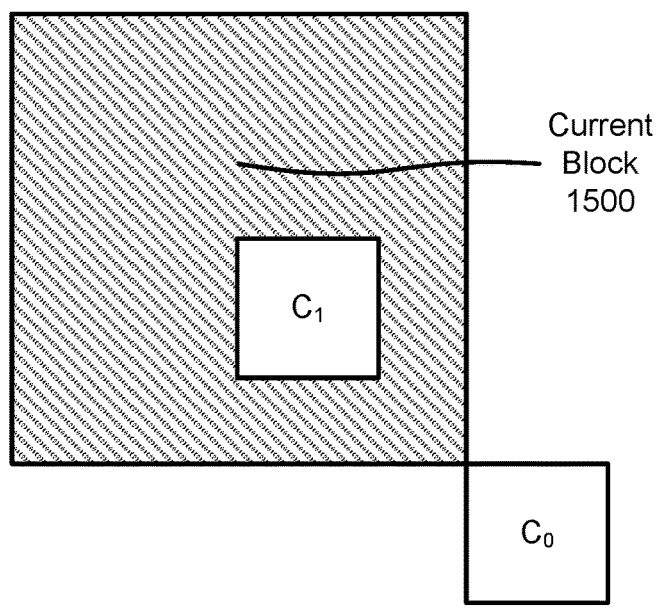
FIG. 15B shows example temporal, co-located blocks for a current block.

FIG. 15A shows spatial candidate neighboring blocks for a current block. For example, five (or any other quantity of) spatial candidate neighboring blocks may be located relative to a current block 1500 being encoded. The five spatial candidate neighboring blocks may be A0, A1, B0, B1, and B2. FIG. 15B shows temporal, co-located blocks for the current block. For example, two (or any other quantity of) temporal, co-located blocks may be located relative to the current block 1500. The two temporal, co-located blocks may be C0 and C1. The two temporal, co-located blocks may be in one or more reference pictures that may be different from the current picture of the current block 1500.

An encoder (e.g., the encoder 200 as shown in FIG. 2) may code a motion vector using inter prediction block merging (e.g., a merge mode). The encoder (e.g., using merge mode) may reuse the same motion information of a neighboring block (e.g., one of neighboring blocks A0, A1, B0, B1, and B2) for inter prediction of a current block. The encoder (e.g., using merge mode) may reuse the same motion information of a temporal, co-located block (e.g., one of temporal, co-located blocks C0 and C1) for inter prediction of a current block. An MVD need not be sent (e.g., indicated, signaled) for the current block because the same motion information as that of a neighboring block or a temporal, co-located block may be used for the current block (e.g., at the encoder and/or a decoder). A signaling overhead for sending/signaling the motion information of the current block may be reduced because the MVD need not be indicated for the current block. The encoder and/or the decoder may generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting motion information of the current block being coded. The encoder may signal/send, in/via a bit stream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding formats/standards/protocols) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may be the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

Block matching may be used (e.g., in inter prediction) to determine a reference block in a different picture than that of a current block being encoded. Block matching may be used to determine a reference block in a same picture as that of a current block being encoded. The reference block, in a same picture as that of the current block, as determined using block matching may often not accurately predict the current block (e.g., for camera captured videos). Prediction accuracy for screen content videos may not be similarly impacted, for example, if a reference block in the same picture as that of the current block is used for encoding. Screen content videos may comprise, for example, computer generated text, graphics, animation, etc. Screen content videos may comprise (e.g., may often comprise) repeated patterns (e.g., repeated patterns of text and/or graphics) within the same picture. Using a reference block (e.g., as determined using block matching), in a same picture as that of a current block being encoded, may provide efficient compression for screen content videos.

A prediction technique may be used (e.g., in HEVC, VVC, and/or any other coding standards/formats/protocols) to exploit correlation between blocks of samples within a same picture (e.g., of screen content videos). The prediction technique may be intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples of the current picture. The reference block may comprise decoded blocks of samples of the current picture prior to being processed by in-loop filtering operations (e.g., deblocking and/or SAO filtering).

FIG. 16 shows an example of IBC for encoding. The example IBC shown in FIG. 16 may correspond to screen content. The rectangular portions/sections with arrows beginning at their boundaries may be the current blocks being encoded. The rectangular portions/sections that the arrows point to may be the reference blocks for predicting the current blocks.

A reference block may be determined and/or generated, for a current block, for IBC. The encoder may determine a difference (e.g., a corresponding sample-by-sample difference) between the reference block and the current block. The difference may be a prediction error or residual. The encoder may store and/or send/signal, in/via a bitstream the prediction error and/or related prediction information. The prediction error and/or the related prediction information may be used for decoding and/or other forms of consumption. The prediction information may comprise a BV. The prediction information may comprise an indication of the BV. A decoder (e.g., the decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction of the current block. The decoder may decode the current block by combining the prediction with the prediction error.

A BV may be predictively coded (e.g., in HEVC, VVC, and/or any other coding standards/formats/protocols) before being stored and/or sent/signaled in/via a bit stream. The BV for a current block may be predictively coded based on a BV of one or more blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., the encoder 200 as shown in FIG. 2) performing BV prediction and coding may code a BV as a difference between the BV of a current block being coded and a block vector predictor (BVP). An encoder may select/determine the BVP from a list of candidate BVPs. The candidate BVPs may comprise/correspond to previously decoded BVs of neighboring blocks in the current picture of the current block. The encoder and/or a decoder may generate or determine the list of candidate BVPs.

The encoder may send/signal, in/via a bitstream, an indication of the selected BVP and a block vector difference (BVD). The encoder may indicate the selected BVP in the bitstream using an index/indicator. The index may indicate the selected BVP in the list of candidate BVPs. The BVD may be determined/calculated based on a difference between a BV of the current block and the selected BVP. For example, for a BV that indicates a position (e.g., represented by a horizontal component (BVx) and a vertical component (BVy)) relative to a position of the current block being coded, the BVD may represented by two components $BVD_x$ and $BVD_y$. $BVD_x$ and $BVD_y$ may be determined/calculated as:

$$BVD_x = BV_x - BVP_x, \quad (17)$$

$$BVD_y = BV_y - BVP_y. \quad (18)$$

BVDx and BVDy may respectively represent horizontal and vertical components of the BVD. BVPx and BVPy may respectively represent horizontal and vertical components of the BVP. A decoder (e.g., the decoder 300 as shown in FIG. 3), may decode the BV by adding the BVD to the BVP indicated in/via the bitstream. The decoder may decode the current block by determining and/or generating the reference block. The decoder may determine and/or generate the reference block, for example, based on the decoded BV. The reference block may correspond to/form (e.g., be considered as) the prediction of the current block. The decoder may decode the current block by combining the prediction with the prediction error.

A same BV as that of a neighboring block may be used for the current block and a BVD need not be separately signaled/sent for the current block, such as in the merge mode. A BVP (in the candidate BVPs), which may correspond to a decoded BV of the neighboring block, may itself be used as a BV for the current block. Not sending the BVD may reduce the signaling overhead.

A list of candidate BVPs (e.g., in HEVC, VVC, and/or any other coding standard/format/protocol) may comprise two (or more) candidates. The candidates may comprise candidates A and B. Candidates A and B may comprise: up to two (or any other quantity of) spatial candidate BVPs determined/derived from five (or any other quantity of) spatial neighboring blocks of a current block being encoded; and/or one or more of last two (or any other quantity of) coded BVs (e.g., if spatial neighboring candidates are not available). Spatial neighboring candidates may not be available, for example, if neighboring blocks are encoded using intra prediction or inter prediction. Locations of the spatial candidate neighboring blocks, relative to a current block, being encoded using IBC may be illustrated in a manner similar to spatial candidate neighboring blocks used for coding motion vectors in inter prediction (e.g., as shown in FIG. 15A). For example, five spatial candidate neighboring blocks for IBC may be respectively denoted A0, A1, B0, B1, and B2. The list of candidate BVPs may comprise more than two candidate BVPs.

A reference block may be determined as a best matching reference block to a current block (e.g., in IBC as used for screen content). Arrows (e.g., as shown in FIG. 16) may correspond to BVs that indicate respective displacements from respective current blocks to respective reference blocks that best match the respective current blocks. The reference blocks may match the respective current blocks. The determined/calculated residuals (e.g., prediction errors) may be small, if not zero.

In some instances, video content may be more efficiently encoded by considering symmetry properties. Symmetry may often be present in video content (e.g., in text character regions and computer-generated graphics in screen content video).

A reconstruction-reordered intra block copy (RRIBC) mode (e.g., also referred to as IBC mirror mode) (e.g., for screen content video coding) may advantageously consider symmetry within video content to improve the coding efficiency of IBC. The RRIBC mode may be adopted into a software algorithm (e.g., enhanced compression model (ECM) software algorithm that is currently under coordinated exploration study by the joint video exploration team (JVET) of ITU-T Video coding experts group (VCEG), ISO/IEC MPEG, or any other video coding technologies) as a potential enhancement (e.g., beyond the capabilities of VVC). A residual for a current block may be determined/calculated (e.g., if RRIBC mode is indicated for encoding the current block), for example, based on samples of a reference block (e.g., corresponding to an original reference block being encoded and decoded to form a reconstructed block) that are flipped relative to the current block (e.g., according to a flip direction indicated for the current block). The reference block may be flipped, for example, before matching and residual calculation (e.g., at the encoder). The current block (e.g., to be predicted and/or encoded) may be derived without flipping. The reference block (e.g., the reference block that was encoded) may be flipped back (e.g., at the decoder) to restore the original reference block (e.g., the original reference block before being flipped at the encoder side).

The flip direction (e.g., for the RRIBC mode) may comprise one of a horizontal direction or a vertical direction. Horizontal flipping may comprise that samples of the reference block are flipped along a vertical axis of the reference block. Vertical flipping may comprise that samples of the reference block are flipped along a horizontal axis of the reference block.

A first indication (e.g., a first syntax flag), for a current block coded in the RRIBC mode (e.g., an IBC AMVP coded block), may indicate/signal whether to use flipping (e.g., also referred to as mirror flipping) to encode/decode the current block. A second indication (e.g., a second syntax flag), for the current block, may indicate/signal a direction for flipping (e.g., vertical or horizontal). The flip direction (e.g., in IBC merge mode) may be inherited from neighboring blocks, without syntax signaling. Flipping of a reference block in a horizontal direction and a vertical direction may be represented by equations (19) and (20), respectively:

$$\text{Reference}(x,y) = \text{Sample}(w-1-x,y) \quad (19)$$

$$\text{Reference}(x,y) = \text{Sample}(x,h-1-y) \quad (20)$$

where w and h are the width and height of a current block, respectively. Sample(x,y) may indicate a sample value located at position (x, y). Reference(x,y) may indicate a corresponding reference sample value, for example, after flipping at position (x, y). Equation (19) shows, for horizontal flipping, that the reference block is flipped in a horizontal direction by sampling from right to left. Equation (20) shows, for vertical flipping, that the reference block is flipped in the vertical direction by sampling the reference block from down to up.

The current block and the reference block may be aligned horizontally or vertically. The current block and the reference block may be aligned horizontally or vertically, for example, if horizontal symmetry or vertical symmetry, respectively, is present. The reference block may be determined from a reference region (comprising candidate reference blocks) that is aligned in (e.g., corresponds to) the same flipping direction (e.g., horizontal direction or vertical direction). The reference block may be determined from a reference region that is aligned in the same flipping direction, for example, based on the RRIBC mode and a flipping direction. The vertical component (BVy) of the BV (e.g., indicating a displacement from the current block to the reference block) may not need to be signaled, for example, if flipping in a horizontal direction is used/indicated. The vertical component (BVy) of the BV may not need to be signaled because it may be inferred to be equal to 0. The horizontal component (BVx) of the BV may not need to be signaled, for example, if flipping in a horizontal direction is used/indicated. The horizontal component (BVx) of the BV may not need to be signaled because it may be inferred to be equal to 0. Only one component, aligned with the direction for flipping, of the BV may be encoded and signaled for the current block.

Figure 17:
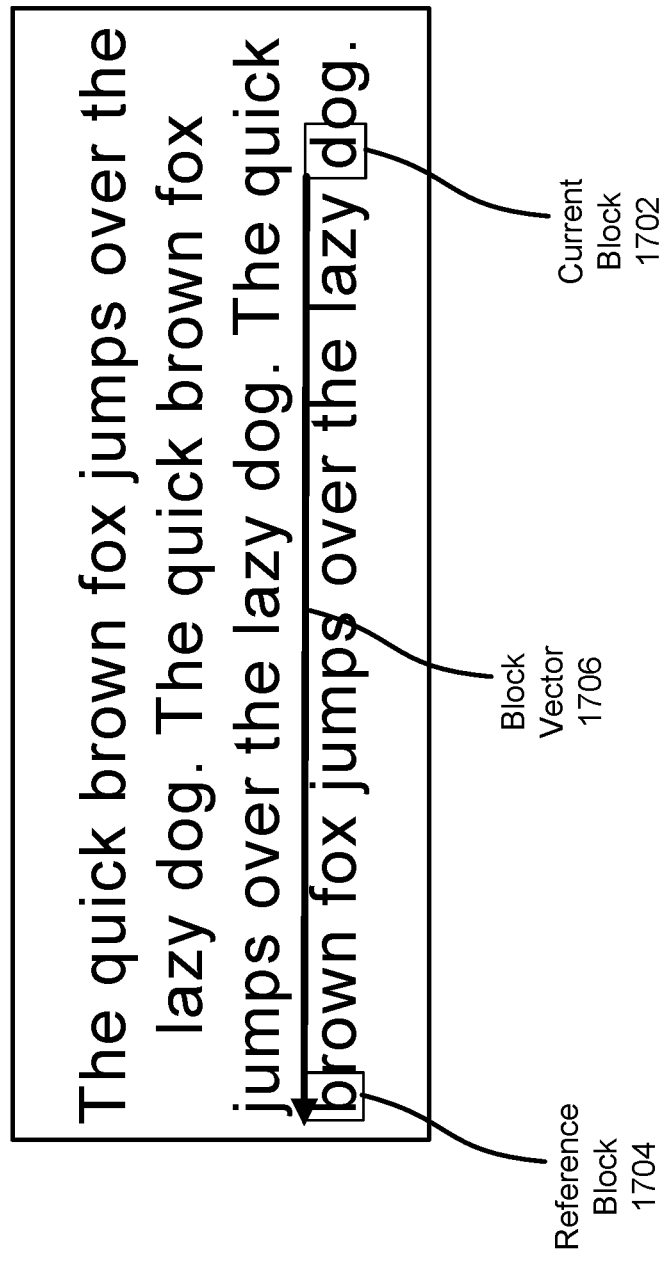
FIG. 17 shows an example of reconstruction-reordered IBC (RRIBC) mode as used for screen content.

FIG. 17 shows an example of RRIBC mode as used for screen content. The RRIBC mode may be used to utilize symmetry within text regions and increase efficiency for coding video content. An encoder (e.g., the encoder described herein with respect to FIG. 16, or encoder 114 as described herein with respect to FIG. 1) may determine that a reference block 1704 is the best matching reference block for a current block 1702. The encoder may determine that the reference block 1704 is the best matching reference block, for example, based on (or after) using horizontal flipping with respect to the reference block 1704. The encoder may select the reference block 1704 as the best matching reference block, for example, based on one or more cost criterion (e.g., a rate-distortion criterion, as described herein). The one or more cost criterion may be used with respect to the reference block 1704 having been flipped (e.g., after the reference block is flipped) in the horizontal direction relative to the current block 1702. The reference block 1704 may be located in a reference region that is in horizontal alignment with current block 1702. The reference block 1704 may be located (e.g., constrained to be located) in a reference region that is in horizontal alignment with current block 1702, for example, if horizontal flipping is used. A block vector 1706, indicating a displacement between current block 1702 and the reference block 1704, may be represented as only a horizontal component (BVx) of the BV 1706. The block vector 1706 may be represented as only a horizontal component (BVx) of the BV 1706 because of the constraints on possible locations of reference blocks. The vertical component of BV 1706 may be equal to 0, for example, if horizontal flipping is indicated/used.

A BV for a current block (e.g., coded using IBC) may be constrained to an IBC reference region. The BV may indicate a relative displacement from the current block to a reference block. A BVP that is used to predicatively code a BV may be similarly constrained (e.g., to the IBC reference region). The BVP may be constrained because a BVP may be derived from a BV of a spatially neighboring block, of the current block, or a prior coded BV. A BVD may be determined as a difference between the BV and the BVP. The BVD and an indication of the selected BVP may be encoded and sent via a bitstream to the BVD, and the BVP may enable decoding of the current block (e.g., as described herein). A reference block (e.g., to be flipped in a direction relative to the current block), in RRIBC, may be constrained to (e.g., selected from) an RRIBC reference region. The RRIBC reference region may be in and/or correspond to the direction of the flipping. The RRIBC reference region may be a subset or may be within the IBC reference region. The BVP, used to predicatively code a BV, for a current block, may not be constrained within the RRIBC region (e.g., constrained to indicate a relative displacement from the current block to a reference block within the RRIBC region). The BVP may not accurately predict the BV, for example, because the BVP may not be constrained to be within the RRIBC region. An unconstrained BVP may increase the quantity of bits needed to transmit a BVD between the BV and BVP.

A BVP may be adjusted to provide a more accurate prediction of a BV in an RRIBC mode operation. A reference region (e.g., an RRIBC reference region) may be determined to correspond to a direction for flipping a reference block relative to a current block. A reference region (e.g., an RRIBC reference region) may be determined to correspond to the direction for flipping the reference block, for example, based on the RRIBC mode being activated. The reference region may indicate a region, within a picture frame, from which the reference block may be selected (e.g., after flipping). The reference region, corresponding to the flipping direction, may be used with respect to a BVP. The reference region may be used with respect to the BVP to determine whether the BVP should be replaced with an adjusted BVP. The BVP may be replaced with an adjusted BVP that is within the reference region. The BVP may be replaced with an adjusted BVP that is within the reference region, for example, based on determining that the BVP is outside of the reference region. The adjusted BVP may be used to determine (e.g., by a decoder) and/or predict (e.g., by an encoder) the BV for the current block. Constraining the BVP to be within the same reference region as the reference block may result in the generated BVD that to be similarly constrained to the same reference region. The BVD may be limited to a maximum value corresponding to a width or length of the reference region (e.g., depending on the flipping direction). The BVD, corresponding to the adjusted BVP, may be encoded using fewer bits than if the BVP were constrained to the larger IBC reference region. The BVD may be encoded using fewer bits because the BVD may be limited (e.g., as a result of constraining the BVP).

Additionally, or alternatively, the BVPs may be constrained based on adding a first BVP (e.g., a BVP that points to a left boundary of the reference region) and a second BVP (e.g., a BVP that points to a right boundary of the reference region) to a list of BVPs. The BVD, that indicates the displacement between a selected BVP and the reference block, may be at most half the distance between the first BVP and the second BVP. The BVD may be constrained to a range of known BVD values, for example, based on the first BVP and the second BVP.

Figure 18:
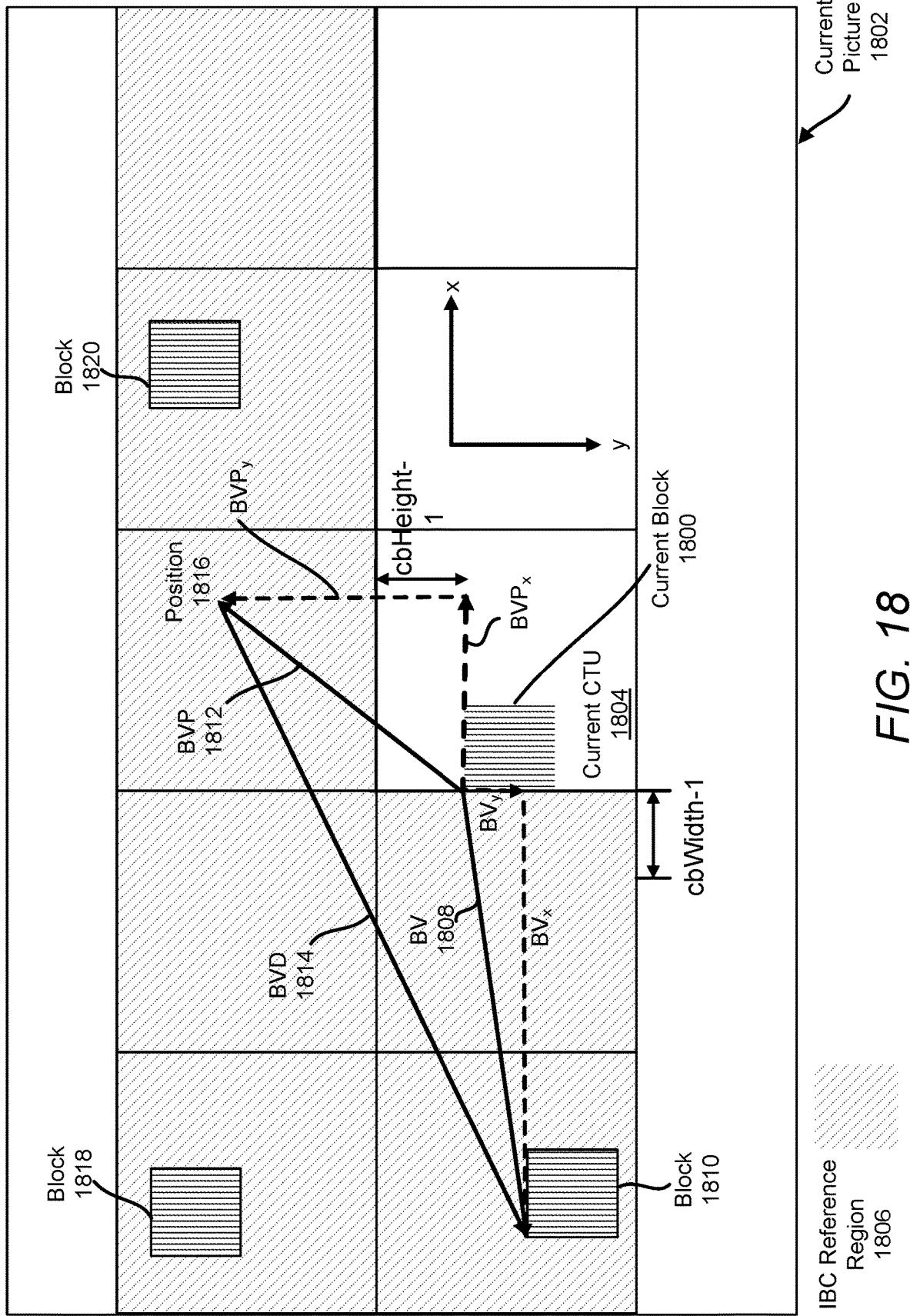
FIG. 18 shows an example of IBC predictive coding.

FIG. 18 shows an example of IBC predictive coding. An encoder (e.g., the encoder 200 in FIG. 2, or any other encoder) may use an IBC prediction mode to code a current block 1800 in a current picture (or portion of a current picture) 1802. The current block 1800 may be a prediction block (PB) or CB within a CTU 1804. IBC may comprise searching for a reference block in a same, current picture as the current block, unlike inter prediction that comprises searching for a reference block in a prior decoded picture that is different than the picture of the current block being encoded. As a result, only a part of the current picture may be available for searching for a reference block in IBC. For example, only the part of the current picture that has been decoded prior to the encoding of the current block may be available for searching for a reference block in IBC. Searching for a reference block in the part of the current picture that has been decoded prior to the encoding of the current block may ensure the encoding and decoding systems can produce identical results but may also limit an IBC reference region.

Blocks may be scanned (e.g., from left-to-right, top-to-bottom) using a z-scan to form a sequence order for encoding/decoding (e.g., in HEVC, VVC, and/or any other video compression standards). The CTUs (represented by the large, square tiles as shown in FIG. 18) to the left and in the row immediately above current CTU 1804 may be encoded/decoded, based on the z-scan, prior to the current CTU 1804 and current block 1800 (e.g., prior to encoding the current CTU 1804 and current block 1800). The samples of the CTUs (e.g., as shown with hatching in FIG. 18) may form an exemplary IBC reference region 1806 for determining a reference block to predict/encode/decode the current block 1800. A different sequence order for encoding/decoding may be used (e.g., in other video encoders, decoders, and/or video compression standards). The IBC reference region 1806 (e.g., location of the IBC reference region) may be affected based on the sequence order.

One or more additional reference region constraints (e.g., in addition to the encoding/decoding sequence order) may be placed on the IBC reference region 1806. For example, the IBC reference region 1806 may be constrained based on a limited memory for storing reference samples. Additionally, or alternatively, the IBC reference region 1806 may be constrained to CTUs, for example, based on a parallel processing approach (e.g., use of tiles or wavefront parallel processing (WPP)). Tiles may be used, as part of a picture partitioning process, for flexibly subdividing a picture into rectangular regions of CTUs such that coding dependencies between CTUs of different tiles are not allowed. WPP may be similarly used, as part of a picture partitioning process, for partitioning a picture into CTU rows such that dependencies between CTUs of different partitions are not allowed. Use of tiles or WPP may enable parallel processing of the picture partitions.

A position of a block may refer to a position of the block's top-left sample. Additionally, or alternatively, the position of a block may be determined by the position of another sample in the block. The position of a sample, in a picture, may be indicated by a sample number in the horizontal direction (e.g., indicated by the variable x) and a sample number in the vertical direction (e.g., indicated by the variable y) relative to an origin (e.g., (x, y)=(0,0)) of the picture coordinate system or relative to a top left sample of a block (e.g., a CTU) in which the sample is located. The origin may be in a top left corner of the picture. In the horizontal x direction, the positive direction may be to the right. As x increases, the sample location may move farther right in the positive, horizontal direction. In the vertical y direction, the positive direction may be down. As y increases, the sample location moves farther down in the positive, vertical direction.

The encoder may use/apply a block matching technique to determine a BV 1808. The BV may indicate a relative displacement from the current block 1800 to a reference block 1810 within the IBC reference region 1806. The reference block 1810 may be a block that matches or best matches the current block 1800 (e.g., in accordance with intra block compensated prediction). Block 1810 may have been determined as the reference block, from the IBC reference region 1806, as being a better match than other blocks such (e.g., block 1818 and block 1820) within IBC reference region 1806. The IBC reference region 1806 may be a constraint that may be used with respect to the BV 1808. The BV 1808 may be constrained by the IBC reference region 1806 to indicate a displacement from the current block 1800 (e.g., position of the current block 1800) to the reference block 1810 (e.g., position of the reference block 1810) that is within the IBC reference region 1806. The positions of the current block 1800 and the reference block 1810 may be determined, for example, based on the positions of their respective top-left samples.

The encoder may determine the best matching reference block from among blocks (e.g., within the IBC reference region 1806) that are tested. The encoder may determine the best matching reference block from among blocks (e.g., within the IBC reference region 1806) that are tested, for example, if a searching process occurs. The encoder may determine that the reference block 1810 may be the best matching reference block, for example, based on one or more cost criteria. The one or more cost criteria may comprise, for example, a rate-distortion criterion (e.g., Lagrangian rate-distortion cost). The one or more cost criteria may be based on, for example, one or more differences (e.g., one or more of an SSD, an SAD, an SATD, and/or a difference determined based on a hash function) between prediction samples of the reference block and original samples of the current block 1800. The reference block 1810 may comprise decoded (and/or reconstructed) samples of the current picture 1802 prior to being processed by in-loop filtering operations (e.g., deblocking and/or SAO filtering).

The encoder may determine and/or use a difference (e.g., a corresponding sample-by-sample difference) between the current block 1800 and the (determined and/or generated) reference block 1810. The difference may be referred to as a prediction error or residual. The encoder may store and/or send/signal, in/via a bitstream, the prediction error and related prediction information for decoding.

The prediction information may include the BV 1808. The prediction information may include an indication of the BV 1808. The BV 1808 may be predictively coded. The BV 1808 may be predictively coded, for example, before being stored and/or signaled via a bit stream (e.g., in HEVC, VVC, and/or other video compression schemes). The BV 1808 for the current block 1800 may be predictively coded (e.g., using a similar technique as AMVP for inter prediction). The BV 1808 may be predictively coded technique using BV prediction and difference coding. The encoder may code the BV 1808 as a difference between the BV 1808 and a BVP 1812, for example, if using BV prediction and difference coding technique. The encoder may select the BVP 1812 from a list of candidate BVPs. The BVP 1812 may point to/indicate a position 1816 within IBC reference region 1806. The candidate BVPs may be determined based on/from previously decoded BVs of blocks neighboring the current block 1800 and/or from other sources. A null BVP candidate (e.g., with an x-component and/or y-component with zero magnitude) may be added to the list of candidate BVPs, for example, if a BV from a neighboring block of the current block 1800 is not available. Both the encoder and decoder may generate and/or determine the list of candidate BVPs.

The encoder may determine a BVD 1814, for example, based on the encoder selecting the BVP 1812 from the list of candidate BVPs 18. The BVD 1814 may be calculated, for example, based on the difference between the BV 1808 and the BVP 1812. For example, the BVD 1814 may be represented by two directional components calculated according to equations (17) and (18), which are reproduced below:

$$BVD_x = BV_x - BVP_x \qquad (17)$$

$$BVD_y = BV_y - BVP_y \qquad (18)$$

$BVD_x$ and $BVD_y$ may respectively represent the horizontal and vertical components of the BVD 1814. $BV_x$ and $BV_y$ may respectively represent the horizontal and vertical components of the BV 1808. $BVP_x$ and $BVP_y$ may respectively represent the horizontal and vertical components of the BVP 1812. The horizontal x-axis and vertical y-axis are indicated in the lower right-hand corner of current picture 1802 for reference purposes. The x-axis may increase from left to right, and the y-axis may increase from top to bottom.

The encoder may signal, via a bitstream, the prediction error, an indication of the selected BVP 1812 (e.g., via an index indicating the BVP 1812 in the list of candidate BVPs), and the separate components of BVD 1714 (e.g., as determined based on equations (17) and (18)). A decoder (e.g., the decoder 300, or any other video decoder), may decode the BV 1808, for example, by adding corresponding components of the BVD 1814 to corresponding components of the BVP 1812. The decoder may determine and/or generate the reference block 1810 (e.g., which forms/corresponds to a prediction of current block 1800) using the decoded BV 1808. The decoder may decode the current block 1800, for example, by combining the prediction with the prediction error received via the bitstream.

Figure 19:
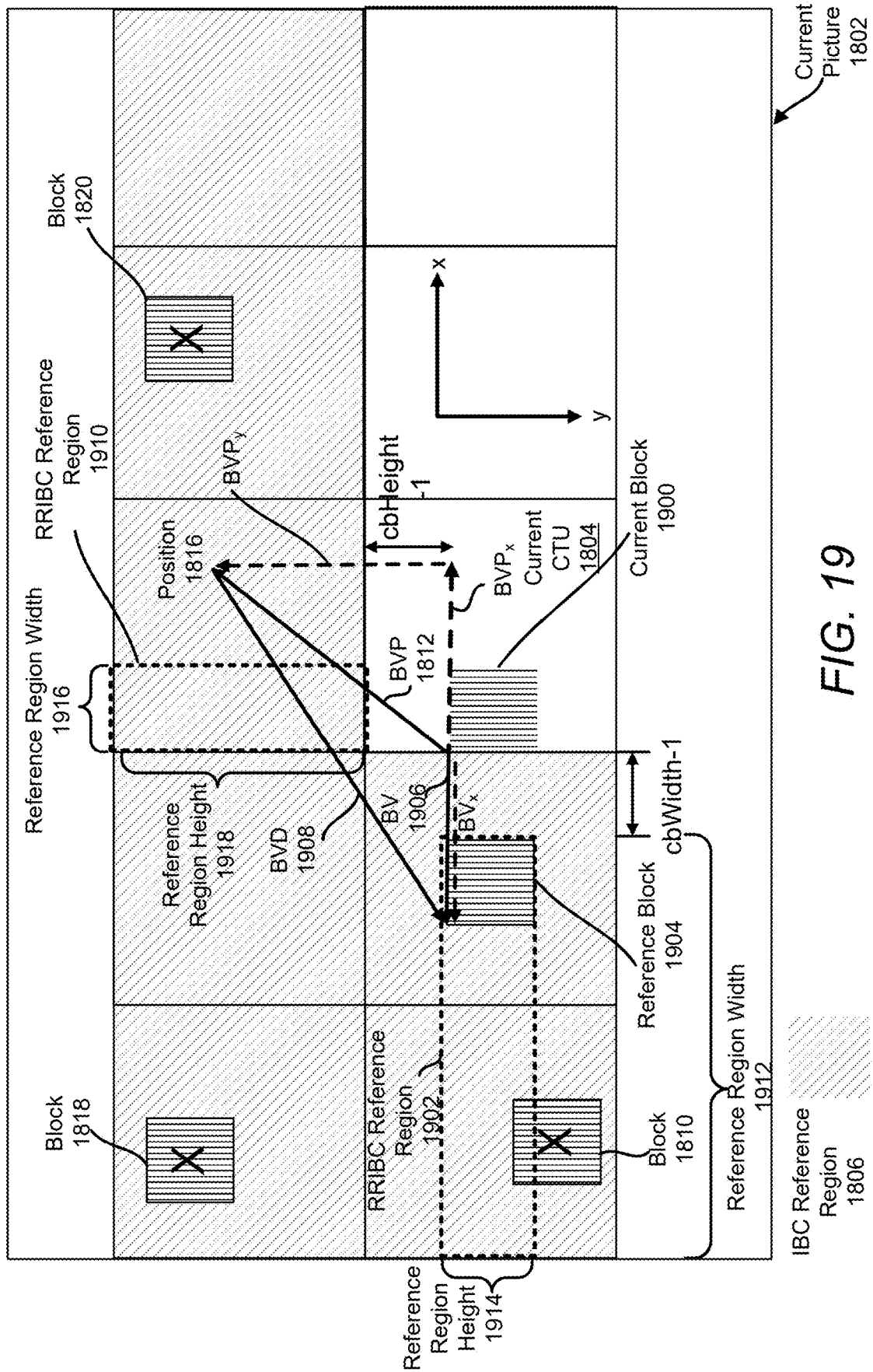
FIG. 19 shows an example RRIBC coding.

FIG. 19 shows an example RRIBC coding. For ease of reference, many of the elements from FIG. 18 are reproduced and similarly labeled in FIG. 19. FIG. 19 shows a current picture 1802 with an IBC reference region 1806. In FIG. 18, the current block 1804 is IBC coded. FIG. 19 shows a current block 1900 (e.g., within current CTU 1804) that is RRIBC coded.

The encoder may determine a reference region corresponding to a direction for flipping a reference block (e.g., relative to current block 1900), for example, based on use of an RRIBC mode. The reference region may be a rectangular reference region. The reference region may be in alignment with the direction for flipping.

An RRIBC reference region 1902 may be determined as a rectangular region with a reference region width 1912 and a reference region height 1914, for example, based on the direction for flipping being a horizontal direction (e.g., relative to the current block 1900). The reference region width 1912 may be a difference between a left boundary (e.g., leftmost boundary) of an IBC reference region 1806 (e.g., which may have an x coordinate of 0) and a position that is offset to the left, from the current block (e.g., top left most sample of the current block 1900), by a width (cbWidth) of the current block 1900. The reference region height 1914 may be the same as a height (cbHeight) of current block 1900. The RRIBC reference region 1902 (e.g., applicable for flipping in the horizontal direction) may comprise/correspond to: an upper boundary and a lower boundary that correspond to (e.g., are aligned to) an upper boundary and a lower boundary, respectively, of the current block 1900; a right boundary defined by an offset of cbWidth to a left boundary of current block 1900; and a left boundary that corresponds to a left boundary of the IBC reference region 1806.

An RRIBC reference region 1910 may be determined as a rectangular region with a reference region width 1916 and a reference region height 1918, for example, based on the direction for flipping being a vertical direction (e.g., relative to the current block 1900). The reference region width 1916 may be the same as a width (cbWidth) of the current block 1900. The reference region height 1918 may be a difference between a top boundary (e.g., top most boundary) of the IBC reference region 1806 (e.g., which may have a y coordinate of 0) and a position (e.g., above the current block 1900 that is offset), from the current block 1900 (e.g., top left most sample of the current block 1900), by a height (cbHeight) of the current block 1900. The RRIBC reference region 1910 (e.g., applicable for flipping in the vertical direction) may comprise/correspond to: a left boundary and a right boundary that correspond to (e.g., are aligned to) a left boundary and a right boundary of the current block, respectively, 1900; a lower boundary defined by an offset of cbHeight above an upper boundary of current block 1900; and a top boundary that corresponds to a top boundary of the IBC reference region 1806.

An RRIBC reference region may be offset from the current block 1900 (e.g., a position of the top left sample of current block 1900) in an x direction (e.g., a horizontal direction) and/or in a y direction (e.g., a vertical direction). The RRIBC reference region 1902 may be indicated by an offset, from the current block 1900, of −cbWidth in the x direction and 0 in the y direction, for example, for flipping in a horizontal direction (i.e., horizonal flipping). The RRIBC reference region 1910 may be indicated by an offset, from the current block 1900, of 0 in the x direction and −cbHeight in the y direction. Other directions for flipping may be considered, for example, by defining the reference region as an offset in two directions (or based on an offset vector). Other flipping directions may be used beyond horizontal flipping and vertical flipping. For example, flipping may be defined by an angle relative to the current block 1900. For example, an offset having a same non-zero magnitude in the x direction and in the y direction may indicate flipping at a diagonal relative to the current block 1900.

The reference region (e.g., RRIBC reference region corresponding to flipping) may constrain/limit a location of a block from which a reference block may be determined. For horizontal flipping, some blocks (e.g., blocks 1810, 1818, and 1820, marked by an 'X' as shown in FIG. 19) may not be valid and may not be searched for determining a reference block that is flipped with respect to the current block 1900. A reference block 1904 may be determined from within the RRIBC reference region 1902 (e.g., which is a subset of the IBC reference region 1806). The reference block 1904 may be determined in a manner that is similar, or substantially similar, to the determination of the reference block 1810 in FIG. 18. The reference block 1904 may be determined in a manner that is similar, or substantially similar, to the determination of the reference block 1810 in FIG. 18, except that the reference block 1904 may be determined from the RRIBC reference region 1902 (instead of the IBC reference region 1806) and the reference block 1904 may be flipped in the direction (e.g., horizontal) corresponding to the reference region 1902 before being compared with the current block 1900. A reference block may be determined within the RRIBC reference region 1910 that corresponds to the vertical flipping direction, for example, based on the direction for flipping being vertical.

The encoder may select a BVP (e.g., BVP 1812) from a list of candidate BVPs, for example, as described herein with respect to FIGS. 18 and 19. The BVP 1812 may point to/indicate a position 1816 within the IBC reference region 1806. BV 1906 may indicate a displacement from the current block 1900 to determined/selected reference block 1904. BVD 1908 may be calculated, for example, based on a difference between the BV 1906 and the BVP 1812 (e.g., based on equations (17) and (18) described herein). The BV may have a component that is equal to 0. The BV may have a component that is equal to 0, for example, because an RRIBC reference region corresponds to a flipping direction. For example, for horizontal flipping, the BV 1906 may have a non-zero horizontal component ($BV_x$) and a vertical component ($BV_y$) that is 0 (not shown in FIG. 19). BVPs, such as BVP 1812, may point to (or indicate a position) that is outside of the RRIBC reference region corresponding to the flipping direction. BVPs may point to (or indicate a position) that is outside of the RRIBC reference region because BVPs may be determined from previously coded blocks (e.g., as described herein). BVD 1908 (which may still be determined, encoded, and/or decoded) may be unnecessarily large and require a larger quantity of bits to encode. The BVD 1908 may be adjusted to constrain the maximum possible value of BVD 1908 in order to advantageously use the constraints (e.g., RRIBC reference region) placed on reference blocks for RRIBC coding current block 1900. Constraining BVDs may also enable the use of fewer bits to code the BVDs.

Figure 20:
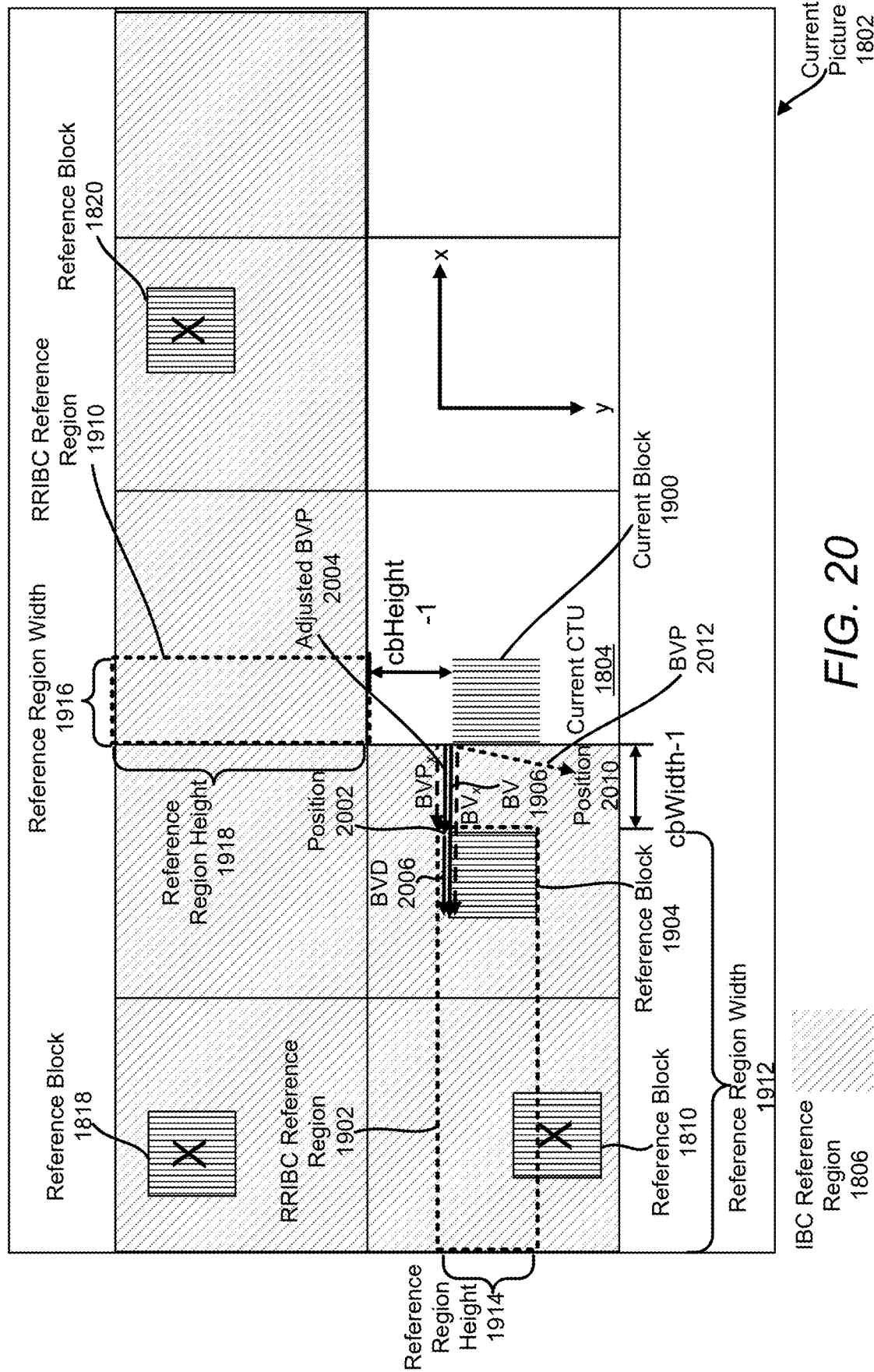
FIG. 20 shows an example use of adjusted block vector predictors (BVPs) for RRIBC coding.

FIG. 20 shows use of adjusted BVPs in RRIBC mode. The BVP 1812 may be replaced with an adjusted BVP 2004 to limit BVD size and to increase efficiency in coding BVDs. For ease of explanation, many of the elements from FIGS. 18 and 19 are reproduced and similarly labeled in FIG. 20.

FIG. 20 shows a current picture 1802 with an IBC reference region 1806. The current block 1900 (within current CTU 1804) is RRIBC coded, while in FIG. 18 the current block is IBC coded. The RRIBC reference region 1902 may be determined to correspond to flipping a reference block 1904, relative to the current block 1900, in a horizontal direction (e.g., as described herein with respect to FIG. 19). The BV 1906 may indicate a displacement from the current block 1900 to the reference block 1904 (e.g., within the RRIBC reference region 1902).

The encoder may replace a BVP 1812 with an adjusted BVP 2004. The encoder may replace the BVP 1812 with an adjusted BVP 2004, for example, based on determining that the BVP 1812 points to/indicates a position 1816 that is outside of the RRIBC reference region 1902. The adjusted BVP may indicate a displacement from the position of current block 1900 to a position within the RRIBC reference region 1902.

The encoder may determine whether a BVP (e.g., the BVP 1812) points to/indicates a position that is outside of the RRIBC reference region 1902. A component of the BVP may be selected, for example, based on the RRIBC mode and the direction for flipping. The encoder may determine whether the selected component is within a projection of the reference region onto an axis aligned with the selected component. The selected component may correspond to the flipping direction. For example, a horizontal component (BVx) of the BVP 1812 may be selected based on the selected component corresponding to the horizontal flipping. BVPx may indicate a displacement to a position that is not within RRIBC reference region 1902 projected onto the x axis (corresponding to a horizontal direction). The encoder may determine whether that the BVP 1812 points to/indicates a position that is outside of the RRIBC reference region 1902, for example, based on BVPx indicating a displacement to a position that is not within RRIBC reference region 1902 projected onto the x axis (corresponding to a horizontal direction).

The encoder may select the BVP component that is aligned with a flipping direction (e.g., if the direction for flipping is horizontal or vertical), to determine whether the BVP is outside of the RRIBC reference region 1902 and should be adjusted. The other component(s) of BVP that do not align with the flipping direction may be ignored, omitted, or set to 0. The encoder may select the horizontal component or the vertical component of BVP, for example, if the flipping direction is horizontal or vertical, respectively. A sum of the selected component and a dimension (cbDimension) of the current block may be determined. The dimension may be aligned with the selected component. The encoder may determine that the BVP points to/indicates a position that is outside of the RRIBC reference region 1902, for example, if the determined sum is greater than zero. The dimension of the current block may be selected as cbWidth (e.g., which is in a horizontal direction) or cbHeight (e.g., which is in a vertical direction), for example, based on the flipping direction being horizontal or vertical, respectively. The selected component of the BVP may be replaced with an adjusted component to generate an adjusted BVP. The selected component of the BVP may be replaced with an adjusted component to generate an adjusted BVP, for example, based on the determining that the BVP points to/indicates a position that is outside of the RRIBC reference region 1902.

For horizontal flipping, the BVPy component of the BVP 1812 may be ignored (or not selected, or set to 0). The BVP 1812 may be replaced with an adjusted BVP 2004. The BVP 1812 may be replaced with the adjusted BVP 2004, for example, based determining that a sum of BVPx of the BVP 1812 (x component of the BVP 1812) and cbWidth is greater than 0. The sum of BVPx of the BVP 1812 and cbWidth may be greater than 0, for example, if BVPx points to the right of the right boundary of RRIBC 1902. The adjusted BVP 2004 may point to/indicate a position 2002 within RRIBC reference region 1902. The maximum value of BVD may be limited to a length of an RRIBC reference region corresponding to the flipping direction by constraining the BVPs to be within the RRIBC reference region. For example, for horizonal flipping, possible BVD values may be limited to a maximum of the reference region width 1912. BVD 2006 may be calculated based on a difference between the BV 1906 and the adjusted BVP 2004. BVD 2006 may be limited to a maximum of reference region width 1912 whereas a horizontal component (BVx) of the BVD 1908 (as shown in FIG. 19) may be much larger (e.g., depending on the size of IBC reference region 1806).

A BVP 2012 may point to/indicate a position 2010 (which is to the left of the right boundary of RRIBC 1902). The BVP 2012 may be replaced by an adjusted BVP 2004.

Adjusted BVPs may be used in a manner similar to the adjusted BVPs for horizontal flipping (e.g., as described herein with respect to FIG. 20) if RRIBC reference region 1910 is determined for vertical flipping. The current block 1900 may be to be coded (e.g., using RRIBC) based on vertical flipping. A vertical component of the BVP 2012 may be selected, for example, based on the vertical flipping and the horizontal component of the BVP 2012 may not be selected. The BVP 2012 (e.g., the vertical component of the BVP 2012) may be replaced with an adjusted BVP with a vertical component equal to −cbHeight, for example, based on a sum of the vertical component of BVP 2012 and cbHeight being greater than 0. The horizontal component of the adjusted BVP may be set to zero.

The IBC reference region 1806 (e.g., as shown in FIGS. 18-20) is by way of example and an IBC reference region may be different from the IBC reference region 1806. The methods discussed above with respect to FIGS. 18-20 may be used with respect to IBC reference regions that are different from the IBC reference region 1806.

The IBC reference region 1806, as shown in FIGS. 18-20, may be replaced by an IBC reference region determined based on a different set of IBC reference region constraints. The IBC reference region 1806 may be constrained to include a number/quantity of decoded or reconstructed samples that may be stored in a limited memory size (e.g., IBC reference sample memory), for example, in addition to being constrained to a reconstructed part of the current picture 1802 and/or to one or more WPP partitions and/or tile partitions (e.g., as described with respect to FIG. 18). The size of the IBC reference sample memory may be limited based on being implemented on-chip with the encoder or decoder. The IBC reference region may be increased in size by using a larger size IBC reference sample memory off-chip from the encoder or decoder. Using an off-chip memory may require higher memory bandwidth requirements and increased delay in writing and/or reading samples (e.g., in the IBC reference region 1806) to and/or from the IBC reference sample memory.

A reference region for RRIBC may be along a flipping direction for a current block. Accordingly, the reference region for RRIBC may be smaller than the IBC reference region. A smaller reference region for RRIBC may cause BVD (e.g., indicating a difference between a BV of a reference block and a selected BVP) to be potentially larger as the IBC reference region increases in size. The size of the IBC reference region would not impact an efficiency of BVD coding, for example, based on implementing BVP adjustment for RRIBC (e.g., as described herein with respect to FIG. 20).

Entropy coding may be performed at the end of the video encoding process and/or at the beginning of the video decoding process (e.g., as described herein with respect to FIGS. 2 and 3). Entropy coding is a technique for compressing a sequence of symbols. In entropy coding, symbols that occur with greater probability are represented using fewer bits than symbols that occur with lesser probability. Shannon's information theory provides that the optimal average code length for a symbol with probability p is $-\log_2 p$, for example, if the compressed sequence of symbols is represented in bits $\{0, 1\}$.

Syntax elements of a video sequence may entropy encoded or decoded, for example, to encode or decoder, respectively, video content. The syntax elements may be generated at a video encoder. The syntax elements may describe/indicate how a video signal may be reconstructed at a video decoder. For a coding unit (CU), the syntax elements may include an intra prediction mode based on the CU being intra predicted and/or encoded using intra prediction, motion data (e.g., MVD and MVP-related data) based on the CU being inter predicted and/or encoded using inter prediction, and/or displacement data (e.g., BVD and BVP-related data) based on the CU being predicted and/or encoded using IBC or RRIBC.

To encode the syntax elements, the encoder (e.g., entropy coding unit 218) may include a binarizer. The binarizer may map a value of a syntax element to a sequence of binary symbols (e.g., a bin-string). The binarizer may define a unique mapping of values of syntax element to sequences of binary symbols. The binarizer may generate a binary representation of a non-binary valued syntax element. Binarization of syntax elements may help to improve probability modeling and implementation of arithmetic encoding. For example, the binarizer may implement one or more binarization processes, such as unary, truncated unary, k-th order truncated Rice, k-th order exponential-Golomb (EGk), fixed-length, or some combination of two or more of these binarization processes. The bits of the binary string, to which the value of the syntax element has been binarized, may be referred to as bins. A bin may refer to one of the bits of the binary string.

One or more binary symbols may be processed by an arithmetic encoder, for example, after the binarizer maps the value of a syntax element to a sequence of binary symbols. The arithmetic encoder may, to further increase compression, process each of the one or more binary symbols in one of at least two modes: regular arithmetic encoding mode or bypass arithmetic encoding mode.

To decode the binarized syntax elements, the decoder (e.g., entropy decoding unit 306) may include a debinarizer. The debinarizer may reverse the operation of the binarizer (e.g., decode the binarized syntax elements). The debinarizer may map the sequence of binary symbols, in a bitstream (including a video sequence), to the value of syntax element. The decoder may include an arithmetic decoder to reverse (e.g., decode) the arithmetic encoding of the encoded syntax element in the bitstream. The arithmetic decoder may decode the encoded syntax element to generate a sequence of binary symbols, for example, before the debinarizer determines the value of the syntax element from the sequence of binary symbols.

A BVD (e.g., in the IBC mode or the RRIBC mode) may be encoded by binarizing the magnitude (e.g., horizontal and/or vertical component magnitude) of the BVD using a binarization scheme (e.g., a binarization code). The encoded BVD, following binarization, may include a first part that indicates a range of values that the magnitude of the BVD falls within and a second part that indicates a precise value, within the range of values, of the magnitude of the BVD. For example, the BVD may include a horizontal component and a vertical component. The horizontal component and the vertical component may each be separately binarized using the binarization scheme/code. The BVD may be determined for a current block coded in an RRIBC mode, for example, as described with respect to FIG. 20. Coding the BVD may comprise that each component (e.g., horizontal/x component and vertical/y component) of the BVD is binarized separately.

There are a wide class of codes that include a first part that indicates a range of values and a second part that indicates a precise value within the range of values. These codes include, for example, Rice codes, Golomb codes (e.g., Golomb-Rice codes or Exponential Golomb codes), fixed length codes, etc.

For example, the magnitude of horizontal component $BVD_x$ of a BVD (e.g., BVD 2006 as shown in FIG. 20) may be binarized/encoded using a Golomb-Rice code. Golomb-Rice codes comprise a first part that that indicates a range of values and a second part that indicates a precise value within the range of values. The first part may be referred to as a prefix part and the second part may be referred to as a suffix part. A Golomb-Rice code Cgr k(v) of order k may comprise a unary coded prefix and k suffix bits (e.g., suffix with a bit length of k). The k suffix bits may be a binary representation of an integer $0 \le i < 2^k$. Golomb codes may use a tunable parameter M to divide an input value v into the prefix part and the suffix part. A prefix value q may be the result of a division by M, and a suffix value $v_s$, may be the remainder. Golomb-Rice codes are a class of Golomb codes where the parameter M is an exponent of 2 (e.g., $2^k$). For the input value v (e.g., where v is a non-negative integer) the prefix part (q) and the suffix part ($v_s$) may be determined by:

$$q = \left\lfloor \frac{v}{2^k} \right\rfloor. \quad (21)$$

$$v_s = v - q(2^k). \quad (22)$$

An example of a Golomb-Rice code for k=4 is given in Table 1. With reference to Table 1, $x_0, x_1, \ldots, x_n$ may denote bits of the code word with $x_n \in \{0, 1\}$. The bit(s) prior to, and including, the 0 bit may correspond to the prefix part and the bits following the 0 bit may correspond to the suffix part.

TABLE 1

| v | Cgr 4(v) |
|---|---|
| 0, ..., 15 | 0 $x_3, x_2, x_1, x_0$ |
| 16, ..., 31 | 1 0 $x_3, x_2, x_1, x_0$ |
| 32, ..., 47 | 1 1 0 $x_3, x_2, x_1, x_0$ |
| . | . |
| . | . |
| . | . |

The number of prefix bits is denoted by $N_p$, the number of suffix bits is denoted by $N_s$. For the Golomb-Rice code, the number of suffix bits is $N_s$=k. If encoding a value v, the quantity of prefix bits is determined as:

$$N_p = 1 + \left\lfloor \frac{v}{2^k} \right\rfloor. \quad (23)$$

Where $\lfloor x \rfloor$ represents the integer part of x. The suffix is the $N_s$-bit representation of the result of equation (24) (e.g., which is equivalent to equation (22)):

$$v_s = v - 2^k(N_p - 1). \quad (24)$$

The Golomb-Rice codes may use a suffix of fixed length. A length of the suffix may also be determined by the length of the prefix. Exponential Golomb codes (e.g., Exp-Golomb codes) may have a length of a suffix that is determined by the length of the prefix. Exponential Golomb codes may be used to binarize the magnitude of a component of BVD. A kth-order exponential Golomb code $C_{eg\ k}(v)$ may include a unary prefix code and a suffix of variable length. A number/quantity of bits in the suffix $N_s$ (e.g., a bit length of the suffix) may be determined by the value $N_p$ as follows:

$$N_s = k + N_p - 1. \quad (25)$$

The number/quantity of prefix bits $N_p$ (e.g., a bit length of the prefix) of $C_{eg\ k}(v)$ may be determined from the value v by:

$$2^k(2^{N_p-1}-1) \leq v < 2^k(2^{N_p}-1). \quad (26)$$

The suffix may be the $N_s$-bit representation of:

$$v_s = v - 2^k(2^{N_p-1}-1). \quad (27)$$

A codeword ($v_c$) that represents the value v may comprise a prefix value $v_p$ concatenated to a suffix value $v_s$. A number/quantity of bits of the codeword $N_c$ (e.g., a bit length of the codeword) may be determined as follows:

$$N_c = N_p + N_s. \quad (28)$$

The prefix part may be unary coded such that the prefix value may be represented as a unary value (comprising i=$N_p$−1 bits of 1s) followed by a termination bit (e.g., separator bit or a delimiter bit). The termination bit may have an opposite value (e.g., 0) to a bit of the unary value. Additionally, or alternatively, the bit values may be swapped. For example, the unary value may comprise i 0s and the termination bit may be 1. The number i may represent a prefix group index that starts at 0. The suffix part may be determined as a (k+i)-bit binary number, which is logically equivalent to equation (25) (e.g., $N_p$−1=i).

FIG. 21 shows an example exponential Golomb code. The example exponential Golomb code may be for the parameter k=1 and k=0. k=1 and k=0 may be conventionally used for coding a BVD. In other examples, other values of k (e.g., 2, 3, 4, or any other positive integer value) may be used. Table 2100 of FIG. 21 shows an exponential Golomb code, which is a prefix code (also referred to as a prefix-free code, a prefix condition code, or an instantaneous code). Codewords may be generated to correspond to values of input symbols. Each codework may comprise a prefix part and a suffix part, which may be determined as discussed herein.

Exponential Golomb codes may have certain properties. For example, a length (or a bit length) of the prefix part may be determined to be a sum of a quantity of continuous is (i) and 1 (e.g., corresponding to the termination bit of 0). The length of the prefix part may be represented as follows:

$$N_p = i + 1. \quad (29)$$

For example, in prefix group i (or for the (i+1)-th prefix value), the prefix value $v_p$ may be represented in binary as i continuous is shifted left by k bits. The prefix value $v_p$ may be determined as:

$$v_p = 2^k(2^i - 1) = 2^k(2^{N_p-1} - 1). \quad (30)$$

The prefix value may correspond to a minimum BVD value associated with a prefix group i.

A bit length of the suffix part ($N_s$) for a prefix group i may be (k+i) (e.g., which is equivalent to equation (25)). For a prefix group i, the suffix value ($v_s$) may be a binary coded value. The suffix value, for a prefix group, may be within a range of 0 to $2^{k+i}-1$. The size of the prefix group i may correspond to a quantity of values representable by the suffix value ($v_s$). The quantity of values may be determined, for example, based on i or the bit length of the prefix ($N_p$), as shown in equation (31):

$$P_s = 2^{k+i} = 2^{k+i} = 2^{k+N_p-1}. \quad (31)$$

A prefix value ($v_p$), which correspond to a prefix group, may indicate a range of values with the size (or total number of elements) of $P_s$ (e.g., as determined by equation (31)).

The codeword (e.g., binarized using the exponential Golomb code) may be decoded. The codeword may be decoded, for example, based on one or more properties of the exponential Golomb code. The prefix part may be decoded based on a quantity i of leading 1's before the termination bit (e.g., 0). The prefix part may be decoded as having a prefix value that is $v_p = 2^k(2^{N_p-1}-1)$ (e.g., as shown in equation (30)). The suffix part may be decoded/debinarized based on a bit length of the suffix ($N_s$) indicated by the prefix part. For example, the suffix part may be debinarized based on parsing the next (k+i) bits. The (k+i) bits may represent a suffix value of the suffix part (e.g., as shown in equation (25)). The bits corresponding to the suffix part may be a binary coded representation of the suffix value.

A codeword, in an entropy code (e.g., Golomb code, exponential Golomb code, etc.), may comprise a prefix part and a suffix part. The prefix part and the suffix part may together represent an input symbol/value (e.g., a BVD). The BVD may indicate a difference between a BVP and a BV (e.g., as described herein with respect to FIG. 20). For a current block coded in the RRIBC mode, the BV may indicate a displacement from the current block to a reference block (e.g., that is flipped relative to the current block in a direction). The reference block may be located in a reference region (e.g., RRIBC reference region) corresponding to the direction for flipping. An encoder and/or a decoder may determine/compute a first BVD value that the BVD (e.g., a magnitude of the BVD) does not exceed. The encoder and/or the decoder may determine/compute the first BVD value, for example, based on the BVP (or a component of the BVP) being within a range of values corresponding to the reference region. The encoder and/or the decoder may determine/compute the first BVD, for example, before coding (e.g., encoding and/or decoding) the BVD. A range of possible BVD values may be determined before coding the BVD. The range of values may define the reference region in the direction for flipping.

The BVD (e.g., the magnitude of the BVD component in the direction) may be determined to be within a range of BVD values (e.g., BVD range 2102). For example, as shown in FIG. 21, the BVD range 2102 may comprise values in a range from 0 to 12. The first BVD value that the BVD does not exceed may be determined to be 12, which is the maximum BVD value in the BVD range 2102. Corresponding codewords 2106 may be generated for possible BVDs in the BVD range 2102 (e.g., as described herein). Codewords 2106 for the BVD range 2102 may correspond to a range of prefix values (e.g., prefix range 2104). The range of prefix values may be associated with available codewords 2108. A quantity of available codewords 2108 may be greater than a quantity of codewords 2106 for the BVD range 2102. For example, the available codewords 2108 may comprise unused (e.g., idle, wasted) codewords that may never be used for representing a BVD in the BVD range 2102. For example, the codewords corresponding to BVD values of 13 and/or 14 may never be used if the first BVD value is 12. Unused codewords may contribute to coding inefficiencies. For example, unused codewords may result in some of the bits that are used to signal codewords in the BVD range 2102 being redundant. Up to $P_s-1$ codewords (e.g., depending on the first BVD value), out of $P_s$ codewords, may be available for the prefix part corresponding to prefix group i.

Various examples herein describe enhancements to conventional entropy codes (e.g., binarization schemes/codes). An entropy code may comprise a binarization scheme/code, which may be a subset of (or a type of) entropy codes. Entropy codes may comprise exponential Golomb codes used to code BVDs. A range of possible BVD values may be determined before coding a BVD. The BVDs may be coded, for example, based on a first BVD value corresponding to an upper bound (e.g., a maximum BVD value) in the range of possible BVD values. A prefix part of a codeword and/or a suffix part corresponding to the prefix part may be selectively variable-length coded, for example, by considering the limited range of BVDs. Selective variable-length coding may reduce a quantity of bits needed to code the prefix part and the suffix part of a codeword (e.g., an exponential Golomb codeword), thereby improving compression performance.

While the various enhanced entropy coding schemes herein are described in relation to encoding/decoding BVDs, the enhanced entropy coding schemes may be used with respect to any other parameter that has a limited range of values. Further, while the various enhanced entropy coding schemes herein are described in relation to encoding/decoding mechanisms (e.g., an RRIBC coding schemes) that use a reference block that is flipped in a direction relative to a current block, the enhanced entropy coding schemes may be used for any encoding/decoding mechanism that uses a reference block that is not necessarily flipped (e.g., as described with respect to FIGS. 13, 14, 15A, 15B, and 16).

FIGS. 22-25 will be described with reference to FIG. 21, in which the BVD range 2102 for a BVD may be from 0-12. FIG. 22 shows an example table with bit lengths of codewords of an entropy code. The entropy code may be used for coding a value (e.g., as BVD). Table 2200 of FIG. 22 shows an example of exponential Golomb code with order k=0. The exponential Golomb code may map a set of input symbols to a prefix part and a suffix part.

A first BVD value (which the BVD to be determined/coded does not exceed) may be a value in a range of BVD values indicated by prefix group 2202 (e.g., i=3), for example, if the first BVD is equal to 12. The BVD value of 12 may be represented by a codeword including a prefix part 2204. The prefix part 2204 may indicate a prefix value of 1110. The prefix value may comprise a unary value of 111 followed by a termination bit of value 0. The prefix value may correspond to/be associated with a start value $S_i$ (e.g., a minimum value) of a range of values indicated by the prefix part. The prefix value may be decoded as and/or may correspond to $v_p=2^k(2^{N_p-1}-1)$ (e.g., as shown in equation (30)). The prefix value may indicate a range of values from Si to $(S_{i+1}-1)$. A sequence of prefix values, in exponential Golomb codes, may correspond to a sequence of prefix group sizes (e.g., sizes of indicated ranges of values) in increasing powers of 2. The starting value, in a range of values indicated by a prefix value, may correspond to (or be equal to) a sum of ranges of values represented by all prefix values less than the prefix value. The starting value Si of i-th prefix group may correspond to or be equal to:

$$S_i=v_p=2^k(2^i-1)=2^k(2^{N_p-1}-1). \quad (32)$$

The prefix column, as shown in FIG. 22, may represent the unary coded prefix part. The prefix value (equivalent to prefix group start value $S_i$) may represent the value coded by the prefix part. The codeword may comprise a suffix part 2206 of three bits (e.g., 101 as shown table 2100.)

FIGS. 23-25 illustrate examples of enhanced exponential Golomb code. Although enhancements are described with respect to exponential Golomb codes (e.g., used for coding BVDs), the enhancements may be similarly used generally with respect to Golomb codes and/or other types of entropy codes. Although an exponential Golomb code with k=0 has been selected for illustration purposes (e.g., in FIGS. 22-25), the mechanisms described may be similarly used to increase coding efficiency and/or improve compression of BVDs if using exponential Golomb codes with other values of k.

FIG. 23 shows an example table with bit lengths of codewords of an enhanced entropy code. A codeword, associated with the entropy code, may comprise a suffix and/or a prefix coded depending/based on the first BVD value. The first BVD value may be value that a BVD (to be coded) does not exceed.

Table 2300 of FIG. 23 shows an enhanced exponential Golomb code. The first BVD value (e.g., 12) may be one of the range of BVD values indicated by a prefix part 2304 corresponding to a prefix group 2302 (i=3). A range of prefix values to represent the range of BVD values may be determined, for example, based on the first BVD value. For example, a first prefix value may be determined as the prefix part of a codeword for the first BVD value. The determined first prefix value ($v_{p\_max}$) may correspond to a maximum possible prefix value of a range of possible prefix values since the first BVD value ($v_{max}$) may be a maximum possible BVD value. A bit length ($N_{p\_max}$) of the first prefix value may be determined such that:

$$2^k(2^{N_{p\_max}-1}-1) \leq v_{max} < 2^k(2^{N_{p\_max}}-1). \quad (33)$$

The first prefix value (e.g., $v_{p\_max}$) may be determined as (in accordance with equation (30)):

$$v_{p\_max} = 2^k(2^{N_{p\_max}-1}-1). \quad (34)$$

The prefix part 2304, corresponding to the first prefix value, may be truncated unary coded. The limited range of BVD values may limit a maximum prefix value. For example, there may be at most at most three continuous 1's for the determined prefix value for prefix group 2302 (i=3), for example, because of an upper limit on the BVD values (e.g., as represented by the first BVD value). The termination bit of 0 need not be coded for the determined prefix value for the prefix group 2302 (i=3) because a quantity of 1's may never exceed three.

One or more codewords represented by a suffix part 2306, corresponding to prefix part 2304 comprising the first prefix value, may not be used (e.g., as described with respect to FIG. 21). The suffix part 2306, corresponding to prefix part 2304, may be truncated binary coded. The suffix part 2306 may have a bit length that may vary from a first bit length of (i+k) to a second bit length that is one less than the first bit length (i+k−1). Truncated binary coding may take advantage of instances where an alphabet to be coded has a size that is not a power of two. A quantity of unused codewords (u) in a group of values indicated by a group prefix i may be determined, for example, based on a difference (d) between the first BVD value (e.g., $v_{max}$) and the first prefix value (e.g., $v_{p\_max}$ represented by i continuous 1's shifted left by k bits). The difference d may correspond to a quantity of codewords (or states) D between the first BVD value and the first prefix value (e.g., including the codewords corresponding to the first BVD and the first prefix value). D may be equal to d+1. This is because the value 0 also needs to be represented. For example, a $v_{max}$ (or $BVD_{max}$) of 12 may correspond to a range of BVD values of 0-12, which is 13 codewords. The values d, D, and u may be determined as follows:

$$d = v_{max} - v_{p\_max} = v_{max} - 2^k(2^{N_{p\_max}-1}-1) \quad (35)$$

$$D = d+1 \quad (36)$$

$$u = 2^k(2^{N_{p\_max}}-1) - D = 2^k(2^{N_{p\_max}}-1) - (d+1) \quad (37)$$

In truncated binary coding, the first u symbols (e.g., corresponding to the suffix part 2306) may be coded (or mapped) as codewords of a first bit length of (i+k−1). The remaining d−u symbols (e.g., corresponding to the suffix part 2306) may be coded (or mapped) as the last d−u codewords of a second bit length of (i+k). The second bit length may correspond to the bit length of a regular exponential Golomb code of order k for prefix group i (e.g., associated with a prefix value of bit length $N_p$, in accordance with equation (29)). The resulting code is a prefix code because the codewords of bit length (i+k) include an unassigned codeword of bit length (i+k−1) with 0 or 1 appended. FIG. 23 shows that for prefix group 2302, the codeword may have a bit length that is 5 or 6 (e.g., depending on the BVD value to be coded and using truncated unary coding for the prefix part), which is less than 7 as shown in table 2200. The above values may also be determined based on $N_p$, (e.g., except for the last prefix group if truncated unary coding is implemented because the $N_p$ of the last prefix value is equal to i) since the bit length of the prefix value ($N_p$) is one more than i (e.g., in accordance with equation (29)).

Properties of truncated binary coding may enable the decoder to decode the suffix part with variable bit length of suffix ($N_s$). The decoding the suffix part may be based on parsing a first number/quantity of bits (e.g., i+k−1), of the suffix part, based on the prefix part. For exponential Golomb codes the decoder may decode the suffix part further based on a parameter k for the k-th order exponential Golomb code (e.g., as described herein with respect to equation (25)). The prefix value of the prefix part may indicate the prefix group (i). The prefix value may be equal to a length of the unary value (e.g., a number of continuous 1s) of the prefix part. The first quantity may be the sum of i and a constant (e.g., k+1). The decoder, based on parsing the first quantity of bits of the bitstream, may compare the debinarized value (e.g., represented by the first quantity of bits) with a threshold (e.g., u−1) representing unused codewords to determine whether another bit needs to be further parsed to decode the suffix part. The decoder may determine that another bit needs to be parsed to decode the suffix part, for example, if the debinarized value represented by the first quantity of bits is greater than the threshold.

FIG. 24 shows an example table with bit lengths of codewords of an enhanced entropy code. A codeword, associated with the entropy code, may comprise a suffix and/or a prefix coded depending on a first BVD value. The first BVD value may be a value that a BVD to be coded does not exceed.

Table 2400, as shown in FIG. 24, shows an enhanced exponential Golomb code. The first BVD value (e.g., $v_{max}$=12, may be one of the range of BVD values indicated by a prefix part 2404 corresponding to a prefix group 2402 (i=3). A range of prefix values to represent the range of BVD values may be determined, for example, based on the first BVD value. A determined first prefix value (e.g., corresponding to the prefix part 2404) may correspond to a maximum possible prefix value ($v_{p\_max}$ as shown in equation (34)) of a range of possible prefix values since the first BVD value may be a maximum possible BVD value. The prefix part 2404 may be truncated unary coded.

For prefix part 2404 corresponding to the first prefix value (e.g., $v_{p\_max}$ or the max possible prefix value based on the first BVD value), a suffix part 2406 may be coded with a bit length ($N_s$) selected based on the first BVD value. The bit length may be less than a bit length of k+i used to code the suffix part for a prefix group i, as described herein with respect to FIG. 22. The bit length of the suffix part 2406 may be equal to the minimum number/quantity of bits ($N_D$) (or the minimum bit length) to represent the difference (d) between the first BVD value (vmax, also shown as $BVD_{max}$) (e.g., 12) and the first prefix value (e.g., 7) of the prefix part 2404. For example, the difference (d) may be determined as per equation (35). In this example, the difference is 12−7=5, which results in the suffix part 2406 being coded (e.g., encoded and/or decoded) with a bit length of 3 (e.g., since binary value 101 representing 5 has 3 bits). The bit length of 3 may be the same as bit length of the suffix part 2206 ($N_s$) of a conventional exponential Golomb code. For other first BVD values (e.g., 8) the bit length may be less than k+i. The bit length $N_D$ needed to represent d may be determined as follows:

$$N_D = \lceil \log 2(d+1) \rceil = \lceil \log 2(D) \rceil = \lceil \log 2(v_{max} - v_{p\_max} + 1) \rceil \quad (38)$$

where d>0 and $N_D$=0 for d=0. Ceil(x) or $\lceil x \rceil$ may represent a ceiling function, which maps an input x to the least integer greater than or equal to x. The first prefix value may be $v_{p\_max}$ (e.g., as described herein with respect to equation (34)). The codeword, for prefix group 2402, may have a bit length ($N_c$) that is one of 4, 5, or 6 (e.g., including the truncated unary code for the prefix part), which is less than 7 (e.g., as shown in table 2200 of FIG. 22).

FIG. 25 shows an example table with bit lengths of codewords of an enhanced entropy code. A codeword, corresponding to the entropy code, may comprise a suffix and/or a prefix. The prefix and/or the suffix may be coded depending on a first BVD value that a BVD to be coded does not exceed.

The table 2500 of FIG. 25, shows an enhanced exponential Golomb code. The exponential Golomb code of FIG. 25 may indicate a range of BVD values with the first BVD value (e.g., 12). The range of BVD values may be indicated by a prefix part 2504 corresponding to a prefix group 2502 (i=2). The prefix part 2504 may correspond to the first prefix value and may be truncated unary coded (e.g., similar to the prefix part 2304 of FIG. 23).

The coding scheme (used to an exponential Golomb code) represented by table 2500 includes a type of variable-length coding for the suffix part corresponding to a prefix part (e.g., with a prefix value associated with the first BVD value). The variable-length coding shown in table 2500 may not require a first number/quantity of bits of the suffix part to be decoded before deriving a bit length of the suffix part. This differs with respect to the truncated binary encoding as described herein with respect to FIG. 23. Truncated binary coding may cause parsing dependencies if lengths of suffix parts are not known before parsing the suffix parts to determine the suffix values. For example, it may be desirable to implement a compression mechanism to predict suffix values. Prediction of suffix values using a compression mechanism may enable faster and more efficient decompression. A compression mechanism which may not be possible due to the parsing dependencies.

Entropy coding may compress a sequence of symbols by representing symbols with greater probability of occurring using fewer bits than symbols with a lesser probability of occurring. For video compression, smaller values tend to occur more likely and may be coded using fewer bits compared to larger values. An exponential Golomb code may achieve this by coding exponentially more codewords for each successive prefix group. The bit length of codewords may increase linearly (e.g., as described herein with respect to FIG. 22) for increasing prefix values in the prefix part. The range of values (e.g., indicated by and coded in association with each prefix value) may increases exponentially (e.g., an exponent of 2 for the examples discussed herein). The coding scheme of table 2500 maintains this property for efficient coding such that each successive prefix value of the prefix part is used to code a greater range of values than that for the previous prefix value. Codewords, determined to be unused for a prefix part, may cause reduction in the number of coding bits used. This may differ with respect to coding scheme 2400, in which the suffix part 2406 (e.g., associated with prefix part 2404 corresponding to the first BVD value) may have a bit length smaller than the suffix part corresponding to the previous prefix value (e.g., with prefix value 110). The smaller bit length may result in fewer values are being coded with a larger prefix value than that for the previous/smaller prefix value.

The coding scheme of table 2500 may redefine the last two prefix groups i and i+1 (e.g., corresponding to the last two prefix values $v_{p\_max}$ and $v_{p\_max-1}$), that would be needed to code a BVD, in a range of 0 to the first BVD value (e.g., BVDmax or $v_{max}$). The last two ranges of values, corresponding to the last two prefix groups i and i+1, may be combined and associated with a preceding prefix group i−1 (e.g., prefix group 2502). The last two ranges of values may be redistributed into two new ranges of values selected to both reduce unused codewords (e.g., as described herein with respect to FIG. 21) and maintain the property of smaller values (e.g., with higher probability of occurrence) being coded with less bits. The two new ranges of values may be indicated by two group indications 2508A and 2508B, respectively. The two ranges of values may be coded with respective suffix parts 2506A and 2506B with respective first bit length and second bit length. The first bit length may be the same as that for the suffix part corresponding to prefix group i−2. The second bit length may be equal to a sum of the first bit length and one.

A first prefix value (e.g., a prefixMax or $v_{p\_max}$) which a range of prefix values, for representing a possible BVD value, does not exceed may be determined, for example, based on the first BVD value being determined. For example, for an exponential Golomb code with k=0, the prefix value 11 (if truncated unary coded) corresponding to the prefix part 2502 (e.g., with prefix group start value $S_i$ of 3) may be determined (e.g., as shown in equation (32)).

The coding scheme shown in table 2500 may be selected, based on the first BVD value, as a first entropy code from a plurality of entropy codes. The selection may be based on comparing the first BVD value to a threshold value. The threshold value may be determined, for example, based on prefix group start values $S_i$ and $S_{i+1}$. The comparison may comprise determining whether the first BVD value is less than (or equal to) $(S_i+S_{i+1})/2$. The prefix group 2502 determined for the first BVD value may have a prefix group index of i−1 and may correspond to a prefix group start value $S_{i-1}$. As shown in table 2500, for the first BVD value being between 7 and 14, it may be compared to (7+15)/2. For the particular example of the first BVD value being 12 (which is greater than (7+15)/2) coding scheme of table 2500 may not be selected and another entropy code may be selected. For example, a default entropy code such as an exponential Golomb code shown in table 2200 may be selected.

The above comparison may be equivalent to comparing a number/quantity of unused codewords (u) (e.g., as determined using equation (37), and described herein with respect to FIG. 23) to possibly used codewords (D) (e.g., as determined using equation (36) and described herein with respect to FIG. 23) to represent a possible BVD value. The selection for the first entropy code, for redistributing values into two or more groups indicated by group indications 2508A and 2508B, for example, may be based on u being greater than (or equal to) D (which is also equal to d−1, as shown in equation (36)).

A decoder may determine a range of prefix values (e.g., 0-3), for example, based on the coding scheme shown in table 2500 being selected. The decoder may decode a group indication associated with prefix part 2504, for example, based on determining that a prefix value is the largest value in the prefix range and corresponds to prefix part 2504. The group indication may be appended to the prefix part 2504 and may have a fixed bit length. The decoder may parse the fixed bit length of bits of the group indication. Each group, indicated by the group indication, may further indicate a bit length of a suffix part representing the range of values of that group. For a 1-bit group indication 2508A of 0, suffix part 2506A may be indicated as having a bit length of 1. For a 1-bit group indication 2508B of 1, suffix part 2506B may be indicated as having a bit length of 2. For prefix part 2504, a group indication may indicate, to the decoder, a structure (e.g., a bit length) of the succeeding suffix, for example, before parsing the suffix part.

FIG. 25 shows that, to code a range of BVD values less than or equal to the first BVD value, the prefix group 2502 may represent the same range of values as the two ranges of values (e.g., corresponding to prefix group i=2 or i=3 of table 2200) needed to represent the larger BVD values in the range of BVD values. The codewords for the prefix part 2504 (e.g., with the prefix part being truncated unary coded) may be coded as having bit lengths of 4 or 5 (e.g., depending on which BVD values are being coded) as compared to the bit lengths of 5 and 7 for prefix group i=2 and i=3, respectively, of table 2200.

Figure 26B:
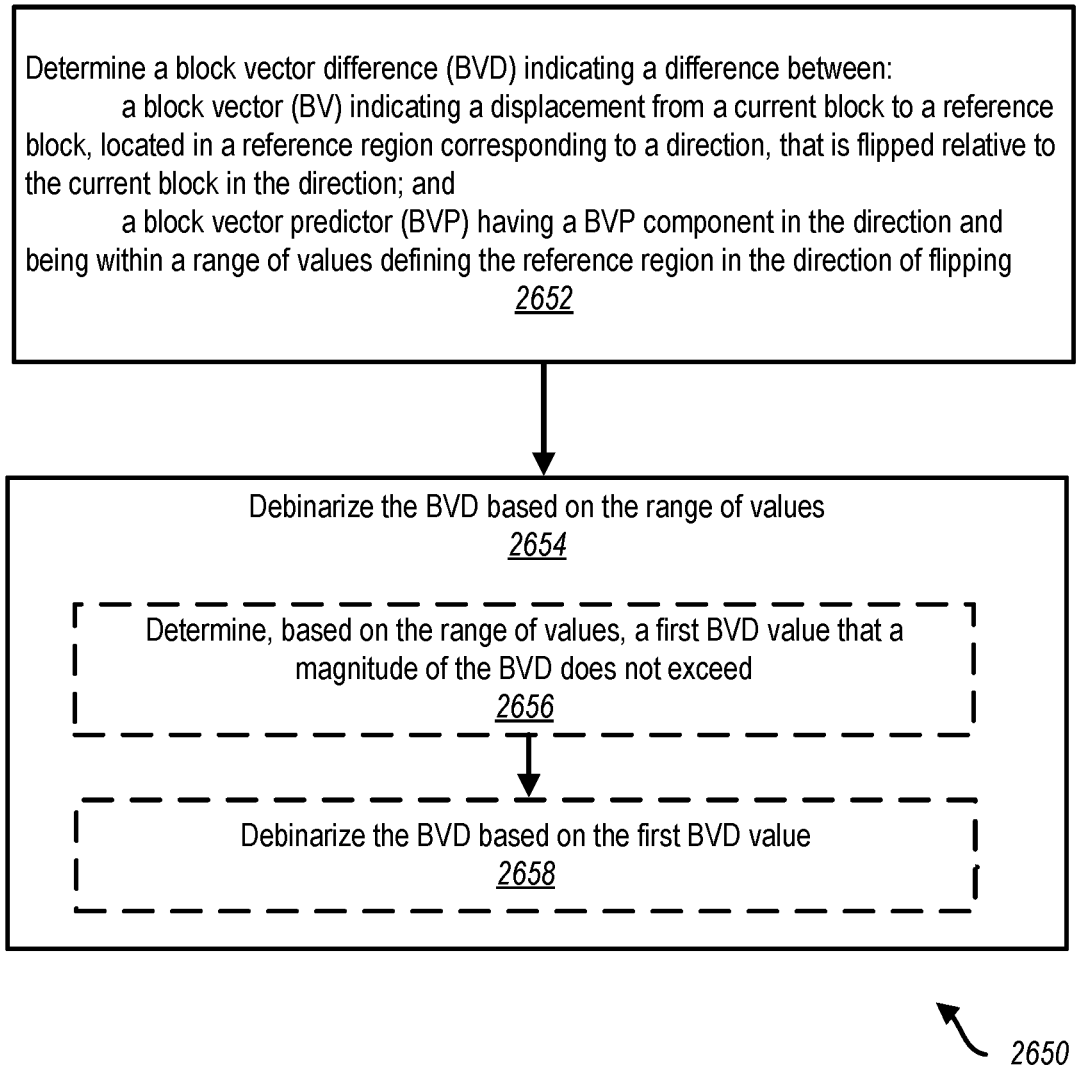
FIG. 26B shows an example method for decoding a BVD.

FIG. 26A shows an example method for encoding a BVD. FIG. 26B shows an example method for decoding a BVD. The method of 2600 of FIG. 26 may be implemented by an encoder (e.g., encoder 200 as described herein with respect to FIG. 2). The method 2650 may be implemented by a decoder (e.g., decoder 300 as described herein with respect to FIG. 3).

At step 2602 or step 2652, the BVD may be determined. The BVD may indicate a difference between a BV and a BVP. The BV may indicate a displacement from a current block to a reference block. The reference block may be located in a reference region (e.g., RRIBC reference region) corresponding to a direction relative to the current block (e.g., horizontal direction or a vertical direction relative to the current block). The reference block may be flipped in the direction relative to the current block. The BVP may have a BVP component in the direction, The BVP may be within a range of values defining the reference region in the direction. The current block may be an RRIBC coded block (e.g., as described herein with respect to FIG. 20). The encoder may determine (or the decoder may receive and/or decode an indication of) the direction, for flipping the reference block, relative to the current block coded in the RRIBC mode.

Determining the BVD may comprise a decoder receiving the BVD via a bitstream. The decoder may receive an indication of a presence of the encoded BVD in the bitstream and receive (and/or determine) the BVD from the bitstream, for example, based on one or more syntax elements decoded from the bitstream.

At step 2604, the BVD may be binarized (at the encoder). At step 2654, the BVD may be debinarized/decoded (at the decoder). The BVD may be binarized or debinarized, for example, based on the range of values defining the reference region in the direction. The BVD may be coded (e.g., encoded/binarized by the encoder and/or decoded/debinarized by the decoder) based on an entropy code. The entropy code may be a prefix code having the prefix property. The prefix property may be, for example, that no whole codeword is a prefix part (an initial segment) of any other codeword. The entropy code may be based on (e.g., a variant of) a Golomb code (e.g., a Rice-Golomb code or an exponential Golomb code). The exponential Golomb code may encode/decode an input symbol, such as the BVD, using an associated parameter k.

At step 2604 or step 2654, the BVD may be more efficiently binarized or debinarized, respectively. This may differ with respect to conventional entropy coders that do not consider a range of the BVD values and/or a maximum possible BVD value. The BVD may be binarized or debinarized, for example, based on a range of values (e.g., defining the reference region in the direction) that indicates the range of BVD values. The range of BVD values may be determined, for example, before coding the BV. The BVP may be selected/determined to have the BVP component being within the range of BVD values. Step 2604 may comprise one or more of steps 2606-2608. Step 2654 may comprise one or more of steps 2656-2658.

At step 2606 or step 2656, a first BVD value (e.g., $v_{max}$) may be determined. The first BVD value may be determined, for example, based on the range of values. The first BVD value may be a value that a magnitude of the BVD does not exceed. For example, the first BVD value may be a maximum BVD value possible for the BVD. The first BVD value may be the maximum BVD value in a range of possible BVD values for the BVD. The BVD (indicating the difference between the BV and the BVP) may be aligned in the direction. The BVD (indicating the difference between the BV and the BVP) may be aligned in the direction, for example, because both the BV and the BVP may be aligned in the direction of the reference region. The BVD may have at least one component (e.g., horizontal or vertical), not corresponding to the direction, that is zero. The magnitude of the BVD may refer to the magnitude of a BVD component (of the BVD) that corresponds to the direction. The BVD component may be a non-zero value. The BVD component (and the BVD) may indicate a difference between a BV component (corresponding to the direction) of the BV and the BVP component. As used herein, The BVD may refer/correspond to the BVD component in the direction of flipping.

The first BVD value may be determined based on a difference between: a maximum value of the range of values, and a minimum value of the range of values. The first BVD value may be determined as being equal to the difference. A magnitude of the BVD may not exceed a length of the reference region in the direction of flipping, for example, based on a list of BVPs, from which the BVP is determined/selected, being within the reference region. The length may be equal to the difference.

The first BVD value may be determined as a value that is equal to a product of a fraction and the difference. The fraction may be a proper fraction (e.g., a fraction between 0 and 1, inclusive). The fraction maybe a preconfigured fraction (e.g., a preconfigured proper fraction). The fraction may be determined based on the list of BVPs. For example, the fraction maybe be one-half, one-third, one-fourth, etc.

The BVP may be determined (or selected) from a plurality of BVPs. The plurality of BVPs may comprise: a first BVP having a first BVP component and a second BVP having a second BVP component. The first BVP component may correspond to (e.g., be aligned with) the direction. The first BVP may be equal to a minimum value of the range of values. The second BVP component may correspond to (e.g., be aligned with) the direction. The second BVP may be equal to a maximum value of the range of values. Each component, of the first BVP and the second BVP, not corresponding to the direction may be ignored, omitted, and/or set to zero. For the first BVP equal to a minimum value of the range of value and the second BVP equal to a maximum value of the range of values, the fraction (which may be preconfigured) may be one-half.

At step 2608, the BVD may be binarized (e.g., encoded). At step 2658, the BVD may be or debinarized (e.g., decoded). The BVD may be binarized (e.g., encoded) or debinarized (e.g., decoded), for example, based on the first BVD value. The BVD may be binarized or debinarized, using an entropy code, based on the first BVD value (e.g., as described herein with respect to FIGS. 23-25, and further described herein with respect to FIGS. 27A, 27B, 28, and 29). The BVD may be binarized or debinarized based on the BVD component (in the direction). The BVD may be binarized or debinarized without using a second BVD component (of the BVD) based on the second component not corresponding to the direction. For horizontal flipping, the BVD at step 2608 or step 2658 may refer to a horizontal component of the BVD and not the vertical component of the BVD (e.g., which may be set to zero, may be inferred, and/or not encoded/decoded).

A prefix value for a BVD may not exceed a first prefix value. The first prefix value may be determined, for example, based on the first BVD value. The first prefix value may be the maximum prefix value, in a range of prefix values, to represent a possible BVD value from, for example, 0 to the first BVD value. The BVD may be binarized and/or debinarized based on the first prefix value (e.g., as described herein with respect to FIGS. 27-33).

The BVD (e.g., a value of a BVD component of the BVD) may be binarized as (and/or debinarized from) a codeword having a prefix part and a suffix part. The suffix part may be determined with a bit length indicated by the prefix part. The suffix part may be determined with a bit length that is based on the determined prefix part and a threshold. The threshold may be determined based on the first BVD value and the first prefix value. The suffix part may be determined to have a bit length that is based on the prefix part and a comparison of a property of the prefix part with the determined threshold (e.g., as described herein with respect to FIGS. 31-33).

Figure 27A:
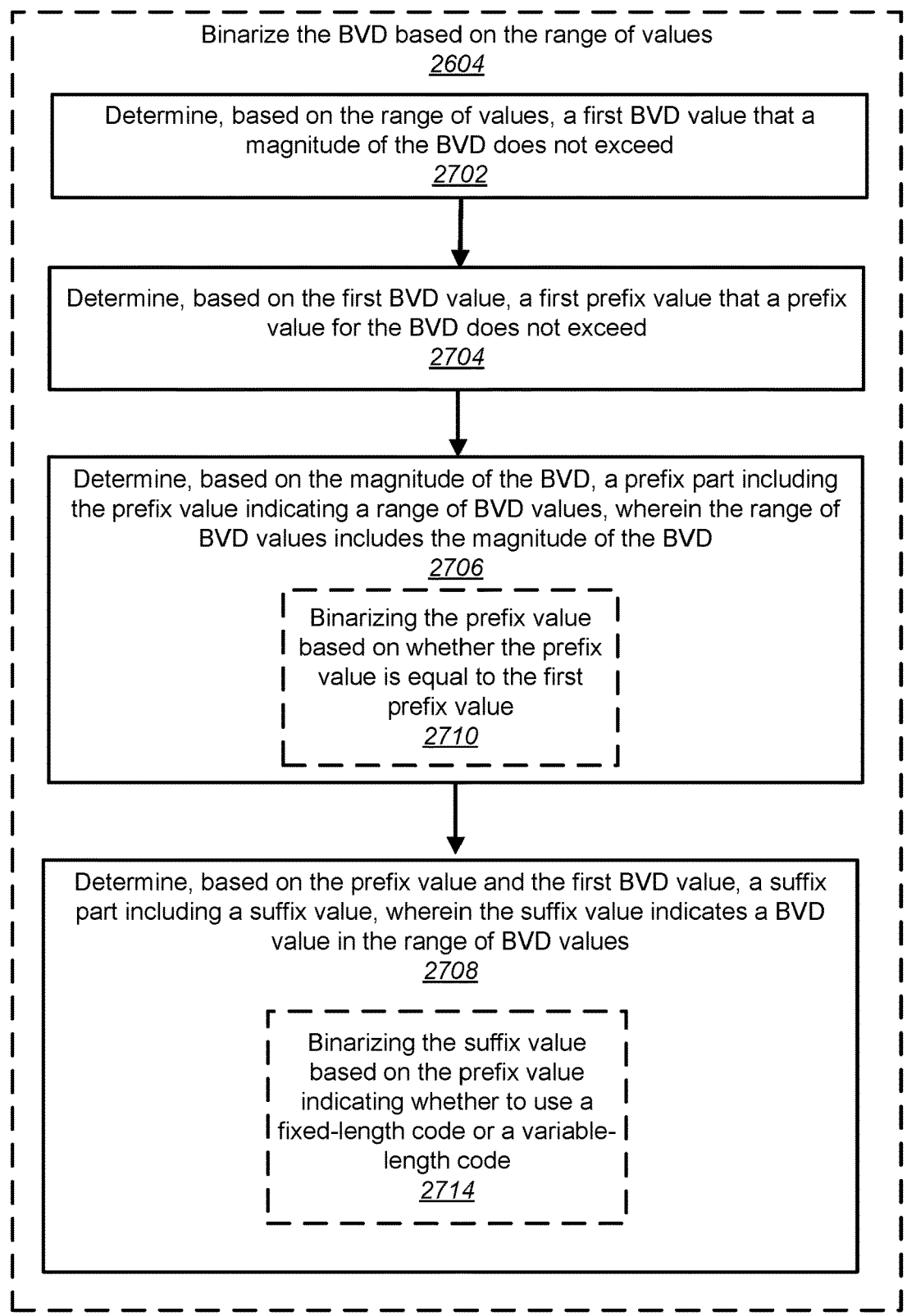
FIG. 27A shows an example method for encoding a BVD.
Figure 27B:
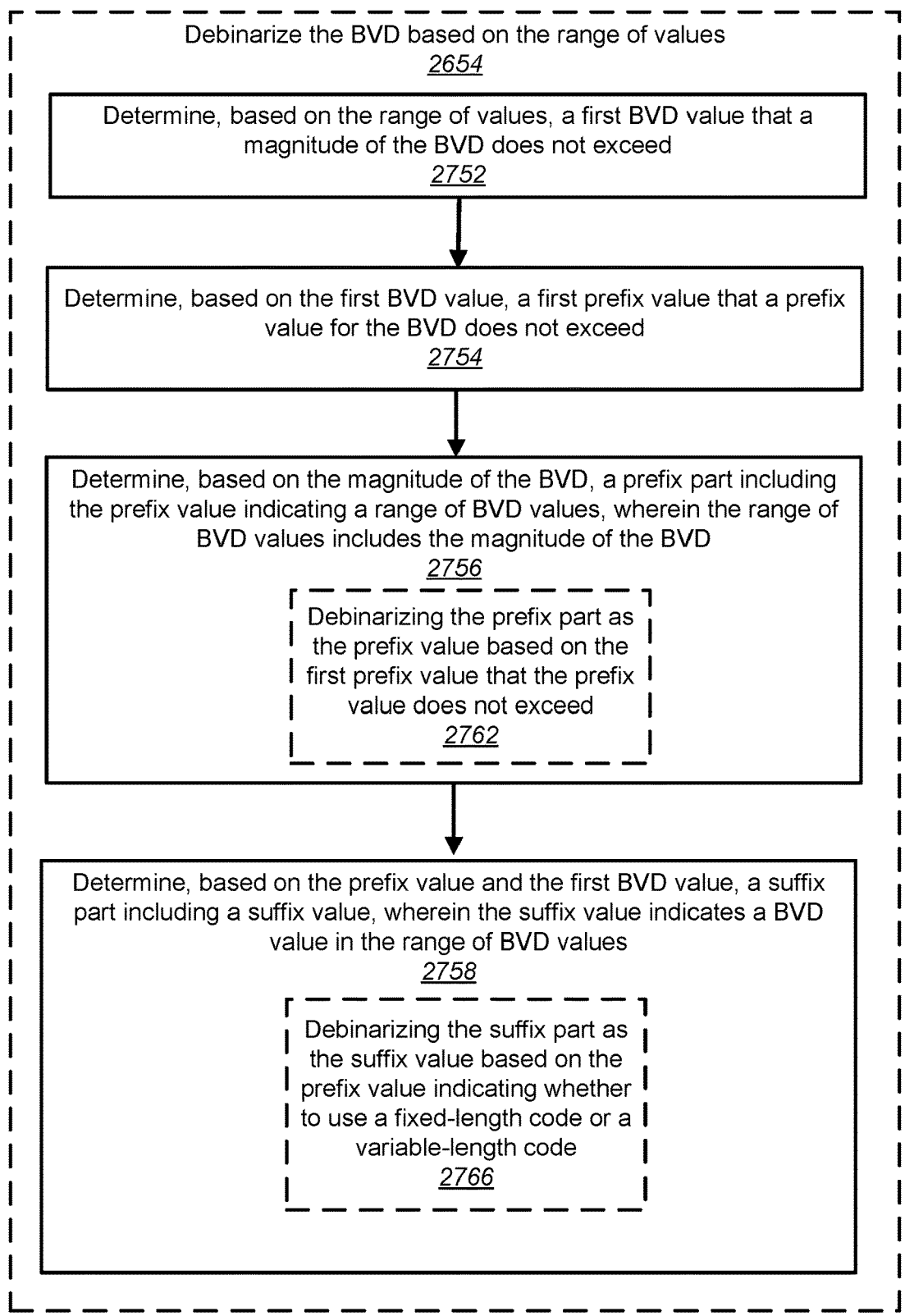
FIG. 27B shows an example method for decoding a BVD.

FIG. 27A shows an example method for encoding a BVD. FIG. 27B shows an example method for decoding a BVD. The BVD may be represented as a codeword comprising a prefix part and a suffix part. The method 2700 of FIG. 27A shows binarization of the BVD based on a range of values (e.g., as described at step 2604 in FIG. 26A). The method 2750 of FIG. 27B shows debinarization of the BVD based on a range of values (e.g., as described at step 2654 in FIG. 26B). The method 2700 may be implemented by an encoder (e.g., encoder 200 in FIG. 2). The method 2750 may be implemented by a decoder (e.g., decoder 300 in FIG. 3).

At step 2702 and/or step 2752, a first BVD value (e.g., a maximum BVD value or $v_{max}$) may be determined based on the range of values. A magnitude of the BVD may not exceed the first BVD value. Step 2702 may correspond to step 2606 of FIG. 26A, as described herein. Step 2752 may correspond to step 2656 of FIG. 26B, as described herein.

At step 2704 and/or step 2754, a first prefix value (e.g., a maximum prefix value or $v_{p\_max}$ as shown in equation (34)) may be determined. The first prefix value may be determined, for example, based on the first BVD value. A prefix value for the BVD may not exceed the maximum prefix value. The first prefix value may correspond to an upper bound of a range of possible prefix values determined based on the first BVD value. The first prefix value may be determined as described herein with respect to FIGS. 23-25. The BVP and the BV may be within/associated with the same reference region (e.g., RRIBC reference region). The BVD may be determined to be within a range of BVD values (e.g., between zero and the first BVD value/maximum BVD value), for example, based on the BVP and the BV being within with the same reference region. The first prefix value may be determined, for example, before coding the prefix part of the codeword representing the BVD (e.g., as described herein with reference to FIGS. 23-25).

At step 2706 and/or step 2756, a prefix part may be determined (e.g., including/indicating a prefix value). The prefix part may be determined (e.g., including/indicating a prefix value), for example, based on the magnitude of the BVD. The prefix value may indicate a range of BVD values that comprise the magnitude of the BVD.

The prefix part may be unary coded. The prefix part may comprise a unary value (e.g., a value represented as a continuous sequence of 1s) and a termination bit (e.g., 0) that is the opposite of a bit value of the unary value. The prefix part may be truncated unary coded, based on the first BVD value, to increase efficiency of coding the prefix part (e.g., as described herein with respect to FIGS. 23-25). The prefix part, that is truncated unary coded, may comprise/indicate the first prefix value (e.g., corresponding to a maximum prefix value of a range of possible prefix values). The first prefix value may omit/not comprise the termination bit. The termination bit may be a delimiter bit that separates/delimits the prefix part from a set of binary strings (e.g., bits) that follow (e.g., representing the suffix part). Any BVD value, that is within a range of BVD values indicated by a prefix value equal to the first prefix value, may be coded using one less bit, for example, due to the omission of the delimiter bit.

It may be determined whether the prefix value is equal to the first prefix value. The prefix value may be determined as: a first unary value with a termination bit based on the prefix value not being equal to the first prefix value; and a second unary value without the termination bit based on the prefix value being equal to the first prefix value.

At step 2710, the prefix value may be binarized at the encoder. The prefix value may be binarized at the encoder, for example, based on whether the prefix value is equal to the first prefix value. At step 2762, the prefix part may be debinarized at the decoder as the prefix value. The prefix part may be debinarized at the decoder as the prefix value, for example, based on the first prefix value that the prefix value does not exceed. Both the encoder and the decoder may independently determine the first prefix value at step 2704 (e.g., as described herein).

At step 2708 and/or at step 2758, a suffix part (e.g., including/indicating a suffix value) may be determined. The suffix part (e.g., including/indicating a suffix value) may be determined, for example, based on the prefix value and the first BVD value. The suffix value may indicate a precise BVD value in the range of the BVD values. The precise BVD value may correspond to (or may be equal to) the magnitude of the BVD. The magnitude of the BVD may be calculated, for example, based on the prefix value and the suffix value (e.g., as described herein with respect to FIGS. 21-25).

Figure 28:
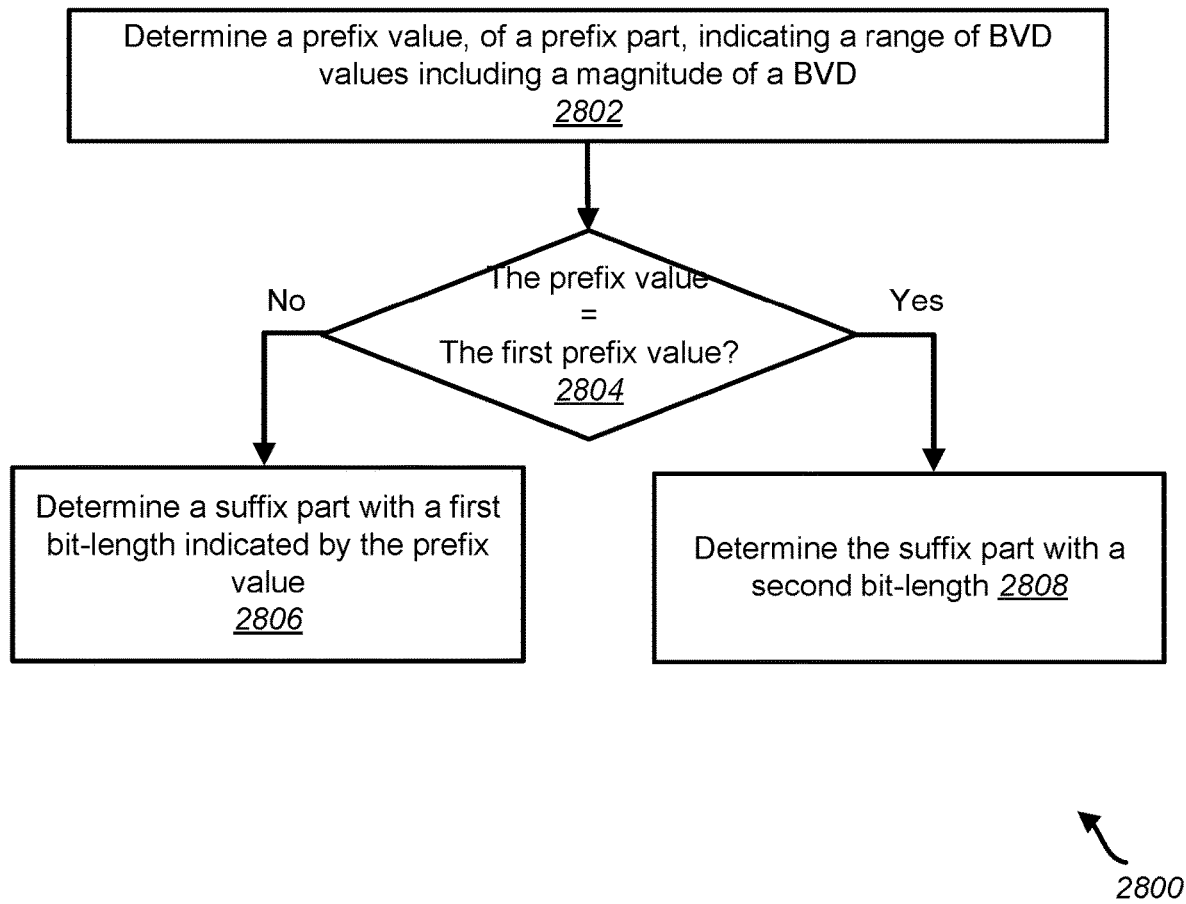
FIG. 28 shows an example method for determining a prefix part and a suffix part of a codeword.
Figure 29:
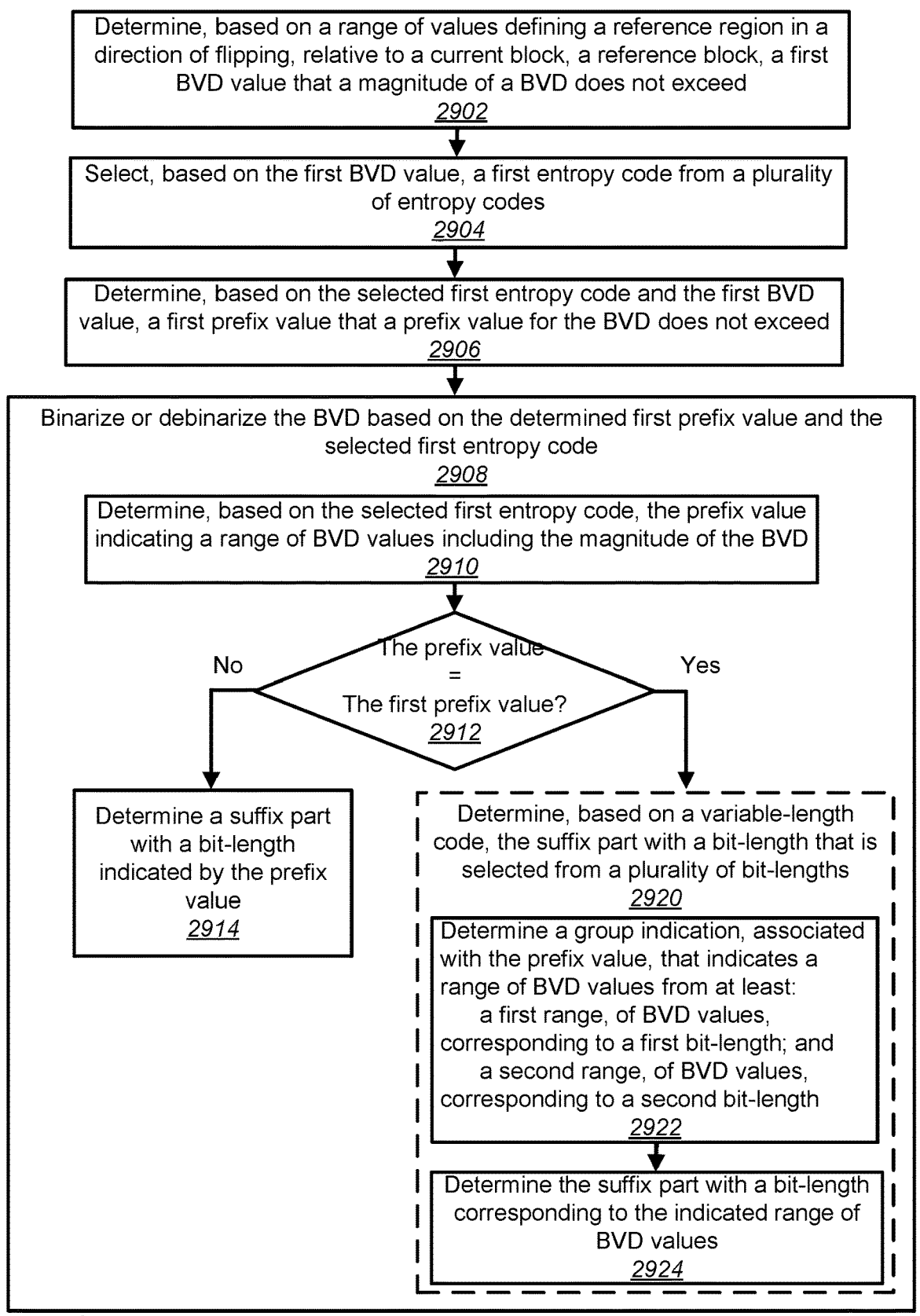
FIG. 29 shows an example method for determining a prefix part and a suffix part of a codeword.

The suffix part may be determined, for example, based on determining whether the prefix value is equal to the first prefix value (e.g., as described herein with respect to FIGS. 28-29). The suffix part may be determined with a first bit length indicated by the prefix value, for example, based on the prefix value not being equal to the first prefix value. The first bit length for determining (e.g., encoding and/or decoding) the suffix part may be computed as a sum of a quantity of (non-termination) bits of the prefix value (e.g., represented as a unary value which does not include the termination bit) and a constant value (e.g., as shown in equation (25)). The constant value may be equal to a binarization parameter k for the entropy code (e.g., such as exponential Golomb code) used to code the BVD.

The suffix part may be determined with a second bit length (e.g., that may be different than the first bit length), for example, based on the prefix value being equal to the first prefix value. The second bit length may be determined based on a minimum quantity of bits ($N_D$) needed to represent a difference (d) between the first BVD value and a minimum BVD value of a range of BVD values indicated by the first prefix value (e.g., as described herein with respect to FIG. 24). The values $N_D$ and d may be determined based on equations (35) and (38). The suffix part may be coded as a fixed-length code whose length is determined, for example, based on whether the prefix value is equal to the first prefix value.

The suffix part may be determined based on the prefix value indicating whether to use a fixed-length code or a variable-length code. The fixed-length code may be a binary code with a bit length that is the same for the range of BVD values indicated by a prefix value in the prefix part. The variable-length code may be a truncated binary code (e.g., as shown in FIG. 23). The variable-length code may be an entropy code that selects/indicates one of multiple bit lengths for the same prefix value based on a group selection indication (e.g., as shown in FIG. 25). The prefix value may indicate (or may be associated with) the variable-length code, for example, based on the prefix value being equal to the first prefix value (e.g., $v_{p\_max}$). The prefix value may indicate (or may be associated with) a fixed-length code, for example, based on the prefix value not being equal to (e.g. being less than) the first prefix value (e.g., $v_{p\_max}$). The suffix part may be determined with a bit length that is based on the first BVD value and a second prefix value, for example, based on the prefix value being equal to the first prefix value (and indicating the variable-length code). The second prefix value may be equal to a sum of a minimum BVD value, of a range of BVD values indicated by a prefix value equal to the first prefix value, and one.

The first BVD value (corresponding to the maximum possible BVD value $v_{max}$) need not be equal to a sum of any sequence of powers of 2. In such instances, some BVD values (and corresponding u codewords), in a range of BVD values indicated by the first prefix value, may be idle/unused and may never be used given the range of values at block 2702. The variable-length code may be indicated/selected to reduce (and/or minimize) the quantity of unused codewords u, representing BVDs (e.g., BVDs greater than the first BVD value) outside of the possible range of BVDs, for example, based on the prefix value being equal to the first prefix value.

At step 2708 the suffix value may be binarized at the encoder. The suffix value may be binarized at the encoder, for example, based on the prefix value indicating whether to use the fixed-length code or the variable-length code. At step 2766 the suffix part may be debinarized at the decoder as the suffix value. The suffix part may be debinarized at the decoder as the suffix value, for example, based on the prefix value (e.g., determined at block 2762) indicating whether to use the fixed-length code or the variable-length code.

FIG. 28 shows an example method for determining a prefix part and a suffix part of a codeword. The prefix part and the suffix part may be determined, for example, based on a first prefix value (e.g., a maximum prefix value, $v_{p\_max}$) that a prefix value of the BVD does not exceed. The method 2800 of FIG. 28 may correspond to steps 2706, 2708, 2756, and 2758, as described herein with respect to FIGS. 27A and 27B. The method 2800 describes binarization (at the encoder) and/or debinarization (at the decoder) of the BVD to determine the prefix part and the associated suffix part (e.g., as described at steps 2706 and 2708, and steps 2756 and step 2758, respectively, with respect to FIGS. 27A and 27B).

The method 2800 may comprise determining the first BVD value (e.g., representing a maximum possible magnitude of the BVD) and the first prefix value (e.g., representing a maximum possible prefix value of the prefix part for the codeword). The determining the first BVD value and the first prefix value may be as described herein with respect to steps 2702, 2704 of FIG. 27A and steps 2752, 2754 of FIG. 27B. The entropy code described in method 2800 may correspond to one of the entropy codes described herein with respect to FIG. 23 and FIG. 24. The method 2800 may be implemented by an encoder (e.g., encoder 200 as shown in FIG. 2) and/or a decoder (e.g., decoder 300 as shown in FIG. 3).

At step 2802, a prefix value (of the prefix part) may be determined. The prefix value may indicate a range of BVDs (e.g., corresponding to a range of BVD values). The range of BVDs may comprise a BVD (e.g., associated with a magnitude of the BVD). The BVD may indicate a difference between a BV (e.g., associated with a current block coded in an RRIBC mode) and a determined BVP (e.g., as described herein with respect to FIGS. 20-26). Step 2802 may correspond to step 2706 in FIG. 27A or step 2756 of FIG. 27B.

At step 2804, it may be determined whether the prefix value is equal to the first prefix value. Determining whether the prefix value is equal to the first prefix value may be equivalent to or comprise determining whether the prefix value is less than the first prefix value (e.g., because the prefix value was determined to be no more than the first prefix value).

At step 2806, a suffix part may be determined with a first bit length. The suffix part may be determined with a first bit length, for example, if the prefix value is not equal to the first prefix value. The first bit length may correspond to or may be indicated by the prefix value. The first bit length may depend on (or be based on) a quantity of bits of a unary value representing the prefix value and/or a binarization parameter k (e.g., as described herein with respect to step 2708). Step 2806 may correspond to how a suffix part of an exponential Golomb code is determined based on the determined prefix part.

At step 2808, the suffix part may be determined with a second bit length. The suffix part may be determined with a second bit length, for example, if the prefix value is equal to the first prefix value. The second bit length may be based on the prefix value. The second bit length may be different from the first bit length and may be calculated/determined, for example, as described herein with respect to step 2708 of FIG. 27A or step 2758 of FIG. 27B.

The second bit length may be a fixed bit length that represents the range of BVD values (e.g., $P_s$ corresponding to $v_{p\_max}$ as shown in equations (31) and (34), respectively) indicated by the first prefix value. The second bit length may be determined, for example, based on the first BVD value. The second bit length may be determined based on a minimum quantity of bits ($N_D$ as shown in equation (38)) to represent a difference (d as shown in equation (35)) between the first BVD value and a minimum BVD value (e.g., of the range of BVD values indicated by the first prefix value).

The prefix value may indicate to use a variable-length code, for example, based on the prefix value being equal to the first prefix value (e.g., as described herein with respect to step 2708 of FIG. 27A or step 2758 of FIG. 27B). The suffix part may be determined (e.g., binarized by the encoder, and/or debinarized by the decoder) as a truncated binary code, for example, based on the prefix value being equal to the first prefix value. The second bit length may be determined as one of a third bit length or a fourth bit length. The fourth bit length may be one more than the third bit length.

FIG. 29 shows an example method for determining a prefix part and a suffix part of a codeword. The prefix part and the suffix part of the codeword may be determined, for example, based on a first prefix value (e.g., a maximum prefix value) that a prefix value may not exceed. The method 2900 of FIG. 29 may correspond to step 2706 and step 2708 (e.g., as described herein with respect to FIG. 27A) and/or step 2756 and step 2758 (e.g., as described herein with respect to FIG. 27B). The entropy code described in method 2900 may correspond to the entropy code described herein with respect to FIG. 25. The method 2900 may be implemented by an encoder (e.g., encoder 200 in FIG. 2) and/or a decoder (e.g., decoder 300 in FIG. 3).

At step 2902, a first BVD value (e.g., $v_{max}$) may be determined. The first BVD value (e.g., $v_{max}$) may be determined, for example, based on a range of values defining a reference region (e.g., RRIBC reference region). The reference region may be in a direction of flipping a reference block relative to a current block. A magnitude of a BVD may not exceed the first BVD value. Step 2902 may correspond to step 2606 of FIG. 26A, step 2656 of FIG. 26B, step 2702 of FIG. 27A, or step 2752 of FIG. 27B, as described herein. The reference block may be located in the reference region and the current block may be coded in an RRIBC mode.

At step 2904, a first entropy code may be selected/determined from a plurality of entropy codes. The first entropy code may be selected/determined from a plurality of entropy codes, for example, based on the first BVD value. The plurality of entropy codes may comprise prefix codes. The plurality of entropy codes may comprise a Golomb code, a Rice-Golomb code, an exponential Golomb code, etc. The plurality of entropy codes may comprise the first entropy code and a second entropy code. The second entropy code may correspond to a prefix code that converts an input symbol (e.g., the magnitude of the BVD) into a codeword. The codeword, generated by the second entropy code, may comprise a variable-length prefix part and a fixed-length suffix part corresponding to the variable-length prefix part. The second entropy code may be an exponential Golomb code conventionally used to code BVDs. Conventional entropy codes, such as a Golomb Code or exponential Golomb code, may be inefficient if coding a BVD known to be within a range of BVD values (e.g., having a magnitude that is constrained/limited to be no more than the first BVD value). The conventional entropy code may be enhanced by implementing a variable-length suffix part. The selected first entropy code may convert an input symbol (e.g., the magnitude of the BVD) into a codeword. The codeword, generated by the first entropy code, may comprise a variable-length prefix part and a variable-length suffix part for one or more specific prefix values of the prefix part.

At step 2906, a first prefix value (e.g., $v_{p\_max}$ as shown in equation (34)) may be determined. The first prefix value (e.g., $v_{p\_max}$ as shown in equation (34)) may be determined, for example, based on the selected first entropy code and the first BVD value. A prefix value for the BVD may not exceed the first prefix value. The first prefix value may correspond to a maximum possible prefix value computed for the BVD (e.g., as described herein with respect to step 2704 of FIG. 27A or step 2754 of FIG. 27B). A possible prefix value in a range of (possible) prefix values (e.g., except if the possible prefix value is equal to the first prefix value or the maximum prefix value in the range of prefix values), may correspond to a respective range of BVD values having a quantity of BVD values equal to an exponent of 2. The first prefix value may correspond to a range of BVD values having a quantity of BVD values that is equal to a sum of a first exponent of two and a second exponent of two. The second exponent may be equal to a sum of the first exponent and one (e.g., one more than the first exponent).

At step 2908, the BVD may be binarized or debinarized. The BVD may be binarized or debinarized, for example, based on the determined first prefix value (e.g., as determined at step 2906) and the selected first entropy code (e.g., as selected at step 2904). Step 2907 may comprise one or more of steps 2910-2924, as described herein.

At step 2910, a prefix value may be determined. The prefix value may be determined, for example, based on the selected first entropy code. The prefix value may indicate a range of BVDs (e.g., range of BVD values) that includes the magnitude of the BVD.

At step 2912, it may be determined whether the prefix value is equal to the first prefix value. The prefix value, if equal to the first prefix value, may indicate a range of BVD values. The range of BVD values may comprise: a first range, of BVD values, corresponding to a first bit length; and a second range, of BVD values, corresponding to a second bit length. For example, as shown in FIG. 25, the suffix parts 2506A and 2506B both correspond to prefix part 2504, but have different bit lengths.

At step 2914, a suffix part may be determined with a bit length indicated by the prefix value. The suffix part may be determined with a bit length indicated by the prefix value, for example, based on (or in response to) the prefix value not being equal to the first prefix value. Step 2914 may be performed, for example, based on the prefix value being less than the first prefix value. The bit length $N_s$ of the suffix part (e.g., as determined at step 2914) may be determined, for example, based on equation (25). The bit length $N_s$ of the suffix part (e.g., as determined at step 2914) may be equal to a sum of a bit length of the prefix value/part and a constant. The constant may be based on a parameter of the selected first entropy code (e.g., parameter k in an exponential Golomb code). The constant may be k−1, or any other function of k.

At step 2920, a variable length code may be determined to be used for the suffix part. The variable length code may be determined to be used for the suffix part, for example, based on (or in response to) the prefix value being equal to the first prefix value. The suffix part may be determined with a bit length that is selected from a plurality of bit lengths, for example, based on the variable-length code. The prefix value may indicate that the suffix part is coded using the variable-length code, for example, based on (or in response to) the prefix value being equal to the first prefix value (e.g., as described herein with respect to steps 2714 and 2766 of FIG. 27A and FIG. 27B, respectively). Step 2920 may comprise steps 2922 and 2924, as described herein.

At step 2922, a group indication, associated with the prefix value, may be determined. The group indication may indicate a range of BVD values from at least the first range and the second range. The first range of BVD values may correspond to a first bit length and the second range of BVD values may correspond to a second bit length. The group indication may be appended to the prefix part. At the encoder, the group indication may be determined and appended/concatenated to the prefix part as a binary string with a fixed bit length. At the decoder, the group indication may be identified/determined as a binary string, with a fixed bit length, appended/concatenated to the prefix part in a bitstream being decoded. The group indication may be a one-bit value that indicates (or selects) one of the two ranges of BVD values. The group indication may have any other bit length. The group indication may select from more than two ranges. The group indication may be a two-bit value that indicates (or selects) one of four ranges of BVD values.

At step 2924, the suffix part may be determined with a bit length corresponding to a range of BVD values. The suffix part may be determined, for example, with a bit length corresponding to the indicated (or selected) range of BVD values at block 2922. The suffix value may be binarized (at the encoder) as a suffix part with the indicated bit length. The suffix part may be debinarized (at the decoder), based on the indicated bit length, to determine the suffix value.

The second bit length may be equal to a sum of the first bit length and one (e.g., one more than the first bit length). The first bit length may be the same as a bit length associated with a second prefix value. The second prefix value may be one less the first prefix value.

A prefix range (e.g., the prefix range 2104 of prefix values, as described herein with respect to FIG. 21) may be used in codewords to represent a known BVD range (e.g., BVD range 2102), up to a first BVD value (e.g., a maximum BVD possible value, $v_{max}$). The prefix range 2104 may correspond to more available codewords 2108 than codewords 2106 needed for the BVD range 2102. FIGS. 23-29 describe various mechanisms and/schemes for reducing the quantity of unused codewords (e.g., corresponding to the prefix range 2104 for the coding BVD range 2102). The coding mechanisms/schemes enable the use of fewer bits to code possible values in the BVD range 2102, in comparison to a conventional exponential Golomb code. Compression efficiency of the BVD may be increased by reducing the quantity of bits needed for coding the BVD range 2102. Various examples herein further describe binarization schemes/codes that combine aspects of binarization schemes described herein with respect to FIGS. 23 and 25.

Figure 30:
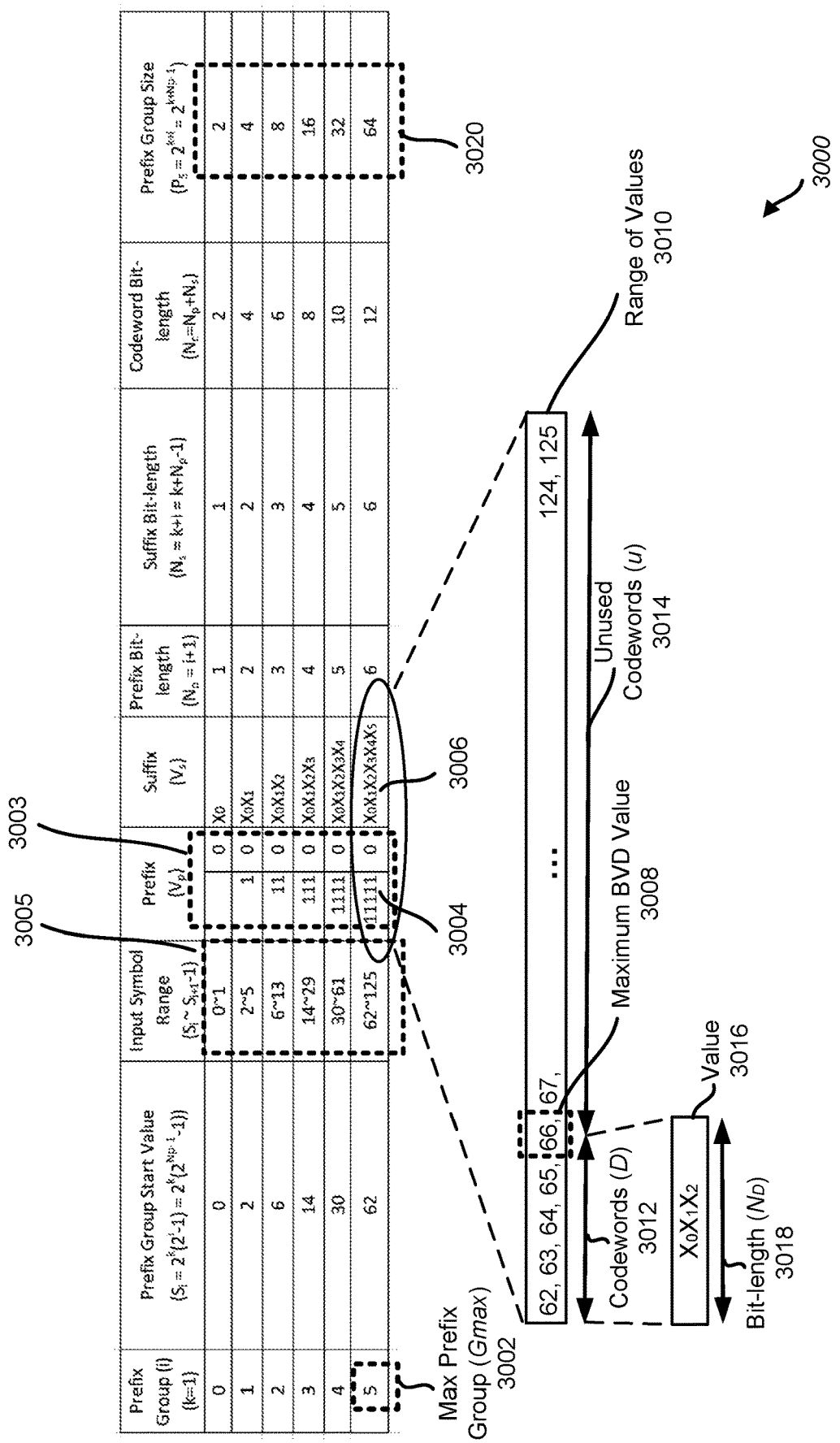
FIG. 30 shows an example table with bit lengths of codewords of an entropy code.

FIG. 30 shows an example table with bit lengths of codewords of an entropy code. The entropy code may be used for coding a BVD. Table 3000 of FIG. 30 shows an example of an exponential Golomb code with order k equal to 1. The exponential Golomb code may map a set of input symbols to a prefix part and a suffix part.

The example exponential Golomb code with k=1, as shown in table 3000, may have properties determined based on a prefix group i (e.g., which may correspond to a quantity of continuous 1s of a prefix value), binarization parameter k, and/or a bit length of the prefix value $N_p$ (which is equal to i+1) (e.g., in a manner similar as described herein with respect to FIGS. 21-25 for exponential Golomb code with order k equal to 0). For example, the exponential Golomb code of table 3000 may be associated with: a prefix group start value $S_i$ (e.g., as described herein with respect to equation (32)), a range of values (e.g., $S_i$ to $S_{i+1}-1$) indicated by a prefix value corresponding to prefix group i, the prefix value $v_p$ (e.g., including i-ones following by a termination bit), a suffix value $v_s$ (e.g., indicated by bits $x_{it}$ and determined as described herein with respect to equation (27)), a prefix bit length $N_p$ ($N_p$=i+1, as described herein with respect to equation (26)), a suffix bit length $N_s$ (e.g., as described herein with respect to equation (25)), a codeword bit length $N_C$ (e.g., as described herein with respect to equation (28)), and a prefix group size $P_s$ (e.g., as described herein with respect to equation (31)). The prefix group size corresponding to a prefix value (and associated prefix group) may be a quantity of values in a range of values indicated by the prefix value.

A syntax element for coding video content may be determined to be in a range of values (e.g., 0 to a maximum value (e.g., $v_{max}$)). For coding the BVD, a first BVD value may be determined as a value that the BVD does not exceed. For example, with respect to coding the BVD, a first BVD value (e.g., maximum BVD value 3008) may be determined as a value that the BVD (e.g., a magnitude of the BVD, or a magnitude of a component of the BVD) does not exceed. A possible BVD value may be in a range of BVD values with an upper bound equal to the maximum BVD value 3008. The maximum BVD value 3008 may be determined as described herein with respect to FIGS. 20, 21, 26, and 27. A first prefix value (e.g., maximum prefix value 3004) may be determined for the maximum BVD value 3008 (e.g., a value of 66). A prefix value for coding the BVD may not exceed the first prefix value. In table 3000, the first prefix value is shown as 111110, including a unary value 11111 and a termination bit 0. The first prefix value ($v_{p\_max}$) may be determined based on the first/maximum BVD value ($v_{max}$), as described herein with respect to equations (33) and (34). The first prefix value ($v_{p\_max}$) may have a bit length $N_{p\_max}$ (e.g., as described herein with reference to equation (33)).

For a k-th order exponential Golomb code, a prefix value may indicate a range of values. The quantity of values in the range (e.g., size of the range) $P_s$ (e.g., as described herein with respect to equation (31)) may be based on a power of two and the parameter k. For example, for k=1, a prefix value of 111110 (e.g., with i=5 ones) may indicate a range of values 62-125, which has a size of 64 (e.g., $2^{1+5}=64$). As shown in table 3000, a sequence of prefix values 3003 may correspond to a sequence of value ranges 3005. The sequence of value ranges 3005 may be associated with a sequence of corresponding sizes 3020 (e.g., of powers of two). A sequence of consecutive prefix values may correspond to a sequence of sizes of value ranges with consecutively increasing exponents of two.

The maximum prefix value 3004 may be associated with a suffix value 3006 having a bit length $N_s$ (e.g., 6) that is based on the corresponding prefix value (e.g., as shown in equation (25)). The maximum prefix value 3004 may correspond to maximum prefix group ($G_{max}$) 3002 of value 5 (i=5) and may indicate a range of values 3010 (e.g., 62-125). A start value of the range of values 3010 (e.g., prefix group start value for prefix group of 5) may be 62, which is the smallest value in range of values 3010. A quantity of codewords D 3012 may be used to code possible BVD values in the range of values 3010 (e.g., from the start value 62 to the maximum BVD max value 3008 of 66). The quantity of codewords D 3012 may be determined, for example, as a sum of one and a difference d between the maximum BVD value 3008 and the start value (e.g., 62) in the range 3010. The start value may be indicated by the maximum prefix value 3004. The difference d and the quantity of codewords D may be determined, for example, based on maximum BVD value 3008 (e.g., as described herein with respect to equations (35) and (36), respectively).

The values in the range 67-125 may correspond to unused codewords (u) (e.g., as described herein with respect to equation (37)). The values in the range 67-125 may correspond to unused codewords (u) because the range of values 3010 (indicated by the prefix value 3004) has a prefix group size of 64 (and indicates BVD values in the range of 62-125) and may contain values larger than the maximum BVD value 3008. There may be a quantity of unused codewords (u) 3014 that corresponds to a difference between a size of the range of values 3010 and a quantity of codewords D 3012. For example, for maximum BVD value 3008 of 66, D may be 5 and u may be 59.

A minimum bit length ($N_D$) 3018 (e.g., corresponding to/indicating value 3016 of the suffix part) to code and/or represent the quantity of codewords (D) 3012 (e.g., corresponding to the maximum prefix value 3004) may be determined (e.g., as described herein with respect to FIG. 24 and equation (38)). A quantity of two to the power of the bit length 3018 ($2^{ND}$) codewords may be represented using the bit length 3018. The suffix part 3006 may be coded using the determined (smaller) bit length ($N_D$) 3018 such that fewer codewords would be unused (e.g., instead of determining the suffix part 3006 with a bit length 6 for the maximum prefix value 3004, in accordance with equation (25)). For example, coding using the value 3016 with the determined bit length ($N_D$) 3018 may result in only 3 codewords being unused (e.g., instead of 59 unused codewords (u) 3014 for suffix bit length of 6). Coding suffix part 3006 as a value 3016 with a smaller bit length 3018 (e.g., reducing bit length from 6 to 3) may result in larger values (e.g., which have a lower probability of occurring) being coded with less bits, which may reduce compression efficiency.

To avoid smaller bit lengths being used to code larger values, a range of values may be inserted as a new group of values. The range of values may be represented by a minimum quantity of bits required to code and/or represent the quantity of codewords (D) 3012 (e.g., value 3016 with bit length ($N_D$) 3018, corresponding to the maximum prefix value 3004). The range of values may be inserted as a new group of values such that the sizes (e.g., sizes 3020, or bit lengths) of the ranges of values (e.g., corresponding to prefix groups/values) are maintained in an increasing order. Maintaining the sizes 3020 of the ranges of values in an increasing order may allow the retention of increasing bit lengths of codewords for coding larger BVD values, which may improve coding efficiency.

One of the sizes 3020 may be repeated, which may result in the ranges of values 3005 indicated by prefix values 3003, being shifted by an offset. The offset may correspond to bit length ($N_D$) 3018 for prefix values greater than a threshold value. For example, the offset may include a set of possible values indicated by bit length (D). The offset may be equal to a power of two with an exponent equal to bit length ($N_D$) (e.g., offset=$2^{ND}$). The threshold value may be based on bit length ($N_D$) and/or a binarization parameter (e.g., k) for the binarization scheme/code.

Figure 31:
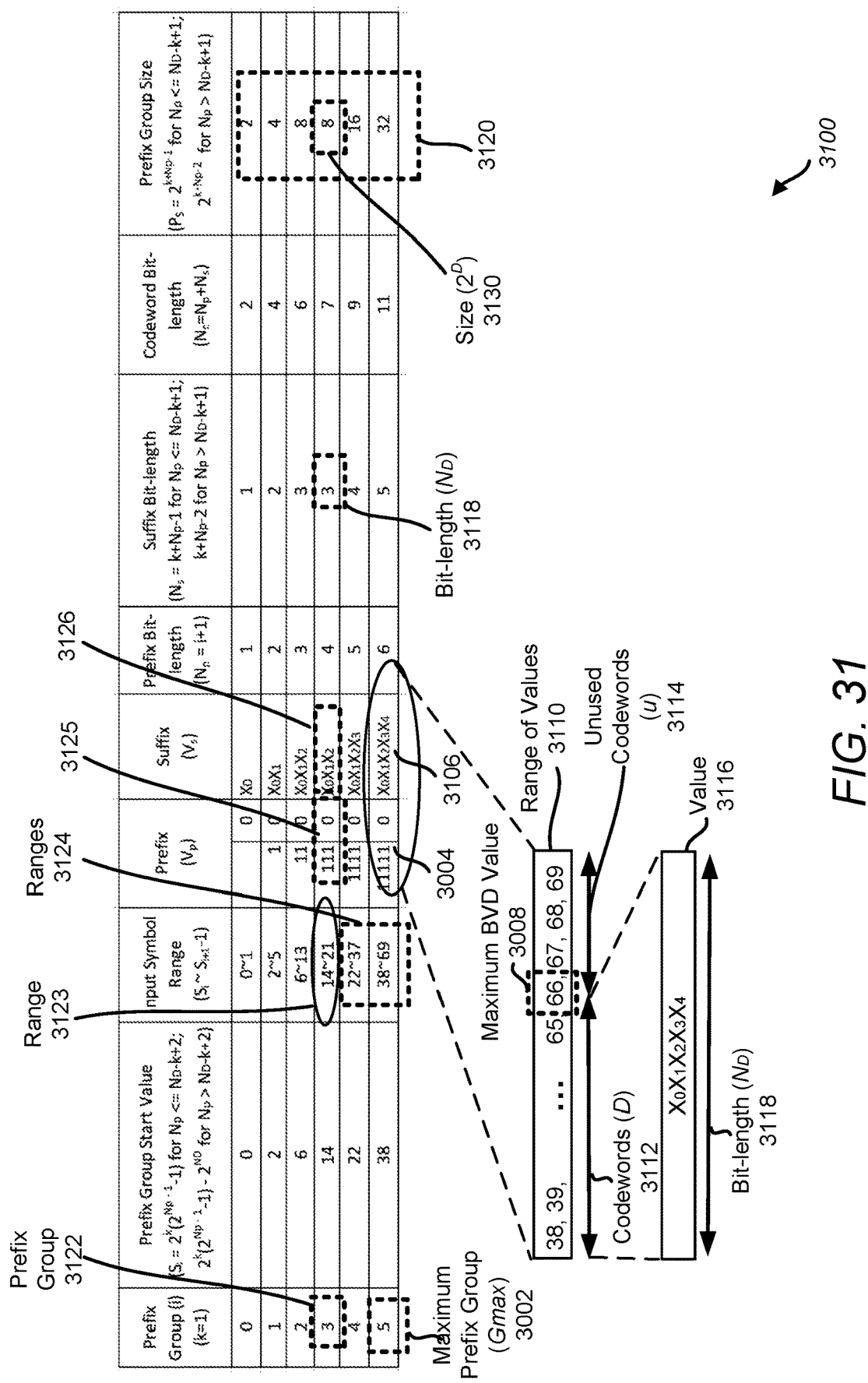
FIG. 31 shows an example table with an enhanced entropy code.

FIG. 31 shows an example table with an enhanced entropy code. The entropy code (e.g., a binarization scheme/code) may be for binarizing and/or debinarizing a BVD as a codeword. Binarizing and/or debinarizing the BVD may be based on a first BVD value (e.g., $v_{max}$) that a BVD may not exceed. The entropy code shown in FIG. 31 may be based on the example described herein with respect to FIG. 30. For example, similar to FIG. 30, for maximum BVD value 3008 of 66, an encoder and/or a decoder may determine: the maximum prefix group (Gmax) 3002 corresponding to the prefix value 3004, and the bit length ($N_D$=3) 3018. The prefix value 3004 may be the maximum prefix value $v_{P\_max}$ (e.g., as described herein with respect to equation (34)), in a range of prefix values, and may be used for representing the maximum BVD value 3008.

A range of values 3123 (e.g., range of 14-21) corresponding to suffix value 3126 (e.g., with bit length 3118 $N_D$=3) may be inserted as a new range/group of values. The range of values 3123 may be inserted to correspond to prefix group 3122 (e.g., i=3). The prefix group 3122 may correspond to prefix value 3125 of 1110. Bit length 3118 may be determined to be the same as bit length 3018. Suffix value 3126 may code the range of values 3123. Suffix value 3126 may code the range of values 3123, for example, if the suffix value 3126 is binary coded with bit length ($N_D$) 3118. The range of values 3123 may have a size 3130. The size 3120 may be equal to a power of two with an exponent equal to the bit length 3118 (e.g., size=$2^{ND}2^3$=8). An offset value (e.g., used to determine the range of values indicated by a given prefix value) may be determined to be equal to the size of values representable with bit length (D) 3018 (e.g., which is also size 3130). Ranges of values 3124 may be offset by the offset value (e.g., equal to size 3130) for prefix values greater than the prefix value 3125 (e.g., as compared to the ranges of values corresponding to prefix values smaller than (or equal to) prefix value 3125). The prefix values greater than the prefix value 3125 may correspond to prefix groups with indexes (i) that are greater than prefix group 3122 and less than or equal to max prefix group (Gmax) 3002. The prefix group i may represent a bit length of a unary value (e.g., number of 1s) portion of the prefix value.

The prefix group (i) 3122 may be determined as a threshold prefix group ($P_{th}$) based on a quantity $N_D$ (corresponding to bit length 3018) and/or a binarization parameter (e.g., parameter k for an exponential Golomb code). A threshold prefix value ($v_{p\_th}$) and a threshold prefix bit length ($N_{th}$) corresponding to the prefix group (i) 3122 may be determined. For example, $P_{th}$, $v_{p\_th}$, and $N_{th}$ may be determined as follows:

$$P_{th}=N_D-k+1 \tag{39}$$

$$N_{th}=P_{th}+1=N_D-k+2 \tag{40}$$

$$v_{p\_th}=2^k(2^{P_{th}}-1) \tag{41}$$

Start values corresponding to the ranges of values 3124 may be offset (in comparison to start values corresponding to the ranges of values 3005, as shown in FIG. 30) by an offset value (e.g., size 3130). Start values corresponding to the ranges of values 3124 may be offset as a result of the ranges of values 3124 being offset by the offset value. The start values for ranges of values that may be offset may correspond to the prefix values greater than or equal to $P_{th}$+1. A prefix group start value $S_i$, for a range of values indicated by a prefix value (of prefix group i and having a bit length $N_p$), may be determined based on the value $N_D$ and/or the binarization parameter k as follows:

$$S_i = \begin{cases} 2^k(2^i-1), & i \le N_D-k+1 \text{ or } i \le P_{th} \\ 2^k(2^i-1)-2^{N_D}, & i > N_D-k+1 \text{ or } i > P_{th} \end{cases} \tag{42}$$

$$S_i = \begin{cases} 2^k(2^{N_p-1}-1), & N_p \le N_D-k+2 \\ 2^k(2^{N_p-1}-1)-2^{N_D}, & N_p > N_D-k+2 \end{cases} \tag{43}$$

A prefix value of prefix group i may indicate a range of values from $S_i$ to $S_{i+1}-1$ (e.g., determined according to (42) or (43)).

Insertion of a range of values with bit length 3018 may result in suffix parts having bit lengths based on a location of insertion of the range of values. A suffix part and/or a bit length of a suffix part, corresponding to a prefix part, may be determined based on the prefix value and a property of the prefix part compared to a corresponding threshold. The property of the prefix part compared to the corresponding threshold may be a prefix group, a prefix bit length, and/or a prefix value. The bit length of the suffix part may be determined, for example, based on a comparison of the prefix group to $P_th$ (e.g., determined according to equation (39)). Additionally, or alternatively, the bit length of the suffix part may be determined, for example, based on a comparison of the prefix bit length to $N_{th}$ (e.g., determined according to equation (40). Additionally, or alternatively, the bit length of the suffix part may be determined, for example, based on a comparison of the prefix value to $v_{p\_th}$ (e.g., as determined according to equation (41)). The suffix part bit length ($N_s$) and prefix group size ($P_s$) corresponding to a prefix value of a prefix group i may be determined as follows:

$$N_S = \begin{cases} k+i, & i \le N_D - k \text{ or } i \le P_{th} - 1 \\ k+i-1, & i > N_D - k \text{ or } i > P_{th} - 1 \end{cases} \quad (44)$$

$$P_S = \begin{cases} 2^{k+i}, & i \le N_D - k \text{ or } i \le P_{th} - 1 \\ 2^{k+i-1}, & i > N_D - k \text{ or } i > P_{th} - 1 \end{cases} \quad (45)$$

Since $N_p$=i+1, equations (44) and (45) may be equivalent to equations (46) and (47), respectively, as shown below:

$$N_S = \begin{cases} k+N_p-1, & N_p \le N_D - k + 1 \text{ or } N_p \le P_{th} \\ k+N_p-2, & N_p > N_D - k + 1 \text{ or } N_p > P_{th} \end{cases} \quad (46)$$

$$P_S = \begin{cases} 2^{k+N_p-1}, & N_p \le N_D - k + 1 \text{ or } N_p \le P_{th} \\ 2^{k+N_p-2}, & N_p > N_D - k + 1 \text{ or } N_p > P_{th} \end{cases} \quad (47)$$

Threshold value(s) (e.g., one or more of $P_{th}$ as per equation (39), $N_{th}$ as per equation (40), and/or $v_{p\_th}$ as per equation (41)) may be determined, for example, based on determining the first BVD value (e.g., $v_{max}$), which a value of BVD may not exceed. The threshold value(s) may be determined for comparing with a property of a prefix value for the BVD value. The threshold value(s) may be determined, for example, based on the first BVD value, maximum prefix group 3002 (e.g., corresponding to maximum prefix value 3004) and/or a binarization parameter. For an exponential Golomb code of k-th order with k>0, the binarization parameter k may be used for binarization/debinarization. A suffix part may be determined, for example, based on (e.g., after) determining the prefix value. The suffix part may have a bit length (e.g., as described herein with respect to equations (44) or (46)) that is based on the prefix value and a comparison of the prefix property with the threshold value.

Sizes of ranges of values, in table 3100, corresponding to prefix group 3122 or higher may be shifted as compared to table 3000 because of the addition of a new range of values with a size 3130. The maximum prefix group 3002 (in table 3100) may correspond to the prefix value 3004 and a suffix value 3106. The suffix value 3106 may represent a range of values 3110 (e.g., with a size of 32, from values 38 to 69). A quantity of codewords 3112 (e.g., 66−38+1=29) corresponding to values from 38 to 66 may be used, for example, if a maximum BVD value equal to 66. Values from 67 to 69, which are greater than the maximum BVD value 3008, correspond to unused codewords 3114 (e.g., 69−66=3) that will never be used. The quantity of codewords 3112 may be represented by a value 3116 of bit length 3118, which is the same as that for the suffix value 3106. Compared to the example binarization scheme of FIG. 30, the quantity of unused codewords 3114 is much smaller than the quantity of unused codewords (u) 3014. The smaller quantity of unused codewords results in improved compression. For example, the codeword bit lengths to code a BVD value that is between 14 and 66 (e.g., corresponding to the maximum BVD value 3008 of 66), may range from 8 to 12 bits for the binarization scheme shown in FIG. 30 as compared to 7 to 11 bits for the binarization scheme shown in FIG. 31. The BVD value may be further compressed by coding a prefix value that is equal to the maximum prefix value (e.g., associated with the maximum prefix group 3002) using a truncated unary code (e.g., as described herein with respect to FIGS. 24-25). Using truncated unary code may reduce the prefix bit length for the prefix value 3004 (e.g., from 6 to 5). As compared to the binarization scheme shown in FIG. 24, the binarization scheme shown in FIG. 31 may maintain the desirable property of coding smaller BVD values (e.g., which have higher probabilities of occurrence compared to larger BVD values) with less bits. This would increase compression for coding many BVD values.

A BVD may indicate a difference between a BV (e.g., indicating a displacement from a current block to a reference block flipped in a direction relative to the current block) and a BVP. The BVP may have a BVP component in the direction of flipping. The BVP or BVP component may be within a range of values. The range of values may define a reference region, in which the reference block is located. The range of values may define a reference region, in which the reference block is in (or aligned with) the direction of flipping.

The BVD may be coded using a codeword comprising a prefix part and a suffix part. The codeword may be a binarized representation of a value of the BVD (e.g., a magnitude of the BVD). The BVD value may be a magnitude (or the absolute value) of a component, of the BVD, in the direction of flipping. The prefix part may be unary coded (or truncated unary coded) and the suffix part may be binary coded. The prefix part and/or the suffix part may be coded (e.g., determined) according to a modified version of a Golomb code (e.g., modified exponential Golomb code as described herein with respect to FIGS. 23-31).

A suffix part may be coded with a bit length that is based on a prefix part and a comparison of a property of the prefix part with a threshold (e.g., as described herein with respect to FIG. 31). In some embodiments, the threshold may be determined based on: a first BVD value (e.g., indicated by the range of values) that a value of the BVD does not exceed, and a prefix value coding the first BVD. The first prefix value may represent a largest prefix value for coding a range of BVD values less than or equal to the first BVD value. Coding the BVD value may comprise binarizing the BVD value (e.g., at the encoder) and/or debinarizing the BVD into the BVD value (e.g., at the decoder) side (e.g., as described herein with respect to FIG. 32 and FIG. 33, respectively).

FIG. 32 shows an example method for decoding/debinarizing a BVD. More specifically, FIG. 32 shows a flowchart 3200 of example method steps for decoding/debinarizing a BVD. One or more steps of the example flowchart 3200 may be may be performed by a decoder (e.g., decoder 300 as shown in FIG. 3). The example method and/or steps of flowchart 3200 shows an example implementation of a (de)binarization scheme (e.g., as described herein with respect to FIG. 31).

At step 3202, the decoder may receive a BVD coded using a prefix part and a suffix part. The BVD may indicate a difference between: a BV and a BVP. The BVP may indicate a displacement from a current block to a reference block. The reference block may be flipped in a direction relative to the current block. The BVP may have a BVP component in the direction of flipping. The BVP component may be within a range of values.

At step 3204, a threshold value may be determined based on a first BVD value that a value of the BVD does not exceed (e.g., a maximum BVD value) Additionally, the threshold value may be determined based on a first prefix value coding the first BVD. The first BVD value may be based on the range of values.

A prefix value of the prefix part may be determined. A prefix value of the prefix part may be determined, for example, from the bitstream. The prefix part may be unary coded and the decoder may parse the prefix value as comprising a unary value (e.g., a quantity of continuous 1s) and a termination/separation bit (e.g., a 0). The prefix part may be coded using a truncated unary coded. A bit length of a maximum prefix value of the prefix part may be determined, for example, if the prefix part is coded using a truncated unary code. The decoder may determine the prefix part, for example, based on the termination bit and/or a maximum quantity of continuous ones (e.g., as described herein with respect to FIGS. 22-25). No additional bits may need to be parsed, for example, if the unary value has been parsed with the bit length.

At step 3206, the suffix part may be determined. Determining the suffix part may comprise determining a bit length of the suffix part. The bit length of the suffix part may be determined, for example, based on the prefix part and/or based on a comparison of a property of the prefix part and a threshold value. The comparison may comprise determining whether a property of the prefix part is greater than the threshold value. A property of the prefix part may be a prefix group associated with the prefix part, a prefix bit length of the prefix part, and/or a prefix value of the prefix part. The threshold value may comprise a threshold prefix group ($P_{th}$), a threshold prefix value ($v_{p\_th}$), and/or a threshold prefix bit length ($N_{th}$).

The decoder may parse the bits after the determined (and/or identified or parsed) prefix part as the suffix part. The decoder may parse the suffix part, for example, based on the determined bit length of the suffix f part. A suffix value may be calculated/determined. A suffix value may be calculated/determined, for example, based on the determined (or identified) suffix part. The suffix value may be represented in binary in the suffix part.

At step 3208, the BVD may be decoded/debinarized using the prefix part and the determined suffix part. The BVD may be decoded/debinarized to the value (of the BVD), for example, using the prefix part and the determined suffix part. A value of the BVD may be determined to be equal to a sum of a value indicated by the prefix part plus the suffix value of the suffix part. The value may be equal to the minimum BVD value of the range of BVD values indicated by the prefix value of the prefix part (e.g., as described with respect to equation (42) and (43)).

Figure 33:
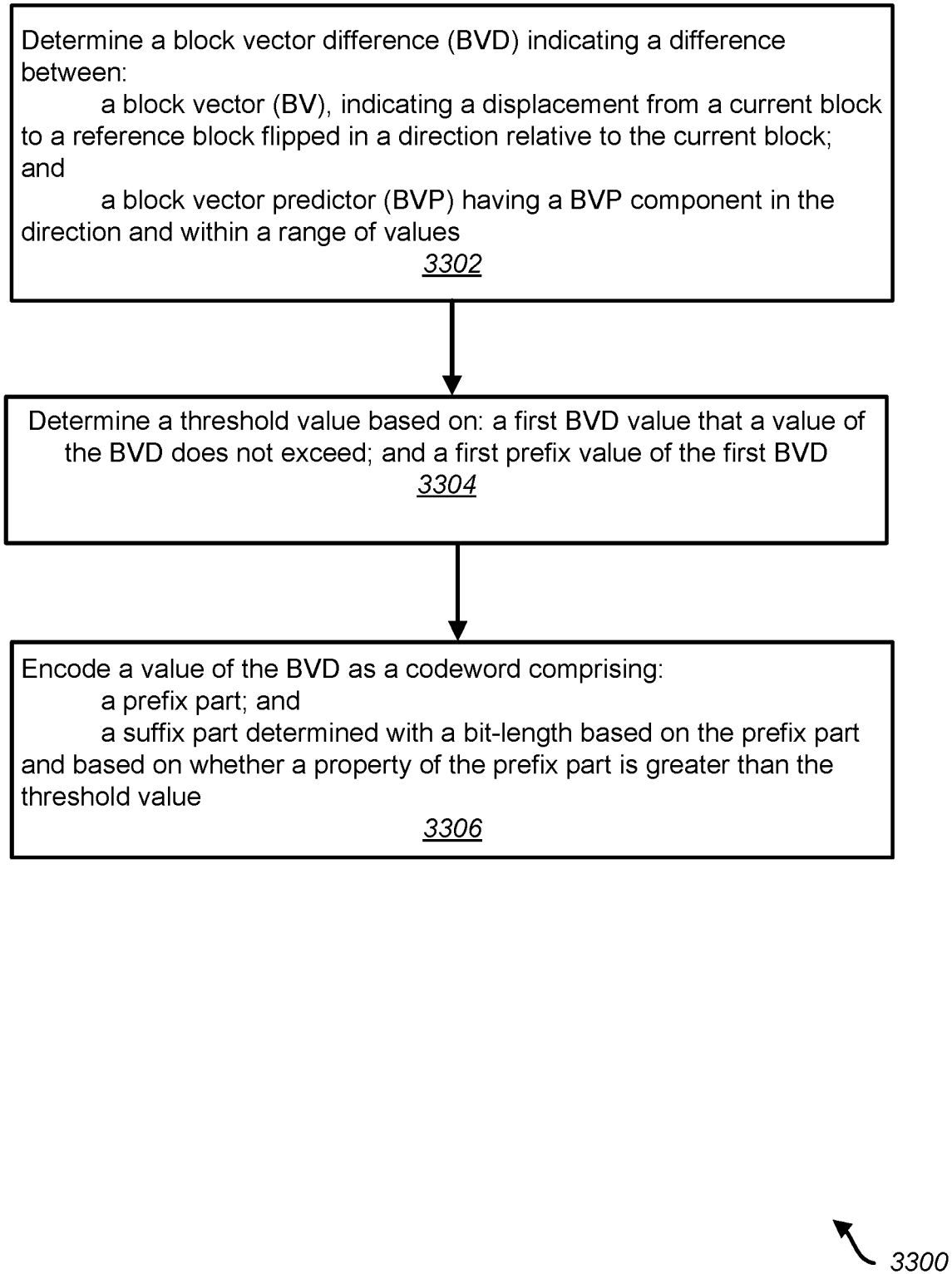
FIG. 33 shows an example method for encoding a BVD.

FIG. 33 shows an example method for encoding/binarizing a BVD. More specifically, FIG. 33 shows a flowchart 3300 of example method for encoding/binarizing a BVD. One or more steps of the example flowchart 3300 may be performed by an encoder (e.g., encoder 200 as shown in FIG. 2). The example method and/or steps of flowchart 3300 shows an example implementation of a binarization scheme (e.g., as described herein with respect to table 3100 of FIG. 31).

At step 3302, a BVD may be determined. The BVD may indicate a difference between a BV and a BVP. The BV may indicate a displacement from a current block to a reference block that is flipped in a direction relative to the current block. The BVP may have a BVP component in (e.g., align with) the direction of flipping and within a range of values. The BVD may be determined as a magnitude (or the absolute value) of the BVP component.

At step 3304, a threshold value may be determined based on: a first BVD value that a value of the BVD may not exceed; and a first prefix value coding the first BVD. The first BVD value may be indicated by/determined based on the range of values, At step 3306, a value of the BVD may be encoded/binarized as a codeword. The codeword may comprise a prefix part and a suffix part. A bit length of the suffix part may be determined, for example, based on the prefix part. Additionally, or alternatively, a bit length of the suffix part may be determined, for example, based on a comparison of a property of the prefix part and a threshold value. The comparison may comprise determining whether a property of the prefix part is greater than the threshold value (e.g., as described herein with respect to step 3206). The codeword may comprise a sequence of binary symbols. A prefix value of the prefix part may be determined, for example, based on the value of the BVD. The prefix value may be determined, for example, based on the prefix value indicating a range of BVD values that includes the BVD value (e.g., as described herein with respect to equations (42) and (43). A suffix value (of the suffix part) may be determined based on the bit length, for example, to indicate a precise value in the range of BVD values. The suffix value may be a binary number representing a difference between the value of the BVD and a minimum BVD value of the range of BVD values. The minimum BVD value of the range of values may be equal to a prefix value of a prefix group comprising the range of BVD values.

The threshold value may be determined based on a difference between the first BVD value (e.g., a $v_{max}$) and the first prefix value (e.g., $v_{p\_max}$). The first prefix value (e.g., a maximum prefix value) may be determined as a value that a prefix value for the BVD may not exceed. The first prefix value may be determined, for example, based on the first prefix value. The first prefix value may be determined as a sum of a consecutive sequence of powers of two such that adding a next consecutive power of two to the sum would exceed the first BVD value (e.g., as shown in equation (34)). The consecutive sequence may start with a first power of two based on a parameter k of an exponential Golomb code. The first power may have an exponent equal to the parameter k.

The first prefix value may be determined as a sum of a sequence of sizes (e.g., of a sequence of corresponding ranges). The sequence of ranges may correspond to a sequence of prefix values less than the first prefix value. The sequence of sizes may be consecutive increasing powers of two.

A second prefix value, associated with the threshold value, may indicate a second range of values. The second range of prefix values may have the same size as a third range of values indicated by a third prefix value preceding the second prefix value. For example, as shown in FIG. 31, the prefix group sizes for prefix values 110 and 1110 are the same.

The bit length of the suffix part may be determined (e.g., as described herein with respect to equations (44) and/or (46)). The threshold value may be based on a first quantity. The first quantity may be equal to a minimum number of bits needed to represent a quantity of values between the first prefix value and the first BVD value. The values may include the first prefix value and the first BVD value. The threshold value may be based on a first quantity that is equal to a rounded up a binary logarithm of a sum of the difference and one (e.g., as described with respect to equation (38)).

The property may be a prefix group index of the prefix part and threshold value may correspond to a specific prefix group index. The prefix group index may correspond to (or be equal to) a quantity of non-termination symbols of the prefix part. The threshold value may be determined as the difference between the first quantity and a constant (e.g., as described herein with respect to equation (39)). The constant may be based on a binarization parameter (e.g., k) of an exponential Golomb code.

The property may be a bit length (or length) of the prefix part and the threshold value may be a specific bit length (e.g., as described herein with respect to equation (40)). The threshold value may be based on a sum of the first quantity and one. The threshold value may be equal to a difference between the sum and the constant.

The property may be a prefix value and the threshold value may be associated with a specific prefix value (e.g., as described herein with respect to equation (41)). The threshold value may equal a minimum value of a range of BVD values indicated by the specific prefix value. The threshold value may be determined as a difference between: bit 1 bitwise shifted to the left a quantity of times, and two. The quantity of times may be equal to a sum of the threshold value and one. The threshold value may represent the binary value of the prefix part being converted to a digital (or base 10) value.

The prefix part may comprise a prefix value indicating a range of BVD values. The range of BVD values may include the value of the BVD. The suffix part may comprise a suffix value indicating a precise BVD value in the range of BVD values. The precise BVD value may correspond to the value of the BVD. The value of the BVD may be equal to a sum of a minimum value, in the range of BVD values, and a suffix value of the suffix part. The range of BVD values may be determined, for example, based on the prefix value and the threshold value.

The BVD may be determined (e.g., as described herein with respect to FIGS. 23-29) for processing (e.g., encoding and/or decoding) a current block (e.g., in an RRIBC mode, as described herein with respect to FIGS. 17-20). The BV may indicate a difference between a BV (e.g., indicating a displacement of a reference block from the current block) and a BVP (e.g., a determined BVP component, of the BVP, corresponding to a direction of flipping the reference block). The reference block, that is flipped in a direction relative to the current block, may be used to predict (at the encoder) and/or determine (at the encoder) the current block (e.g., in an RRIBC mode). The reference block may be determined, by the encoder, based on calculating a residual between the current block and the reference block (e.g., that is flipped in the direction). The reference block may be determined as a best matching block, in the reference region, for predicting the current block that is flipped relative to the reference block, or vice versa.

The reference region (e.g., RRIBC reference region) may comprise a rectangular region defined by a first range of values in a vertical direction and a second range of values in a horizontal direction. A range of values (corresponding to the reference region in the direction) may be one of the first range of values or the second range of values based on the direction. The reference region may correspond to the direction by being aligned with the current block in the direction.

The BV may include at least one BV component that is equal to zero, for example, based on the use of the RRIBC mode. The BV may have a vertical component that is equal to zero, for example, based on the direction being a horizontal direction. The BVP component may be determined as a horizontal component of the BVP, for example, based on the BV having a vertical component that is equal to zero. The BVD may be determined without using a vertical component of the BV, for example, based on the direction being a horizontal direction.

The BV may have a horizontal component that is equal to zero, for example, based on the direction being a vertical direction. The BVP component may be determined as a vertical component of the BVP, for example, based on the BV having a horizontal component that is equal to zero. The BVD is determined without using a horizonal component of the BV, for example, based on the direction being a vertical direction.

The value of the BVD may comprise a magnitude of a component, of the BVD. The component of the BVD may be in (or aligned with) the direction of flipping. The first BVD value may be determined, for example, based on a difference between: a maximum value of the range of values; and a minimum value of the range of values.

The first BVD value may be determined as the difference. The first BVD value may be determined as a value that is equal to a product of a preconfigured fraction and the difference.

The BVP may be determined from a plurality of BVPs. The plurality of BVPs may comprise: a first BVP having a first BVP component, corresponding to the direction, that is equal to a minimum value of the range of values; and a second BVP having a second BVP component, corresponding to the direction, that is equal to a maximum value of the range of values. The preconfigured fraction may be one half (or any other fraction).

The BVD may comprise/include a BVD component in the direction of flipping. The BVD component may indicate a difference between: a BV component, corresponding to the direction, of the BV; and the BVP component. The BVD may be decoded/debinarized without using a second BVD component of the BVD. The BVD may be decoded/debinarized without using a second BVD component of the BVD, for example, based on the second BVD component not corresponding to the direction of flipping.

Although the various encoding/decoding (e.g., binarization and/or debinarization) schemes herein are described in the context of coding BVD values, the encoding/decoding scheme(s) may be equally applicable to encoding/decoding (e.g., binarizing and/or debinarizing) other video syntax elements and/or any other form of digital information. The encoding/decoding scheme(s) may be applied for encoding/decoding a syntax value whose range of values (or a maximum syntax value) may be computed or determined, for example, before encoding/decoding the syntax value (e.g., in a manner that is similar to encoding/decoding a BVD value to reduce needed bits based on a determined first BVD/a maximum possible BVD value, as described herein).

One or more syntax elements related to coding residuals may be similarly coded. One or more syntax elements related to coding residuals may be similarly coded, for example, based on determining a possible range and therefore a maximum possible value for a specific syntax value. At least one of the following video syntax elements may be determined and/or indicated, for a position n within a transform coefficients' scan order related to coding residuals: an abs_remainder value (i.e., abs_remainder[n]) and/or a dec_abs_level value (i.e., abs_level_value[n]). The abs_remainder value may be a remaining absolute value of a transform coefficient level encoded with Golomb-Rice code at the scanning position n. A value of abs_remainder[n] may inferred to be equal to 0, for example, if abs_remainder value is absent. The syntax element dec_abs_level may be an intermediate value coded with the Golomb-Rice code at the scanning position n.

Variables (e.g., CoeffMin and CoeffMax variables/parameters) may be used (e.g., by the encoder and/or the decoder) to determine the minimum and maximum transform coefficient values, respectively. The variables CoeffMin and CoeffMax (e.g., in VVC (ITU-T Rec. H.266)) may specify the minimum and maximum transform coefficient values as follows: CoeffMin=−(1<<15); CoeffMax=(1<<15)−1. The minimum and maximum transform coefficient values may be used in conformance testing to ensure that a restored transform coefficient's magnitude is within the range of valid values.

Binarization of dec_abs_level[n] may be performed with a k-th order Exp-Golomb code. The binarization may be performed with a limitation on the suffix length (e.g., a bit length of the suffix part) of the last prefix group. For example, the suffix length of the last prefix group may be equal to a fixed value (e.g., 15, or any other value). Coding the dec_abs_level[n] value may be based on a determined maximum value in a manner that is similar to coding a BVD value based on a maximum BVD value (e.g., as described herein).

Maximum values for abs_remainder[n] and dec_abs_level[n] may be indicated in a slice header, a picture header, a sequence parameter set, a picture parameter set and/or any other part of a bitstream that precedes a residual coding process. Syntax elements abs_remainder[n] and/or dec_abs_level[n] may be binarized (and/or debinarized). Syntax elements abs_remainder[n] and/or dec_abs_level[n] may be binarized (and/or debinarized), for example, based on the respective indicated maximum values (e.g., similar to binarization and/or debinarization of BVD values based on a maximum BVD value). The syntax elements may be coded with reduced (e.g., in bit length) suffix parts and/or with reduced (e.g., in bit length) prefix parts. The syntax elements may be coded with reduced (e.g., in bit length) suffix parts and/or with reduced (e.g., in bit length) prefix parts, for example, based on applying at least one of the coding schemes described with respect to FIGS. 23-33. The maximum number of bits (or bins) in the suffix part may be determined, for example, based on a maximum value indicated (or preindicated before coding) for dec_abs_level[n]. The maximum number of bits (or bins) in the suffix part may be determined such that (e.g., to ensure that) the decoded dec_abs_level[n] will not exceed the range of valid values. Similarly, a maximum value of abs_remainder[n] syntax element may be indicated (or pre-indicated before coding).

One or more video syntax elements for MVD coding may be coded (e.g., encoded and/or decoded) in a manner similar to coding of BVDs using at least one of the binarization schemes (e.g., as described herein with respect to FIGS. 23-33). A syntax element, for MVD coding, may comprise a abs_mvd_minus2 value or a MVD value. Motion vector difference Mvd[compIdx], for compIdx=0 or 1, may be determined as follows: Mvd=abs_mvd_greater0_flag*(abs_mvd_minus2+2)*(1−2*mvd_sign_flag). The encoder and/or the decoder may determine a maximum value of the abs_mvd_minus2 syntax element. The encoder and/or the decoder may determine a maximum value of the abs_mvd_minus2 syntax element, for example, based on a dimension(s) of a reference picture indicated in the reference picture list. The maximum value may be used to determine the maximum prefix value and the maximum suffix value, as well as a quantity of states in the last prefix group. The syntax element abs_mvd_minus2 may be efficiently binarized (e.g., with less bits and enhanced compiression), for example, in a manner that is similar, or substantially similar, to binarization of BVD based on a maximum BVD (e.g., as described herein).

One or more video syntax elements for signaled luma filter coding may be coded (e.g., encoded and/or decoded) in a manner that is similar, or substantially similar, to that described herein with respect to FIGS. 23-33. A video syntax element may comprise an ALF coefficient value (e.g., alf_luma_coeff_abs[sfIdx][j]) that indicates the absolute value of the j-th coefficient of the signaled luma filter (e.g., as indicated by sfIdx). When alf_luma_coeff_abs[sfIdx][j] is not present, the value may be inferred to be equal 0. The value of alf_luma_coeff_abs[sfIdx][j] may be any value in the range of 0 to 128 (e.g., in VVC, or any other coding scheme).

A maximum value for the ALF coefficient value may be determined for a list of ALF coefficients. The ALF coefficients in the list may be in a range of values that is no greater than the maximum value. The maximum value for the ALF coefficient may be determined. The maximum value for the ALF coefficient may be determined, for example, based on an indication (or an indication of a presence) of a maximum value constraint for ALF coefficients. The indicated maximum value may be a non-default value (e.g., less than 128, or less than any other value). The default maximum value (e.g., 128, or any other default value) may be determined for the ALF coefficients, for example, if the indication is not determined. A maximum prefix value may be determined and one or more of the binarization schemes (e.g., as described herein with respect to FIGS. 23-33) may be applied to reduce bits (or bins) of a codeword determined/generated for coding the ALF coefficient value. A maximum prefix value may be determined and one or more of the binarization schemes may be applied to reduce bits (or bins) of a codeword determined/generated for coding the ALF coefficient value, for example, based on the signaled maximum value constraint (or derived maximum value constraint). Bits of one or more of a prefix part or a suffix part of the codeword may be reduced based on the one or more binarization schemes.

Figure 34:
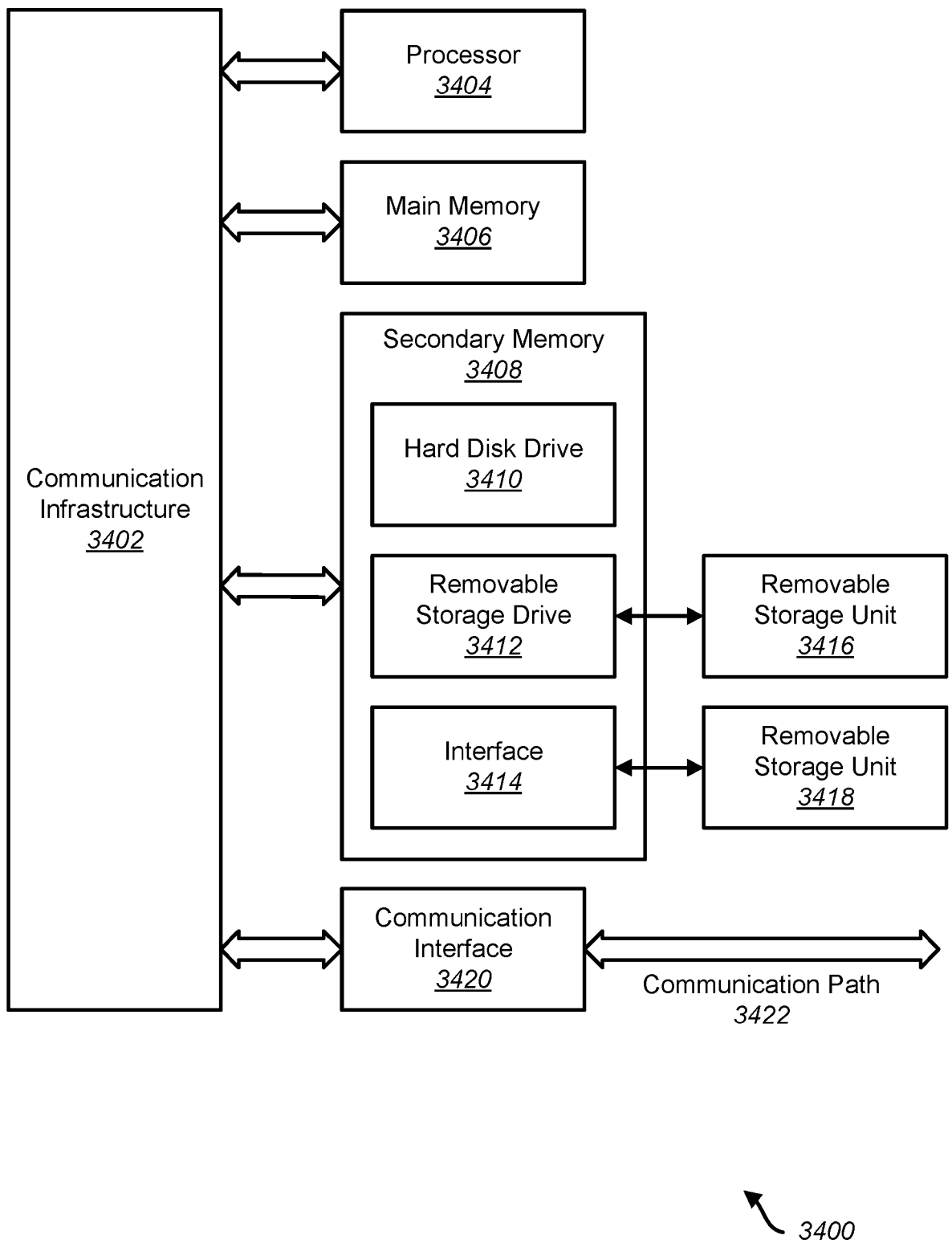
FIG. 34 shows an example computer system in which examples of the present disclosure may be implemented.

FIG. 34 shows an example computer system in which examples of the present disclosure may be implemented. For example, the example computer system 3400 shown in FIG. 34 may implement one or more of the methods described herein. For example, various devices and/or systems described herein (e.g., in FIGS. 1, 2, and 3) may be implemented in the form of one or more computer systems 3400. Furthermore, each of the steps of the flowcharts depicted in this disclosure may be implemented on one or more computer systems 3400.

The computer system 3400 may comprise one or more processors, such as a processor 3404. The processor 3404 may be a special purpose processor, a general purpose processor, a microprocessor, and/or a digital signal processor. The processor 3404 may be connected to a communication infrastructure 3402 (for example, a bus or network). The computer system 3400 may also comprise a main memory 3406 (e.g., a random access memory (RAM)), and/or a secondary memory 3408.

The secondary memory 3408 may comprise a hard disk drive 3410 and/or a removable storage drive 3412 (e.g., a magnetic tape drive, an optical disk drive, and/or the like). The removable storage drive 3412 may read from and/or write to a removable storage unit 3416. The removable storage unit 3416 may comprise a magnetic tape, optical disk, and/or the like. The removable storage unit 3416 may be read by and/or may be written to the removable storage drive 3412. The removable storage unit 3416 may comprise a computer usable storage medium having stored therein computer software and/or data.

The secondary memory 3408 may comprise other similar means for allowing computer programs or other instructions to be loaded into the computer system 3400. Such means may include a removable storage unit 3418 and/or an interface 3414. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 3418 and interfaces 3414 which may allow software and/or data to be transferred from the removable storage unit 3418 to the computer system 3400.

The computer system 3400 may also comprise a communications interface 3420. The communications interface 3420 may allow software and data to be transferred between the computer system 3400 and external devices. Examples of the communications interface 3420 may include a modem, a network interface (e.g., an Ethernet card), a communications port, etc. Software and/or data transferred via the communications interface 3420 may be in the form of signals which may be electronic, electromagnetic, optical, and/or other signals capable of being received by the communications interface 3420. The signals may be provided to the communications interface 3420 via a communications path 3422. The communications path 3422 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 3416 and 3418 or a hard disk installed in the hard disk drive 3410. The computer program products may be means for providing software to the computer system 3400. The computer programs (which may also be called computer control logic) may be stored in the main memory 3406 and/or the secondary memory 3408. The computer programs may be received via the communications interface 3420. Such computer programs, when executed, may enable the computer system 3400 to implement the present disclosure as discussed herein. In particular, the computer programs, when executed, may enable the processor 3404 to implement the processes of the present disclosure, such as any of the methods described herein. Accordingly, such computer programs may represent controllers of the computer system 3400.

Figure 35:
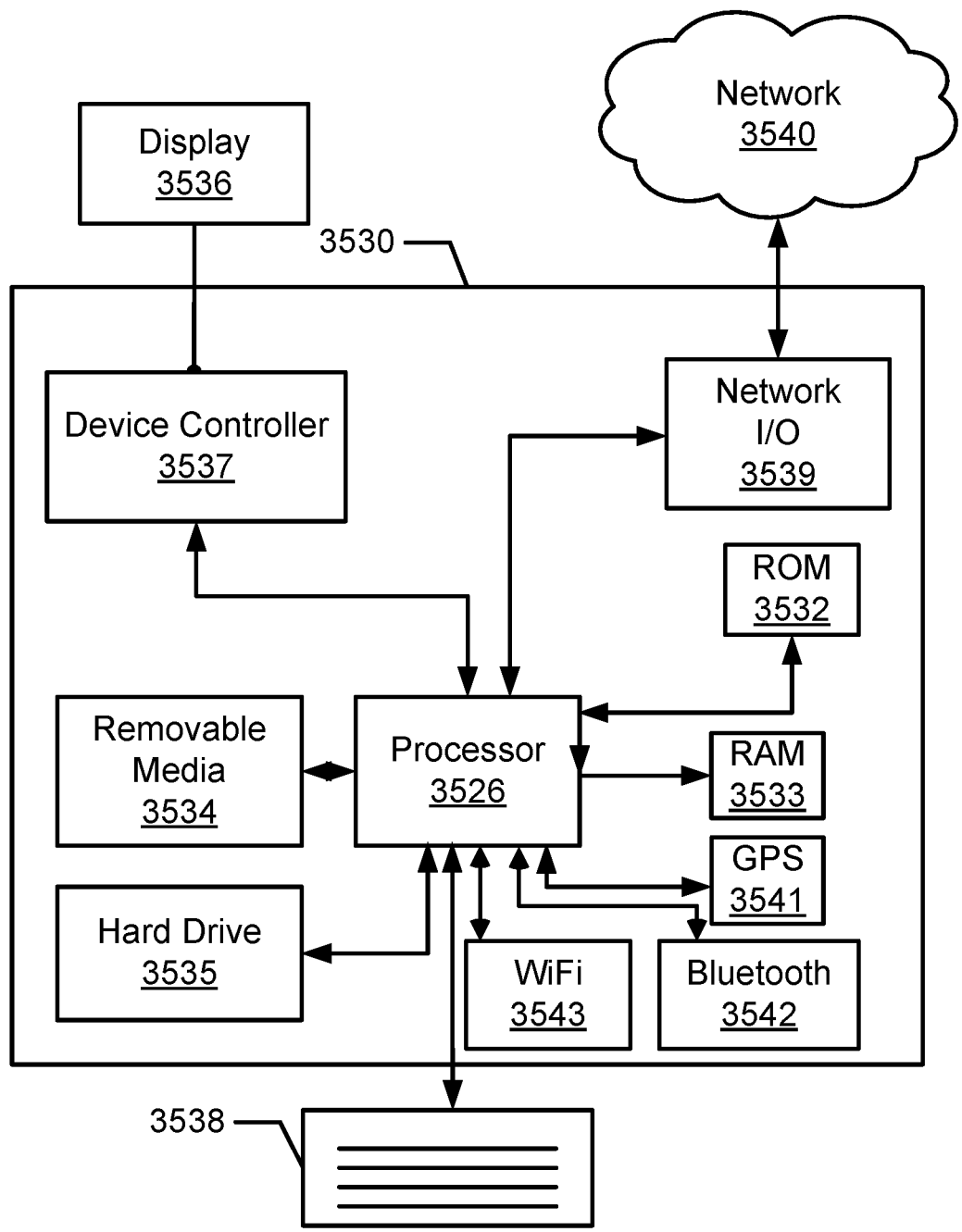
FIG. 35 shows example elements of a computing device that may be used to implement any of the various devices described herein

FIG. 35 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 3530 may include one or more processors 3526, which may execute instructions stored in the random-access memory (RAM) 3533, the removable media 3534 (such as a Universal Serial Bus (USB) drive, compact disk (CD) or digital versatile disk (DVD), or floppy disk drive), or any other desired storage medium. Instructions may also be stored in an attached (or internal) hard drive 3535. The computing device 3530 may also include a security processor (not shown), which may execute instructions of one or more computer programs to monitor the processes executing on the processor 3526 and any process that requests access to any hardware and/or software components of the computing device 3530 (e.g., ROM 3532, RAM 3533, the removable media 3534, the hard drive 3535, the device controller 3537, a network interface 3539, a GPS 3541, a Bluetooth interface 3542, a WiFi interface 3543, etc.). The computing device 3530 may include one or more output devices, such as the display 3536 (e.g., a screen, a display device, a monitor, a television, etc.), and may include one or more output device controllers 3537, such as a video processor. There may also be one or more user input devices 3538, such as a remote control, keyboard, mouse, touch screen, microphone, etc. The computing device 3530 may also include one or more network interfaces, such as a network interface 3539, which may be a wired interface, a wireless interface, or a combination of the two. The network interface 3539 may provide an interface for the computing device 3530 to communicate with a network 3540 (e.g., a RAN, or any other network). The network interface 3539 may include a modem (e.g., a cable modem), and the external network 3540 may include communication links, an external network, an in-home network, a provider's wireless, coaxial, fiber, or hybrid fiber/coaxial distribution system (e.g., a DOCSIS network), or any other desired network. Additionally, the computing device 3530 may include a location-detecting device, such as a global positioning system (GPS) microprocessor 3541, which may be configured to receive and process global positioning signals and determine, with possible assistance from an external server and antenna, a geographic position of the computing device 3530.

The example in FIG. 35 may be a hardware configuration, although the components shown may be implemented as software as well. Modifications may be made to add, remove, combine, divide, etc. components of the computing device 3530 as desired. Additionally, the components may be implemented using basic computing devices and components, and the same components (e.g., processor 3526, ROM storage 3532, display 3536, etc.) may be used to implement any of the other computing devices and components described herein. For example, the various components described herein may be implemented using computing devices having components such as a processor executing computer-executable instructions stored on a computer-readable medium, as shown in FIG. 35. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may determine an indication of a block vector difference (BVD). The indication of the BVD may comprise a prefix part and a suffix part. The BVD may indicate a difference between: a block vector (BV) indicating a displacement from a current block to a reference block that is flipped in a direction relative to the current block; and a block vector predictor (BVP) comprising a BVP component in the direction relative to the current block, wherein the BVP is within a range of values. The computing device may determine a threshold value based on: a maximum BVD value associated with the range of values; and a first prefix value for the maximum BVD value. The computing device may determine the suffix part. A bit length of the suffix part may be based on a comparison of a property of the prefix part with the threshold value. The computing device may decode, based on the prefix part and the suffix part, the indication of the BVD. The computing device may perform one or more additional operations. The computing device may determine a start value of a prefix group associated with the prefix part. The start value of the prefix group may be based on the prefix part and a comparison of a property of the prefix part with the threshold value. Determining the threshold value may comprise determining the threshold value based on a difference between the maximum BVD value and the first prefix value. The computing device may determine, based on the maximum BVD value, the first prefix value that a prefix value for the BVD does not exceed. The computing device may determine the first prefix value based on a sum of a consecutive sequence of powers of two that does not exceed the maximum BVD value. The consecutive sequence may start with a first power of two based on a parameter k of an exponential Golomb code. The first power may have an exponent equal to the parameter k. A second prefix value, associated with the threshold value, may indicate a second range of values with a same size as a third range of values indicated by a third prefix value preceding the second prefix value. The threshold value may be based on a minimum quantity of bits required to represent values between, and including, the first prefix value and the maximum BVD value. The threshold value may be based on a binary logarithm of a sum of a second difference, between the maximum BVD value and the first prefix value, and one. The threshold value may be equal to a third difference between: a value obtained by rounding up the binary logarithm, and constant that is equal to a binarization parameter. The threshold value may be equal to a third difference between: a sum of one and a value obtained by rounding up the binary logarithm, and constant that is equal to a binarization parameter. The threshold value may be equal to a third difference between: one that is bitwise shifted to the left a quantity of times that is equal to a sum of the threshold value and one, and two. The property of the prefix part may comprise one of: a quantity of non-termination symbols of the prefix part; a bit length of the prefix part; or a prefix value associated with the prefix part. A magnitude of a component of the BVD, in the direction relative to the current block, may not exceed the maximum BVD value. The computing device may determine the maximum BVD value based on a fourth difference between: a maximum value of the range of values; and a minimum value of the range of values. The maximum BVD value may be equal to the fourth difference. The maximum BVD value may be equal to a product of a preconfigured fraction and the fourth difference. The preconfigured fraction may be one half (or any other fraction). The BVP may be determined from a plurality of BVPs comprising: a first BVP comprising a first BVP component, corresponding to the direction relative to the current block, that is equal to a minimum value of the range of values; and a second BVP comprising a second BVP component, corresponding to the direction relative to the current block, that is equal to a maximum value of the range of values. The BVD may comprise a BVD component in the direction relative to the current block. The BVD component may indicate a difference between: a BV component, of the BV, in the direction relative to the current block; and the BVP component. The debinarizing the BVD may comprise debinarizing the BVD without using a second BVD component of the BVD, for example, based on the second BVD component not corresponding to the direction relative to the current block. The reference block may be located in a reference region corresponding to the direction relative to the current block. The range of values may define the reference region. The reference region may comprise a rectangular region defined by a first range of values in a vertical direction relative to the current block or a second range of values in a horizontal direction relative to the current block. The range of values may be one of the first range of values or the second range of values based on the direction relative to the current block. The reference region corresponding to the direction relative to the current block may comprise the reference region being aligned with the current block in the direction relative to the current block. The reference region may be determined based on the direction relative to the current block and a position of the current block in a video frame. The bit length of the suffix part may be further based on a prefix value indicated by the prefix part. The prefix part may comprise a prefix value indicating a range of BVD values. The suffix part may comprise a suffix value indicating a BVD value, corresponding to the BVD, in the range of BVD values. The BVD may be equal to a sum of minimum value in the range of BVD values and a suffix value of the suffix part. The range of BVD values may be determined based on the prefix value and the threshold value. The first prefix value may comprise a sum of sizes of a sequence of ranges. The sequence of ranges may correspond to a sequence of prefix values less than the first prefix value. The sizes may comprise consecutive increasing powers of two. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode the BVD. A computer-readable medium may store instructions that, when executed, cause performance of the described method, additional operations and/or include the additional elements.

A computing device may perform a method comprising multiple operations. The computing device may determine a block vector difference (BVD) indicating a difference between: a block vector (BV) indicating a displacement from a current block to a reference block that is flipped in a direction relative to the current block; and a block vector predictor (BVP) comprising a BVP component in the direction relative to the current block, wherein the BVP is within a range of values. The computing device may determine a threshold value based on: a maximum BVD value associated with the range of values; and a first prefix value for the maximum BVD value. The computing device may encode a value of the BVD as a codeword comprising: a prefix part; and a suffix part with a bit length that is determined based on a comparison of a property of the prefix part with the threshold value. The computing device may perform one or more additional operations. The computing device may determine a start value of a prefix group associated with the prefix part. The start value of the prefix group may be based on the prefix part and a comparison of a property of the prefix part with the threshold value. Determining the threshold value may comprise determining the threshold value based on a difference between the maximum BVD value and the first prefix value. The computing device may determine, based on the maximum BVD value, the first prefix value that a prefix value for the BVD does not exceed. The computing device may determine the first prefix value based on a sum of a consecutive sequence of powers of two that does not exceed the maximum BVD value. The consecutive sequence may start with a first power of two based on a parameter k of an exponential Golomb code. The first power may have an exponent equal to the parameter k. A second prefix value, associated with the threshold value, may indicate a second range of values with a same size as a third range of values indicated by a third prefix value preceding the second prefix value. The threshold value may be based on a minimum quantity of bits required to represent values between, and including, the first prefix value and the maximum BVD value. The threshold value may be based on a binary logarithm of a sum of a second difference, between the maximum BVD value and the first prefix value, and one. The threshold value may be equal to a third difference between: a value obtained by rounding up the binary logarithm, and constant that is equal to a binarization parameter. The threshold value may be equal to a third difference between: a sum of one and a value obtained by rounding up the binary logarithm, and constant that is equal to a binarization parameter. The threshold value may be equal to a third difference between: one that is bitwise shifted to the left a quantity of times that is equal to a sum of the threshold value and one, and two. The property of the prefix part may comprise one of: a quantity of non-termination symbols of the prefix part; a bit length of the prefix part; or a prefix value associated with the prefix part. A magnitude of a component of the BVD, in the direction relative to the current block, may not exceed the maximum BVD value. The computing device may determine the maximum BVD value based on a fourth difference between: a maximum value of the range of values; and a minimum value of the range of values. The maximum BVD value may be equal to the fourth difference. The maximum BVD value may be equal to a product of a preconfigured fraction and the fourth difference. The preconfigured fraction may be one half (or any other fraction). The BVP may be determined from a plurality of BVPs comprising: a first BVP comprising a first BVP component, corresponding to the direction relative to the current block, that is equal to a minimum value of the range of values; and a second BVP comprising a second BVP component, corresponding to the direction relative to the current block, that is equal to a maximum value of the range of values. The BVD may comprise a BVD component in the direction relative to the current block. The BVD component may indicate a difference between: a BV component, of the BV, in the direction relative to the current block; and the BVP component. The debinarizing the BVD may comprise debinarizing the BVD without using a second BVD component of the BVD, for example, based on the second BVD component not corresponding to the direction relative to the current block. The reference block may be located in a reference region corresponding to the direction relative to the current block. The range of values may define the reference region. The reference region may comprise a rectangular region defined by a first range of values in a vertical direction relative to the current block or a second range of values in a horizontal direction relative to the current block. The range of values may be one of the first range of values or the second range of values based on the direction relative to the current block. The reference region corresponding to the direction relative to the current block may comprise the reference region being aligned with the current block in the direction relative to the current block. The reference region may be determined based on the direction relative to the current block and a position of the current block in a video frame. The bit length of the suffix part may be further based on a prefix value indicated by the prefix part. The prefix part may comprise a prefix value indicating a range of BVD values. The suffix part may comprise a suffix value indicating a BVD value, corresponding to the BVD, in the range of BVD values. The BVD may be equal to a sum of minimum value in the range of BVD values and a suffix value of the suffix part. The range of BVD values may be determined based on the prefix value and the threshold value. The first prefix value may comprise a sum of sizes of a sequence of ranges. The sequence of ranges may correspond to a sequence of prefix values less than the first prefix value. The sizes may comprise consecutive increasing powers of two. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to decode the BVD. A computer-readable medium may store instructions that, when executed, cause performance of the described method, additional operations and/or include the additional elements.

A computing device may perform a method comprising multiple operations. The computing device may receive an indication of a block vector difference (BVD). The indication of the BVD may comprise a prefix part and a suffix part. The BVD may indicate a difference between: a block vector (BV) indicating a displacement from a current block to a reference block that is flipped in a direction relative to the current block; and a block vector predictor (BVP) comprising a BVP component in the direction relative to the current block, wherein the BVP is within a range of values. The computing device may determine a threshold value based on: a maximum BVD value associated with the range of values; and a first prefix value for the maximum BVD value. The computing device may determine a start value of a prefix group associated with the prefix part. The start value of the prefix group may be based a comparison of a property of the prefix part with the threshold value. The computing device may decode, based on the start value of the prefix group and the suffix part, the indication of the BVD. The computing device may perform one or more additional operations. The computing device may determine the suffix part. A bit length of the suffix part may be based on a comparison of a property of the prefix part with the threshold value. The threshold value may be based on a difference between the maximum BVD value and the first prefix value. The property may comprise one of: a quantity of non-termination symbols of the prefix part; a bit length of the prefix part; or a prefix value associated with the prefix part. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode the BVD. A computer-readable medium may store instructions that, when executed, cause performance of the described method, additional operations and/or include the additional elements.

A computing device may perform a method comprising multiple operations. The computing device may code a block vector difference (BVD) using a prefix part and a suffix part. The BVD may indicate a difference between: a block vector (BV), indicating a displacement from a current block to a reference block flipped in a direction relative to the current block, and a block vector predictor (BVP) having a BVP component in the direction and within a range of values. A bit length of the suffix part may be based on the prefix part and the comparing a property of the prefix part with a threshold. The suffix part may be coded based on: a first BVD value, indicated by the range of values, that a value of the BVD does not exceed; and a first prefix value for the first BVD. The computing device may perform one or more additional operations. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the BVD. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   receiving, by a computing device, an indication of a block vector difference (BVD), wherein the indication of the BVD comprises a prefix part and a suffix part, and wherein the BVD indicates a difference between:
   a block vector (BV) indicating a displacement from a current block to a reference block that is flipped in a direction relative to the current block; and
   a block vector predictor (BVP) comprising a BVP component in the direction relative to the current block, wherein the BVP component is within a range of values;
   determining a threshold value based on:
   a maximum BVD value associated with the range of values; and
   a first prefix value for the maximum BVD value;
   determining the suffix part, wherein a bit length of the suffix part is based on a comparison of a property of the prefix part with the threshold value; and
   decoding, based on the prefix part and the suffix part, the indication of the BVD to determine a BVD value.
2. The method of claim 1, further comprising:
   determining a start value of a prefix group associated with the prefix part, wherein the start value of the prefix group is based on the prefix part and the comparison of the property of the prefix part with the threshold value.

3. The method of claim 1, wherein determining the threshold value further comprises:
   determining the threshold value based on a difference between the maximum BVD value and the first prefix value.
4. The method of claim 1, wherein the threshold value is based on a minimum quantity of bits required to represent values between, and including, the first prefix value and the maximum BVD value.
5. The method of claim 1, wherein the property comprises one of:
   a quantity of non-termination symbols of the prefix part;
   a bit length of the prefix part; or
   a prefix value associated with the prefix part.
6. The method of claim 1, wherein a magnitude of a component of the BVD, in the direction relative to the current block, does not exceed the maximum BVD value.
7. The method of claim 1, further comprising determining the maximum BVD value based on a difference between:
   a maximum value of the range of values; and
   a minimum value of the range of values.
8. The method of claim 1, wherein the BVD value is associated with a BVD component in the direction relative to the current block, and wherein the BVD component indicates a difference between:
   a BV component, of the BV, in the direction relative to the current block; and
   the BVP component.
9. The method of claim 1, wherein the reference block is located in a reference region corresponding to the direction relative to the current block, and wherein the range of values defines the reference region.
10. The method of claim 1, wherein the bit length of the suffix part is based on a prefix value indicated by the prefix part.
11. A method comprising:
    determining, by a computing device, a block vector difference (BVD) indicating a difference between:
    a block vector (BV) indicating a displacement from a current block to a reference block that is flipped in a direction relative to the current block; and
    a block vector predictor (BVP) comprising a BVP component in the direction relative to the current block, wherein the BVP component is within a range of values;
    determining a threshold value based on:
    a maximum BVD value associated with the range of values; and
    a first prefix value for the maximum BVD value; and
    encoding a value of the BVD as a codeword comprising:
    a prefix part; and
    a suffix part with a bit length that is determined based on a comparison of a property of the prefix part with the threshold value.
12. The method of claim 11, wherein determining the threshold value further comprises:
    determining the threshold value based on a difference between the maximum BVD value and the first prefix value.
13. The method of claim 11, wherein the property comprises one of:
    a number of non-termination symbols of the prefix part;
    a bit length of the prefix part; or
    a prefix value associated with the prefix part.
14. The method of claim 11, wherein the bit length of the suffix part is based on a prefix value indicated by the prefix part.

15. The method of claim 11, wherein a magnitude of a component of the BVD, in the direction relative to the current block, does not exceed the maximum BVD value.

16. The method of claim 11, further comprising determining the maximum BVD value based on a difference between:
- a maximum value of the range of values; and
- a minimum value of the range of values.

17. A method comprising:
- receiving, by a computing device, an indication of a block vector difference (BVD), wherein the indication of the BVD comprises a prefix part and a suffix part, and wherein the BVD indicates a difference between:
  - a block vector (BV) indicating a displacement from a current block to a reference block that is flipped in a direction relative to the current block; and
  - a block vector predictor (BVP) comprising a BVP component in the direction relative to the current block, wherein the BVP component is within a range of values;
- determining a threshold value based on:
  - a maximum BVD value associated with the range of values; and
  - a first prefix value for the maximum BVD value;
- determining a start value of a prefix group associated with the prefix part, wherein the start value of the prefix group is based a comparison of a property of the prefix part with the threshold value; and
- decoding, based on the start value of the prefix group and the suffix part, the indication of the BVD to determine a BVD value.

18. The method of claim 17, further comprising:
- determining the suffix part, wherein a bit length of the suffix part is based on the comparison of the property of the prefix part with the threshold value.

19. The method of claim 17, wherein the threshold value is based on a difference between the maximum BVD value and the first prefix value.

20. The method of claim 17, wherein the property comprises one of:
- a quantity of non-termination symbols of the prefix part;
- a bit length of the prefix part; or
- a prefix value associated with the prefix part.

* * * * *